United States Patent
Chida

(10) Patent No.: US 10,981,753 B2
(45) Date of Patent: Apr. 20, 2021

(54) STAIR LIFT

(71) Applicant: Hiroshi Chida, Tokyo (JP)

(72) Inventor: Hiroshi Chida, Tokyo (JP)

(*) Notice: Subject to any disclaimer, the term of this patent is extended or adjusted under 35 U.S.C. 154(b) by 0 days.

(21) Appl. No.: 16/769,035

(22) PCT Filed: Nov. 20, 2018

(86) PCT No.: PCT/JP2018/043457
§ 371 (c)(1),
(2) Date: Jun. 2, 2020

(87) PCT Pub. No.: WO2019/111745
PCT Pub. Date: Jun. 13, 2019

(65) Prior Publication Data
US 2021/0087019 A1    Mar. 25, 2021

(30) Foreign Application Priority Data
Dec. 6, 2017  (JP) .............. JP2017-245591

(51) Int. Cl.
*B66B 9/16*   (2006.01)
*B66B 9/08*   (2006.01)
(Continued)

(52) U.S. Cl.
CPC ............ *B66B 9/08* (2013.01); *B66B 5/046* (2013.01); *B66B 5/26* (2013.01); *B66B 9/0846* (2013.01);
(Continued)

(58) Field of Classification Search
CPC ....... B66B 9/08; B66B 9/0846; B66B 9/0853; B66B 5/046; B66B 5/26; F16D 51/42; F16H 7/06
See application file for complete search history.

(56) References Cited

U.S. PATENT DOCUMENTS 100,006 A    2/1870  Bowers
227,459 A    5/1880  Tay
(Continued)

FOREIGN PATENT DOCUMENTS

JP    47-31559 Y1    9/1972
JP    58-41771 U     3/1983
(Continued)

OTHER PUBLICATIONS

International Search Report dated Jan. 15, 2019, issued in counterpart International Application No. PCT/JP2018/043457 (2 pages).
(Continued)

*Primary Examiner* — Michael A Riegelman
(74) *Attorney, Agent, or Firm* — Westerman, Hattori, Daniels & Adrian, LLP

(57) ABSTRACT

A stair lift eliminates a hindrance to the normal use of a staircase. The stair lift comprises two rails disposed along the staircase in parallel to the width of the staircase, a self-propelled gantry-shape carriage having a gantry-shaped structure, traveling on the rails with a restriction to prevent a derailment, and a lift step (1) disposed between left and right leg structures of the gantry-shape carriage and supported by a lifting mechanism provided in the leg structure. When the gantry-shape carriage stands by at a lower floor or a upper floor of the staircase, the lift step (1) lands on the floor adjacent to the staircase or a step of the staircase, and when the gantry-shape carriage travels on the rails, the lift step is held at a position preventing an interference with steps of the staircase. A user gets on the lift step (1) while standing.

15 Claims, 47 Drawing Sheets

(51) Int. Cl.
*B66B 5/26* (2006.01)
*B66B 5/04* (2006.01)
*F16D 51/42* (2006.01)
*F16H 7/06* (2006.01)

(52) U.S. Cl.
CPC ............ *B66B 9/0853* (2013.01); *F16D 51/42* (2013.01); *F16H 7/06* (2013.01)

(56) References Cited

U.S. PATENT DOCUMENTS

| | | | |
|---|---|---|---|
| 1,237,627 | A | 8/1917 | Forbes et al. |
| 2,528,265 | A * | 10/1950 | Cretors ................... B66B 9/083 187/201 |
| 2,674,347 | A * | 4/1954 | Thompson .............. B66B 9/083 187/202 |
| 2,719,607 | A | 10/1955 | Scott |
| 2,832,436 | A * | 4/1958 | Roberts ................... B66B 9/083 187/201 |
| 4,345,669 | A * | 8/1982 | Noall ...................... B66B 9/083 182/103 |
| 5,050,708 | A * | 9/1991 | Wood ..................... B66B 9/0838 187/201 |
| 5,105,914 | A | 4/1992 | Holden |
| 7,185,741 | B1 | 3/2007 | Rozenfeld |
| 7,395,900 | B2 * | 7/2008 | Murray ................ B66B 9/0869 187/200 |
| 7,568,555 | B2 | 8/2009 | Vroegindeweij et al. |
| 2002/0098077 | A1 * | 7/2002 | Beech ....................... B66B 9/08 187/201 |
| 2006/0180399 | A1 * | 8/2006 | Stanislao .............. B66B 9/0853 187/201 |
| 2007/0295561 | A1 * | 12/2007 | Schroeder ............ B66B 9/0869 187/201 |
| 2008/0093176 | A1 | 4/2008 | Rosenthal |
| 2010/0176944 | A1 * | 7/2010 | Shell ..................... B66B 9/0869 340/541 |
| 2013/0299280 | A1 * | 11/2013 | Friedrich ............... B64D 11/04 187/245 |
| 2018/0086601 | A1 * | 3/2018 | Okonski ................... B66B 9/08 |
| 2019/0388286 | A1 * | 12/2019 | Ferlin ..................... B66B 9/083 |
| 2020/0354193 | A1 * | 11/2020 | Eisenman ............... B66B 7/023 |

FOREIGN PATENT DOCUMENTS

| | | |
|---|---|---|
| JP | 6-57587 B2 | 8/1994 |
| JP | 7-315723 A | 12/1995 |
| JP | 10-120339 A | 5/1998 |
| JP | 11-60110 A | 3/1999 |
| JP | 2000-264559 A | 9/2000 |
| JP | 2003-335480 A | 11/2003 |
| JP | 2004-521846 A | 7/2004 |
| JP | 3148482 U | 2/2009 |
| JP | 4689102 B2 | 5/2011 |

OTHER PUBLICATIONS

Notice of Reasons for Refusal dated Mar. 20, 2018, issued in counterpart JP Patent Application No. 2017-245591, w/ English translation (8 pages).

Decision to Grant a Patent dated Jun. 5, 2018, issued in counterpart JP Patent Application No. 2017-245591, w/ English translation (5 pages).

* cited by examiner

STAIR LIFT

BACKGROUND OF THE INVENTION

Field of the Invention

The present invention relates to a stair lift.

Description of the Related Art

Carrying out patent searches on machines lifting people and loads up and down a staircase, it is recognized that there is long history more than one century. For instance, U.S. Pat. No. 100,006 is dated Feb. 22, 1820. U.S. Pat. No. 227,459 is dated May 11, 1880. These patents are based on an idea which lifts a boarding carriage up and down along a staircase. U.S. Pat. No. 2,719,607 is dated Oct. 4, 1955. This patent is based on an idea which lifts a chair up and down along one rail disposed along a staircase.

Regarding stair lift ideas presented in the first half of the twentieth century or before, it seems that the majority is based on an idea of lifting up and down a boarding carriage, on which a user stands. Since then, it seems that chair type lifts, which lift a chair up and down, have become the majority of stair lifts. The major type of stair lifts for the domestic use in the current market is the chair type stair lift.

Stair lifts, which travel up and down along rails disposed along a wall of a staircase and carry a user in a wheelchair on a boarding carriage, are widely adopted in public facilities such as railway stations. Stair lifts that lift a boarding base, on which a user stands, up and down on rails disposed along walls of a staircase have been proposed.

Designs which eliminate obstacles, which are caused by stairlift rails extending in the outside of a staircase, by tilting the rail ends have been presented. A design, which eliminates similar obstacles by making the rails movable has also been presented.

CITATION LIST

Patent Literature

PTL1: U.S. Pat. No. 100,006
PTL2: U.S. Pat. No. 227,459
PTL3: U.S. Pat. No. 2,719,607
PTL4: U.S. Pat. No. 5,105,914
PTL5: U.S. Pat. No. 7,185,741
PTL6: U.S. Pat. No. 7,568,555
PTL7: U.S. Pat. No. 1,237,627
PTL8: Japan Patent 1929147
PTL9: Japan Patent 4689102
PTL10: Japan Utility Model Application Publication S58-41771
PTL11: Japanese Translation of PCT application Publication 2004-521846
PTL12: Japan Patent Application Publication 2000-264559

BRIEF SUMMARY OF THE INVENTION

Technical Problem

Usage of a chair-type stair lift requires bodily motions such as sitting on and standing up from the chair as a user gets on and off the stair lift. Bodily motions such as sitting on and standing up become burdens for users of weak feet and/or waist. On the other hand, standing-ride stair lifts are convenient since users get on and off the stair lifts while standing. However, the majority of stair lifts at present is the chair-type stair lift. Assuming its reasons, the following aspects of ever presented standing-ride stair lifts, which lift a boarding base up and down along staircase, can be pointed out.

Reason1: While the boarding base stands by at an upper floor, the width of the staircase covered by the width of the boarding base can not be used for the ordinary use. Except public facilities such as railway stations, which provide wide stairs, staircases of ordinary houses are no longer usable for normal use. On the other hand, the chair-type stair lifts, which reduce the drawback regarding the ordinary use of staircase by making the chair foldable, are widely available.

Reason2: The drive mechanism, which pulls the boarding base, protrudes into the outside of the staircase. If the width of a corridor adjacent to the staircase is narrow, then the drive mechanism of the boarding base becomes a serious obstacle to walk through the corridor. On the contrary, chair-type stair lifts generally adopt an arrangement to place the drive mechanism under the chair.

On the other hand, chair-type stair lifts also provide countermeasures against obstacles caused by installations of stair lifts to the normal use of walking. In order to sit on the chair, a user stands on the floor connected to the staircase then sits on the chair. Hence, if rails are extended into the outside of the staircase, then the extended rails become obstacles. There are patents proposed as countermeasures against such a hindrance. For instance, U.S. Pat. No. 7,568,555 is based on an idea of tiltable rails. U.S. Pat. No. 5,105,914 is based on an idea of movable rails.

The design of the chair-type stair lift is based on bodily motions such as sitting on and standing up from the chair. However, the bodily motions of sitting down, and standing up from sitting posture compels users of weak feet and/or waist to make more efforts than that of walking while the users are in standing posture. A standing up assist chair, which assists bodily motions of sitting and standing, has been proposed in order to reduce the efforts. Japan patent 450876 is one of examples.

Objectives of the present invention are to eliminate obstacles to the normal use of staircases and to reduce protrusions of the stair lifts into the outside of the staircases while keeping advantages of the standing-ride stair lifts which enable the user to get on and off in standing posture.

Solution to Problem

The present invention of a standing-ride stair lift comprises two rails disposed along a staircase in parallel to the width direction of the staircase and a self-propelled gantry-shape carriage, which has a similar structure of a gantry crane, travels on the rails with restrictions to prevent derailing, and a lift step, which is disposed between the left and right leg structures of the gantry-shape carriage, supported by a lifting mechanism provided in the leg structures.

The lift step lands on the floor connected to the staircase or a step of the staircase when the gantry-shape carriage stands by at the lower floor or the upper floor connected to the staircase. When the gantry-shape carriage travels on the rails, the lift step is held at a position so that the lift step does not interfere with steps of the staircase A user, who is going to the upper floor from the lower floor, gets on the lift step which is standing by at the lower floor and performs a driving operation of the gantry-shape carriage, then the landed lift step moves up and stops at the position where the lift step does not interfere with steps of the staircase. Then, the gantry-shape carriage starts traveling upwards. When the gantry-shape carriage arrives at a stop position of the upper floor, it stops upward traveling. The user finishes the driving operation then gets off the lift step and moves to the upper floor. When a preset time elapses after the user has finished the driving operation, the lift step moves down and lands on a step of the staircase, then the gantry-shape carriage is put on a standby condition at the upper floor.

A user, who is going to the lower floor from the upper floor, stands on the upper floor and momentarily performs the driving operation of the gantry-shape carriage which has been put on a standby condition at the upper floor, then the landed lift step moves up and stops moving up when it reaches the height of the upper floor. Then, the user gets on the lift step and performs the driving operation. The gantry-shape carriage starts traveling downwards. Furthermore, if the user does not perform the driving operation within a preset period, then the lift step moves down and lands, the gantry-shape carriage is put on a standby condition at the upper floor. When the gantry-shape carriage arrives at a stop position of the lower floor, it stops downward traveling. Then, the lift step moves down and lands. The user finishes the driving operation and moves to the lower floor. The gantry-shape carriage is put on the standby condition at the lower floor.

Advantageous Effects of Invention

When the gantry-shape carriage is put on the standby condition, the lift step lands on a step of the staircase or the floor connected to the staircase. A user of the staircase can use the staircase as usual while paying an attention to a different rise of the step where the lift step lands. Since the gantry-shape carriage is of self-propelled type, there is an effect to avoid protrusions of the traction apparatus, which pulls a moving body along rails, into the outside of the staircase. When the standby position of the lift step at the lower floor is set at the first step or a higher step of the staircase, the protrusion of gantry-shape carriage into outside of the staircase at the lower floor is avoided or reduced. The standby position of the lift step at the upper floor is the first step from the upper floor, the protrusion of gantry-shape carriage into outside of the staircase at the upper floor is avoided or reduced. In addition, the standby position of the lift step at the upper floor can be set at the second step or a further down step from the upper floor.

Since a user uses the stair lift withstanding posture, bodily motions such as sitting down and standing up which are required for the use of a chair type stair lift are no longer necessary. Physical burdens born by users of weak feet and/or waist are reduced. Healthy users are able to use the stair lift easily as if it were an escalator, because bodily motions of sitting down and standing up are not necessary.

BRIEF DESCRIPTION OF THE DRAWINGS

Wires are not shown for clarity and simplification of drawings. Members which are not relevant for the purpose of explanation are dismantled from drawings.

DETAILED DESCRIPTION OF THE INVENTION

The development of the stair lift which can be installed on a narrow staircase is intended. In order to realize the development, designs which make a travel drive mechanism thinner and designs of the lifting mechanism of the lift step are elaborated. At the same time, it is elaborated that the structures of the invented stair lift are to be suitable for mass-production. The invention is intended to develop the standing-ride stair lifts which are convenient for the transportation, the work to bring the stair lifts in installation sites, and the installation work. Use in caregiving services for peoples including patients of dementia, which is due to longer life span in these days, is also considered.

For convenience of explanation, the left side and the right side of a stair lift are defined as follows. A user stands on a lower floor and faces the stair lift. The user's right-hand side is the right and the user's left-hand side is the left. A suffix "r" affixed to a reference sign shown in figures indicates the right side and a suffix "e" indicates the left side. Reference signs without suffix "r", "e" mentioned in description of embodiments are applicable for the right side and the left side, providing that the reference signs are shown with "r", "e" in figures.

Embodiment 1

Figure 1:
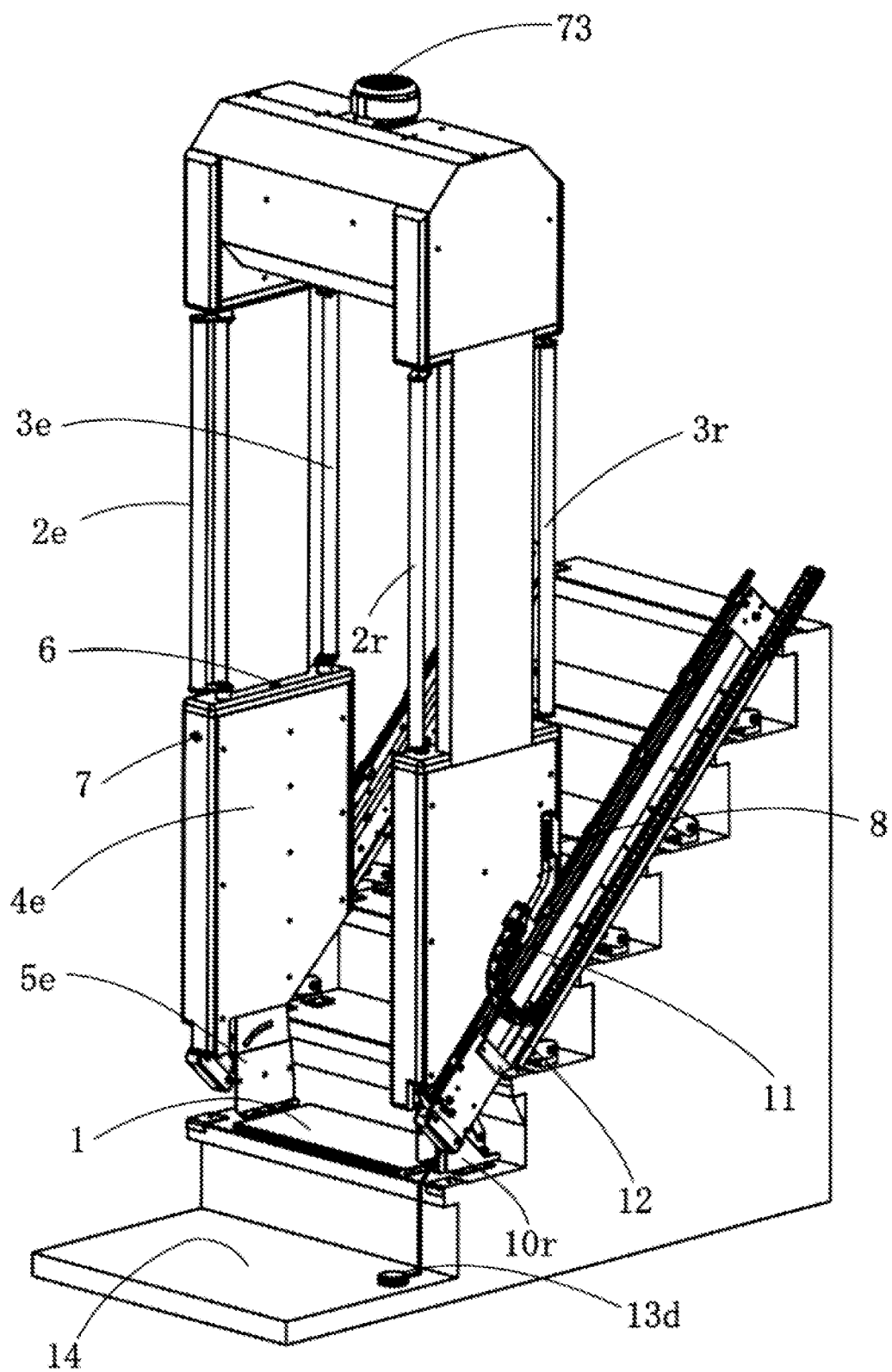
FIG. 1 is a perspective view of one embodiment of a gantry-shape carriage, which stands by at a lower floor, in accordance with the present invention. A landing position of a lift step is set at a first step of a staircase.
Figure 5:
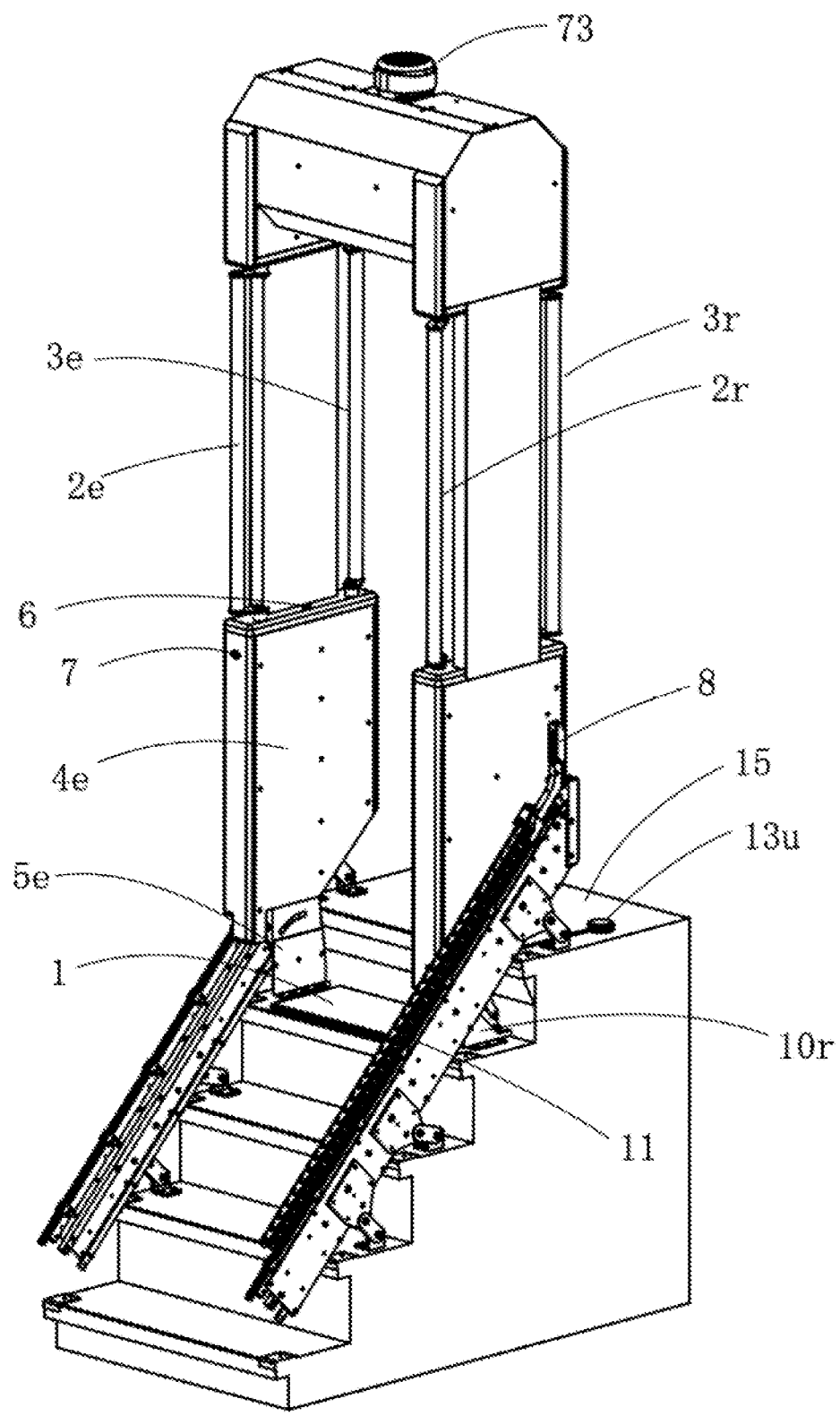
FIG. 5 is a perspective view of the gantry-shape carriage which stands by at the upper floor.

Examples of usage of the stair lift based on the present invention are shown in perspective views FIG. 1 through to FIG. 5. A user is not shown. FIG. 1 is a view to explain a state that a gantry-shape carriage stands by at a lower floor. In the embodiment, two rails are installed along a staircase, widthwise in parallel, mounted on steps of the staircase. The gantry-shape carriage, which is of self-propelled type and travels on the rails being restricted not to come off the rails in order to prevent derailment, comprises leg structures which travel being restricted not to come off the rails, and a connecting structure which connects top portions of the left and right leg structures.

A lift step 1, on which a user rides, is disposed between the left and right leg structures. The lift step 1 is supported by lifting mechanisms provided in the left and right leg structures. A protector 5e prevents entanglement of user's clothes while the lift step moves up and down. A guide-slope 10r, which guides up and down movements of the lift step, is mounted on a step of the staircase. The left guide-slope 10e is hidden in FIG. 1. Please refer to FIG. 2.

While the gantry-shape carriage stands by at a lower floor, the lift step 1 lands on the lower floor or the first step of the staircase. When the lift step lands on the first step of the staircase, a traffic hindrance, which is caused by a protrusion of the stair lift into the outside of the staircase, is averted or drastically reduced in comparison with the hindrance which is caused by a case that the lift step lands on the lower floor.

Operation-handrails 2e and 3e are provided on the left leg structure. Operation-handrails 2r and 3r are provided on the right leg structure in the same fashion. The user of the stair lift stands on the lift step 1 and holds operation-handrails. An operation-handrail provides a function to support the user's posture and a function of a control switch of the gantry-shape carriage.

As an example of a control switch, a push-button switch mounted on a handrail can be considered. However, an application of the push-button switch compels the user to hold a position where the switch is mounted. On the contrary, driving operations with the operation-handrails have the following advantages. (1) A user can hold any position of the operation-handrail at the user's discretion. (2) The user drives the gantry-shape carriage by pulling operation-handrails to the user's body and keeping the pulling state. Since the user keeps pulling the operation-handrails to the user's body so that the user's posture is secured while the gantry-shape carriage travels. As a result, the operation-handrails contribute to the safety of the operations.

There are several possible methods of placing the operation-handrails. An example; the left operation-handrail is placed at lower floor side only and the right operation-handrail is placed at the upper floor side only. Another example; the operation-handrails are placed at one side only. In the embodiment, the operation-handrails are placed at the upper floor side and the lower floor side and provided symmetrically at both of the left and right sides. By the placement, the number of operation-handrails necessary to operate the gantry-shape carriage can be set at one or two. With a provision of an operation mode switch, it is possible to set up different operation speeds for cases such that operation with one operation-handrail and operation with two operation-handrails. An operation mode switch 6 is provided on the top surface of the bottom portion of the left leg structure.

A travel power unit of the gantry-shape carriage is placed in the connecting structure. A cable of operation power supply and signals is connected via a cable chain 11 to a terminal block 8 which is provided on the bottom portion of the right leg structure. A cable chain guide 12 is mounted on the right rail. The stair lift usage by a user who needs assistance of driving operations is also considered. A receptacle 7 to connect a caregiver switch 302 (Refer to FIG. 56) is provided on the front of the bottom portion of the left leg structure. With a connection of the caregiver switch, the stair lift can be used for caregiving services as well as transportation of goods. The left and right leg structures are in mirror image relationship except the operation mode switch 6, the receptacle 7, and a device of power supply connection. A footswitch 13d is placed on the lower floor 14. The footswitch on the lower floor has a function to call the gantry-shape carriage standing by at the upper floor to a standby position of the lower floor.

FIG. 1 shows a state that the lift step lands on the first step of the staircase. A sequence of movements of the gantry-shape carriage when a user of the stair lift moves from the lower floor to the upper floor is explained with FIG. 1 through to FIG. 5. The user gets on the lift step 1, then operates the upper floor side operation-handrails 3e and 3r by pulling the operation-handrails to the user's body and keeps the state. The lift step 1 starts moving up.

Figure 2:
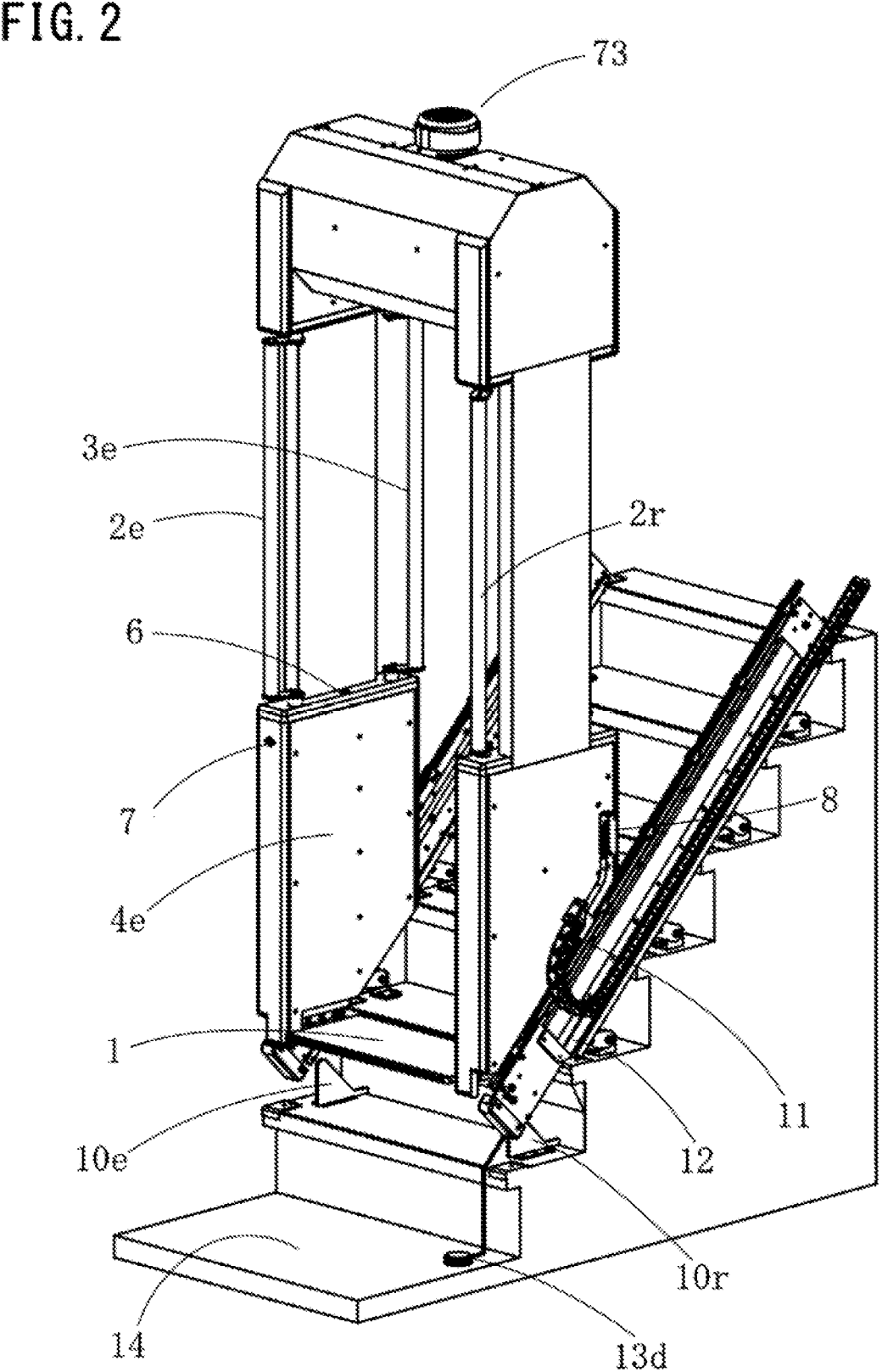
FIG. 2 is a perspective view of the gantry-shape carriage, which is in the middle of procedures of going up from the lower floor, and the lift step has just gone up at a position designated for traveling of the gantry-shape carriage. A user, who pulls upper floor side operation-handrails, is not shown.

FIG. 2 is a view to explain a state that the lift step 1 has moved up at a position which is set for a travel mode of the gantry-shape carriage and has stopped. The user who pulls the upper floor side operation-handrails 3e and 3r inward is not shown. The right operation-handrail 3r is hidden in FIG. 2. The upward movement of the lift step 1 stops at the position where the lift step 1 and steps of the staircase do not conflict each other while the gantry-shape carriage travels along the rails.

Figure 3:
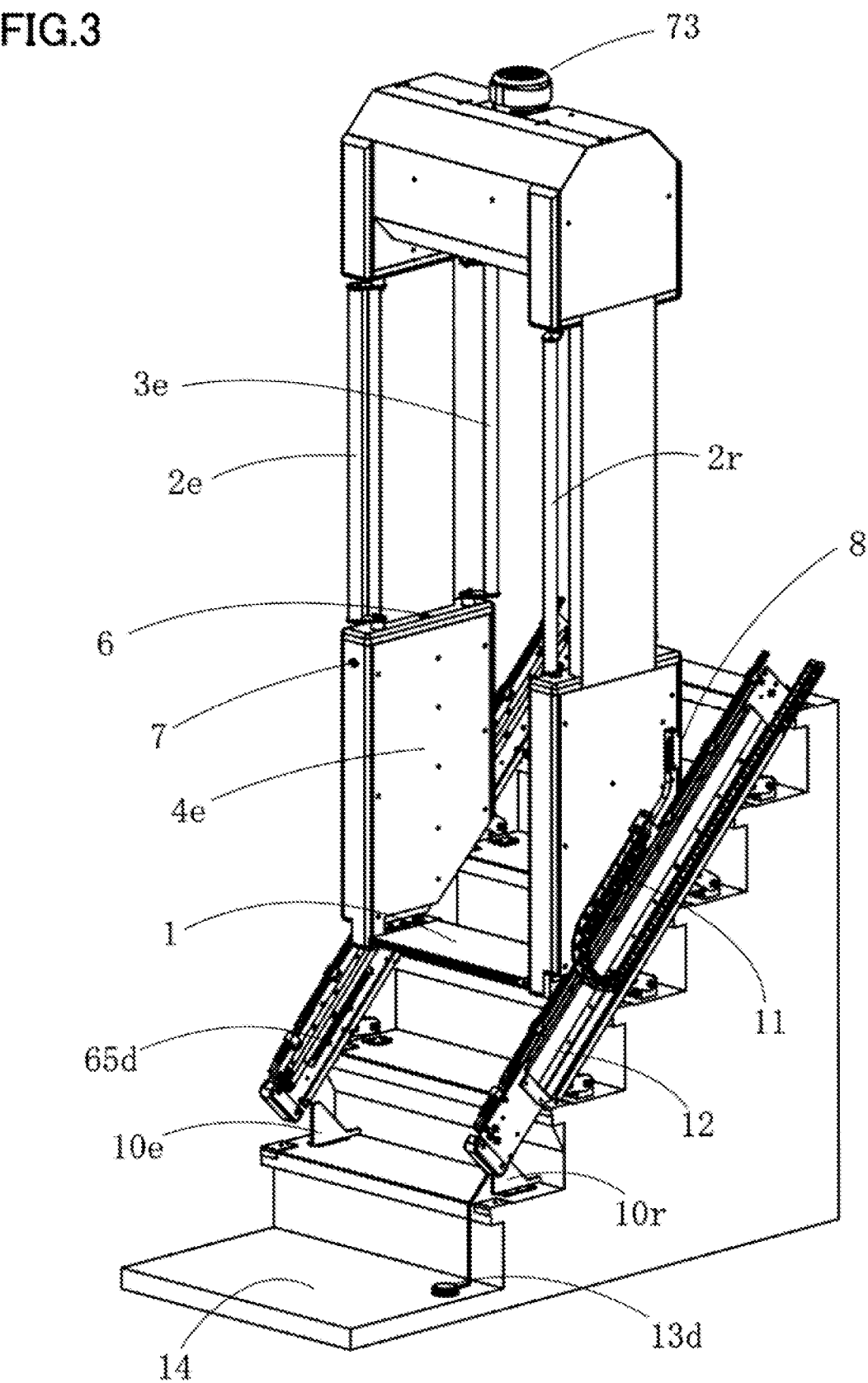
FIG. 3 is a perspective view of the gantry-shape carriage traveling upwards on the staircase. The user, who pulls the upper floor side operation-handrails, is not shown.

FIG. 3 is a view to explain a state that the gantry-shape carriage travels upwards along the rails. The user who pulls the upper floor side operation-handrails 3e and 3r inward is not shown. The right operation-handrail 3r is hidden in FIG. 3. The gantry-shape carriage travels upwards on the rails after the upward movement of the lift step 1 has stopped. A lower floor side stop-position-target 65d is seen at an end portion of the bottom of the left rail.

Figure 4:
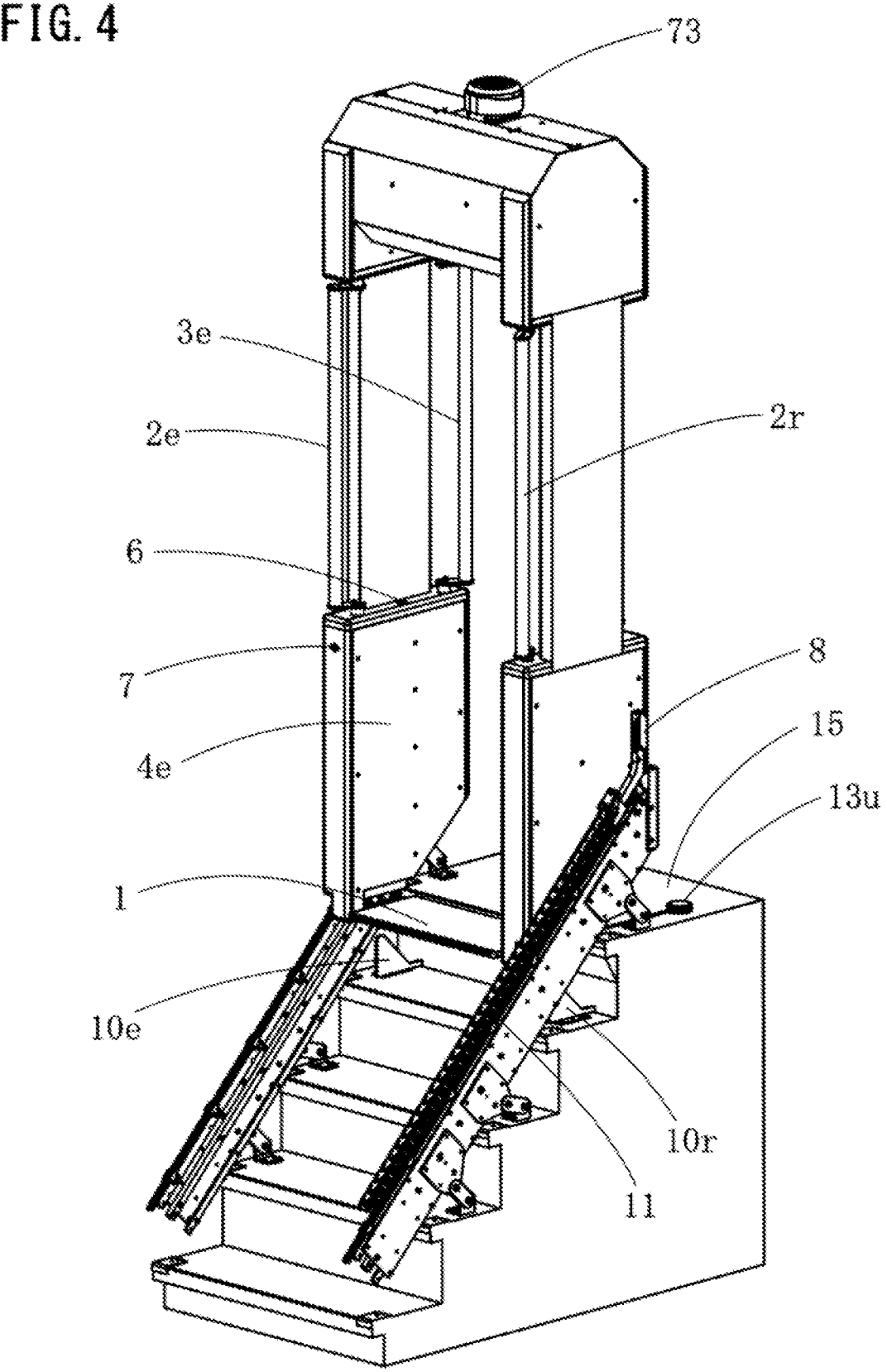
FIG. 4 is a perspective view of the gantry-shape carriage which has arrived at the upper floor and stopped. The user, who pulls the upper floor side operation-handrails, is not shown.

FIG. 4 is a view to explain a state that the gantry-shape carriage has stopped its traveling at an upper floor stop position. The user who pulls the upper floor side operation-handrails 3e and 3r inward is not shown. The right operation-handrail 3r is hidden in FIG. 4. When the gantry-shape carriage detects an upper floor side stop-position-target 65u (Refer to FIG. 51), the gantry-shape carriage starts a stopping operation of the upward travel and stops its travel. The height of the lift step 1 is the height of the upper floor 15.

The user releases the operation-handrails 3e and 3r pulled by the user to the user's body, then moves from the lift step 1 to the upper floor 15. The operation-handrails 3e and 3r are returned to their standby positions by the action of return springs. After the operation-handrails 3e and 3r have returned to their standby positions and a preset time period elapses, the lift step 1 lands on a staircase step which is one step below the upper floor. After the lift step 1 lands on the staircase step, the gantry-shape carriage is put on a standby state at the upper floor.

FIG. 5 is a view to explain a state that the gantry-shape carriage is standing by at the upper floor. A footswitch 13*u* placed on the upper floor has a function to call up the gantry-shape carriage standing by at the lower floor. A sequence of movements of the gantry-shape carriage when a user moves from the upper floor to the lower floor is explained in the following. Please refer to FIG. 5. The user stands on the upper floor 15 and performs a momentary action to pull the upper floor side operation-handrails 3*e* and 3*r* of the gantry-shape carriage inward. A necessary condition of the operation can be selected by a control design from conditions either the simultaneous operation of operation-handrails 3*e* and 3*r* or an operation of one of them. The selection of the simultaneous operation of the two operation-handrails contributes to avoid mis-operations. The following is an explanation applicable to the case that the simultaneous operation of the two operation-handrails is selected.

The user momentarily performs the simultaneous operation of the two upper floor side operation-handrails 3*e* and 3*r*, then the lift step 1 rises from its standby position to the position that corresponds to the traveling of the carriage, i.e. the height of upper floor 15, and keeps the position for a preset time period. If the user does not perform an operation to pull the lower floor side operation-handrails 2*e* and 2*r* to user's body within the preset time period, then the lift step 1 goes down to its standby position and the gantry-shape carriage returns to its standby state at the upper floor. The user gets on the lift step 1 within the preset time period and performs the operation to pull the lower floor side operation-handrails 2*e* and 2*r* to user's body and keeps the state. The gantry-shape carriage starts the downward traveling.

When the gantry-shape carriage detects a lower floor side stop-position-target 65*d* (Refer to FIG. 3), the carriage starts a procedure to stop its travel and stops its traveling. Following the stop of the travel, the lift step 1 goes down and lands on its standby position. The user releases the operation-handrails 2*e* and 2*r*, which are pulled to the user's body, and moves to the lower floor. The operation-handrails 2*e* and 2*r* are returned to their standby positions by the action of return springs. The gantry-shape carriage comes into its standby state at the lower floor.

In addition, it is presumed that while the gantry-shape carriage is traveling, if the user stops the operation of the operation-handrails, then the gantry-shape carriage stops its traveling, and if the user resumes the operation of the operation-handrails, then the gantry-shape carriage resumes its traveling.

The above is an explanation on the drive operations and the performance of the gantry-shape carriage. The above explanation is based on the condition that the user riding on the lift step performs the simultaneous operations of the left and right operation-handrails of either the upper floor side or the lower floor side. It is possible to set up operations which use either the left or the right single operation-handrail by modifications of the control program. Number of operation-handrails necessary to operate the gantry-shape carriage and a setting of travel speed can be modified by an operation of the operation mode switch 6 which switches over control programs.

Figure 6:
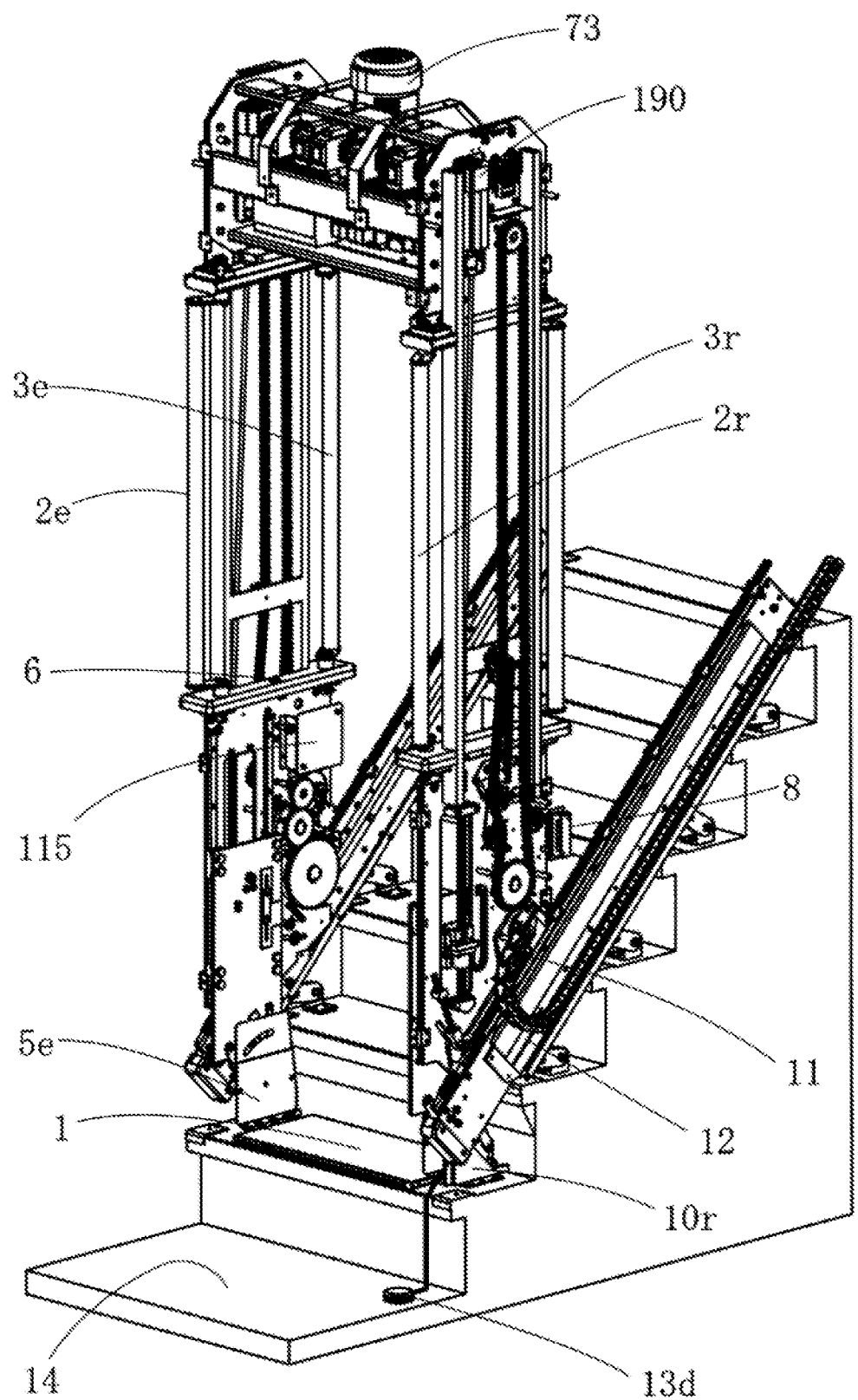
FIG. 6 shows a perspective view of the gantry-shape carriage which stands by at a lower floor. Outer covers are removed in order to show its internal structures. The lift step lands on the first step of the staircase.

In order to grab an overview of the internal mechanism of the gantry-shape carriage, an explanatory view of the gantry-shape carriage without covers is shown in FIG. 6. Wires are not shown. The lift step 1 lands on the first step of the staircase. On the right leg structure, a terminal block 8 which connects a cable of power supply and signals, a bracket 49 (Refer to FIG. 10) and its accessories of the cable chain 11, and relating internal wires are added. The travel power unit and the control apparatus are placed in the connecting structure. A geared motor with brake 73 is adopted as a travel power source in this embodiment. Wires of sensors mounted on the lower portion of the leg structure are gathered in a junction box 115.

Figure 7:
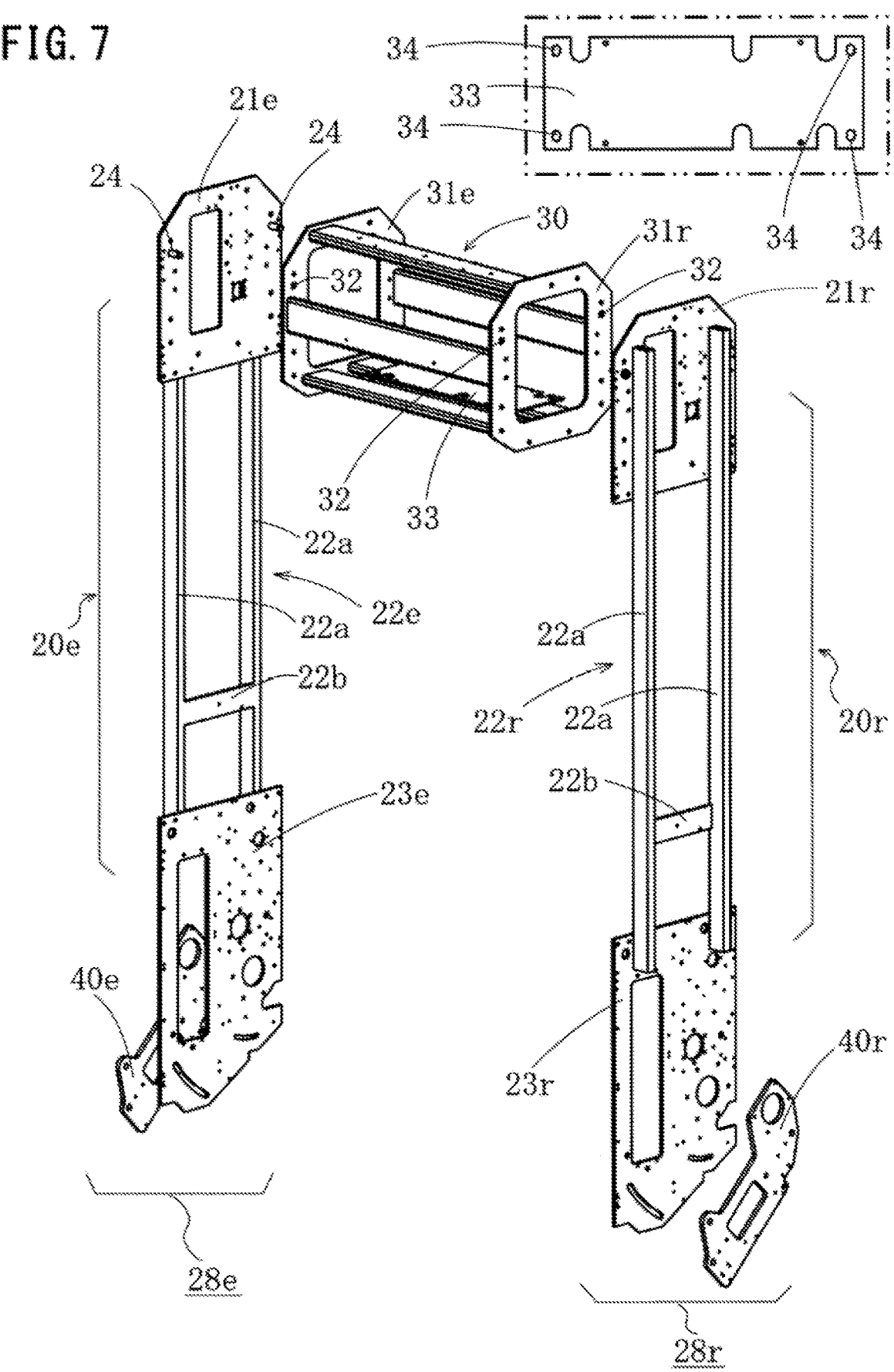
FIG. 7 is a perspective view of frame structures of the gantry-shape carriage.

FIG. 7 is an explanatory view of the left and right leg structure frames and the connecting structure frame. A left top base 21*e*, a left connecting column 22*e*, and a left bottom base 23*e* are formed into one body and become a left leg frame 20*e*. Two square pipes 22*a* and a tie plate 22*b* are formed into one body and become the connecting column. A left leg structure frame 28*e* consists of the left leg frame 20*e* and a left bogie base 40*e*. A right top base 21*r*, a right connecting column 22*r*, and a right bottom base 23*r* are formed into one body and become a right leg frame 20*r*. A right leg structure frame 28*r* consists of the right leg frame 20*r* and a right bogie base 40*r*. The left leg structure frame 28*e* and the right leg structure frame 28*r* are in a mirror image relationship.

The connecting structure frame 30 is shown between the left and right leg structure frames 28*e* and 28*r*. The connecting structure frame 30 is a cage shaped frame which consists of a left end plate 31*e*, a right end plate 31*r*, and members connecting the end plates, and is formed into one body. A travel power unit mounting base 33 is provided in the frame. An enlarged view of the travel power unit mounting base is shown in the two dotted closed line. A travel power unit mounting hole 34 is an oblong shaped hole which is for horizontal positioning of the travel power unit.

Figure 14:
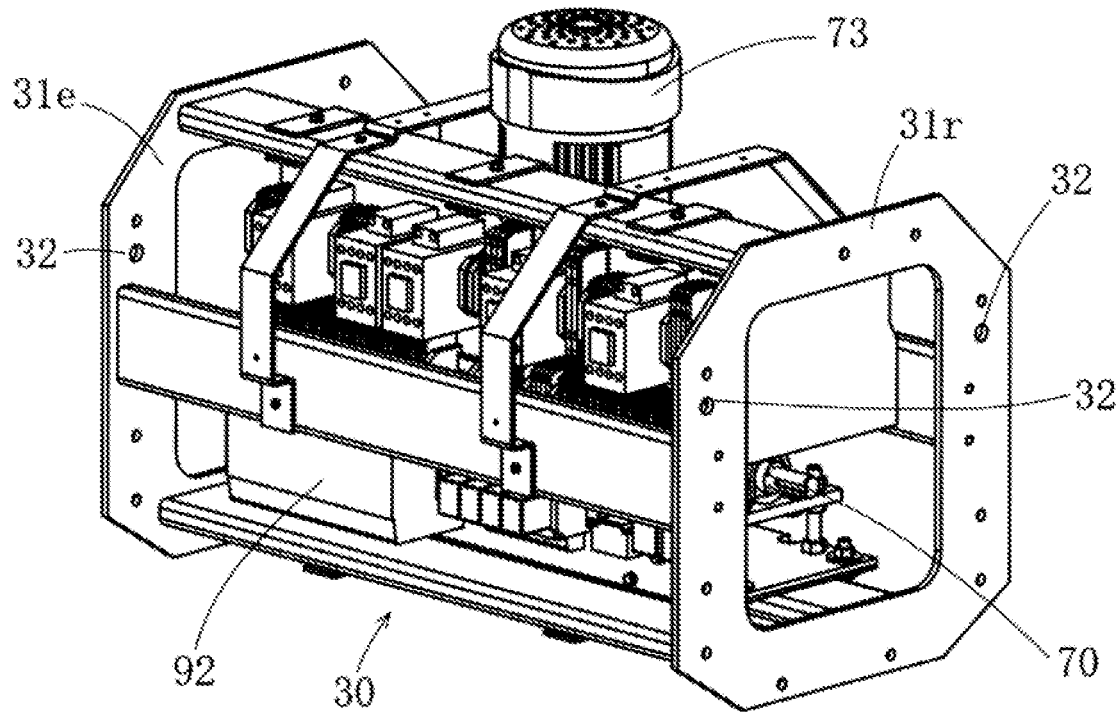
FIG. 14 is a perspective view of one embodiment of a frame of a connecting structure in which the travel power unit and the control unit are mounted.
Figure 15:
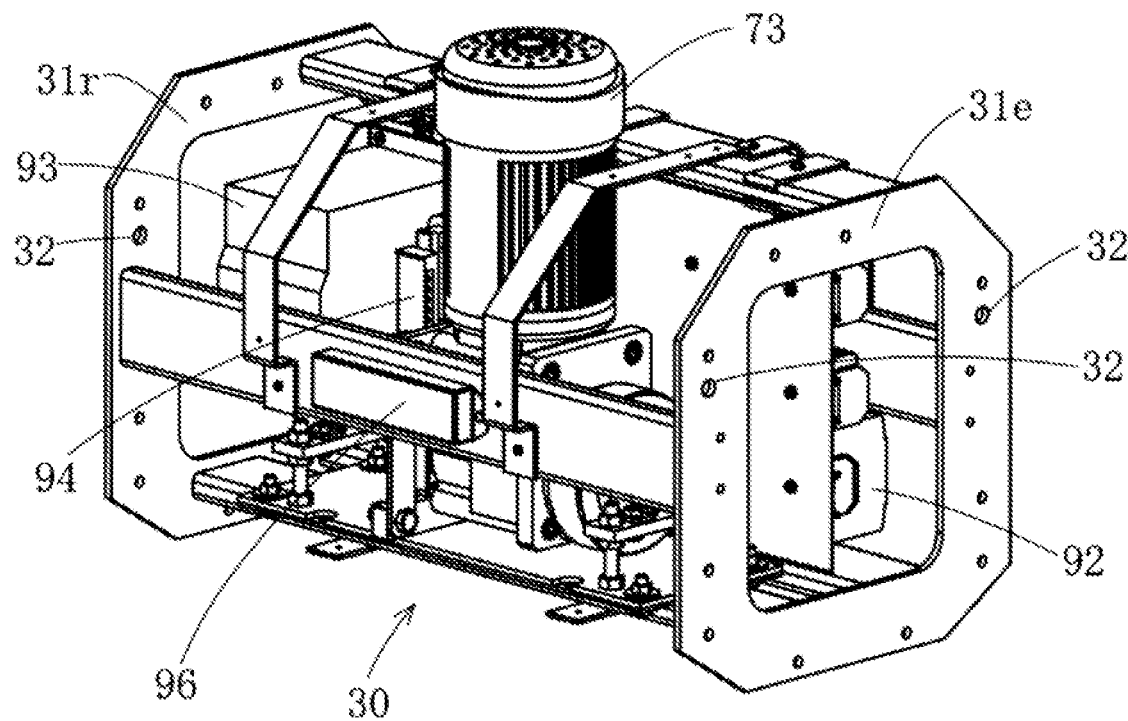
FIG. 15 is a perspective view of the frame of the connecting structure shown in FIG. 14, seen from a different angle.

Two alignment pins 24 are installed on the left top base 21*e*. The alignment pins are also installed on the right top base but they are hidden in the figure. These pins mate with alignment holes 32 which are provided on the end plate 31*e* and 31*r* of the connecting structure frame 30. The alignment holes are also shown in FIG. 14 and FIG. 15. An application of alignment pins and holes removes re-alignment works during re-assembling works, when the gantry-shape carriage is dismantled into the leg structures and the connecting structure for its transportation after completion of the assembling and alignment works. By the provision, a size of packing of the gantry-shape carriage for its transportation becomes compact. It makes easy to bring the dismantled gantry-shape carriage into a narrow indoor space.

The junction of the top base 21*e* of the left leg structure frame 28*e* and the left end plate 31*e* of the connecting structure frame 30 is a joint of two planes facing each other. In the same way, the junction of the top base 21*r* of the right leg structure frame 28*r* and the right end plate 31*r* of the connecting structure frame 30 is a junction of two planes facing each other. The left and right leg structure frames and the connecting structure frame are firmly connected with the effect of the junction of two planes butting each other.

Generally speaking, the width of staircases and corridors of ordinary houses is necessary minimum and narrow. When the left and right leg structures are provided as disclosed in the present invention, making thickness of the leg structure thin becomes an important requisite. As a solution to fulfill the requisite, the leg structure frame comprises the top base, the connecting column and the bottom base. With the solution, which is shown in FIG. 6, parts are placed on both sides of the bases in order to avert conflicts among parts, and placement of bearing housings is devised to pierce the bases. As a result, the thickness of the leg structures becomes thin.

Wires and a cable are placed through square pipes of the connecting column. A chain loop which transmits travel power, and a connecting rod which transmits the lifting power of the lift step, are positioned in a space formed between the two square pipes of the connecting column 22.

The current chair-type stair lifts generally place their travel power sources under chairs. In the present invention, a geared motor with brake 73 (Refer to FIG. 11), which is a travel power source of the gantry-shape carriage, is placed in the connecting structure frame 30. A cage like frame shape is quite suitable to place the travel power source. This arrangement of the travel power source averts drawbacks of the platform-traction-type stair lifts of which travel power source protrudes in the outside of a staircase.

Figure 35:
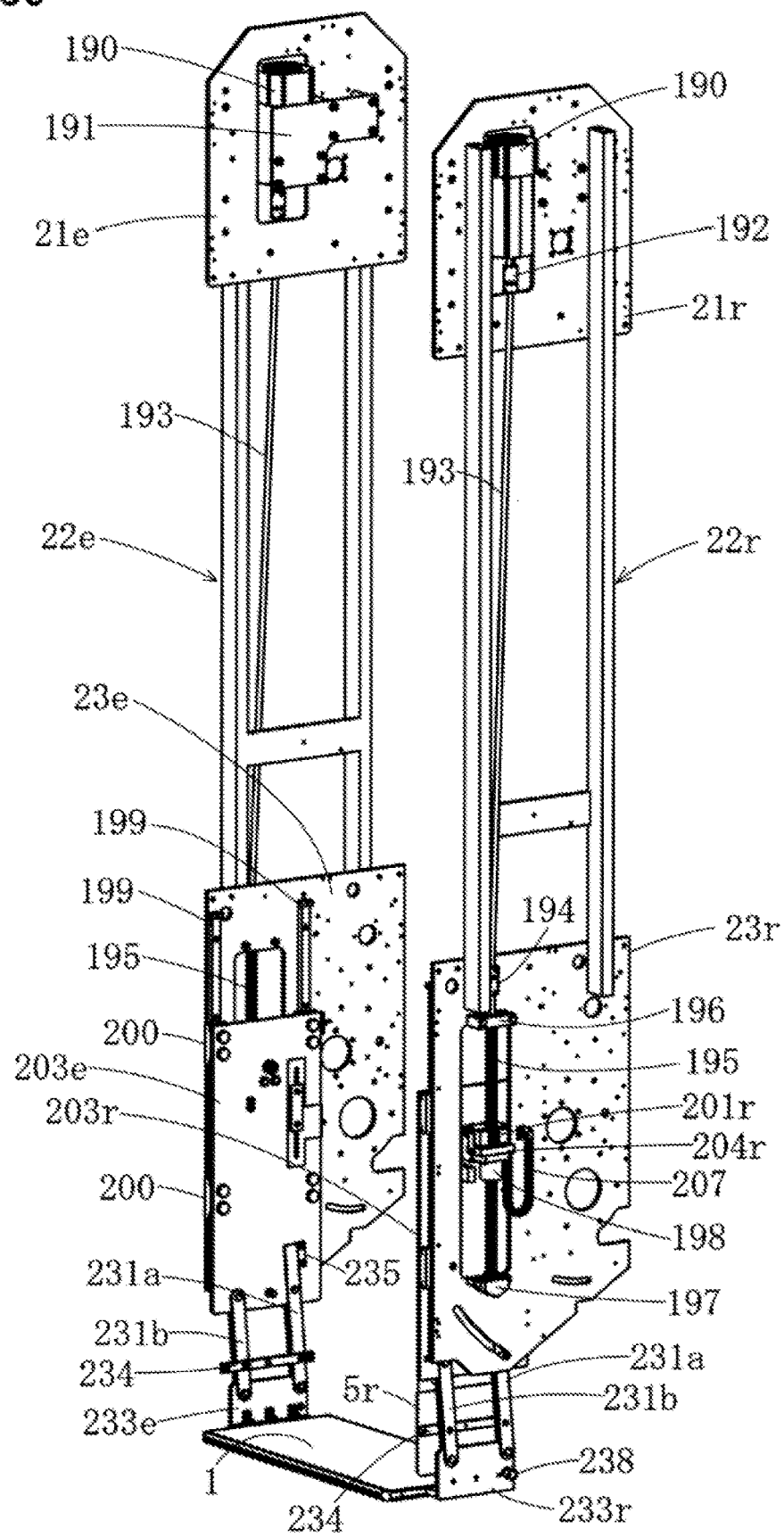
FIG. 35 is a perspective view to explain a lifting mechanism of the lift step.

A geared motor with brake 190 (Refer to FIG. 6. FIG. 35), which is a lifting power source of the lift step, is placed on the top base 21 of the leg structure frame. With the placement, a set of lifting mechanisms is mounted on the leg structure frame 28. The placement, which simplifies works of disconnecting and assembling of the leg structures and the connecting structure, is very convenient for transportation of the gantry-shape carriage.

A stair angle varies in accordance with a specification of a staircase. The bogie base 40 is mounted on the leg frame 20 so that the gantry-shape carriage stands vertically. The design of this embodiment adopts a chain 60 (Refer to FIG. 9) disposed along a bottom chain-support-cum-stabilizer rail 57 (Refer to FIG. 9) as a traction rail, and a pin-gear sprocket 111 (Refer to FIG. 16) as a travel driving wheel. The gantry-shape carriage is driven by the rotations of the pin-gear sprocket meshing with the chain.

The travel power is transmitted from parts mounted on the leg frame to a drive shaft of the travel driving wheel. It is not preferable that a relative position of the drive shaft of the travel driving wheel and the leg frame varies in response to a mounting angle of the bogie base. The bogie base 40 is connected to the leg frame 20 via a bearing housing 108 (Refer to FIG. 8) of the drive shaft of the travel driving wheel, wherein the bearing housing is axle of rotation of the bogie base. The mounting angle of the bogie base 40 on the leg frame 20 is adjustable. The relative position of the drive shaft of the travel driving wheel and the leg frame does not change in response to the change of the mounting angle of the bogie base.

Figure 8:
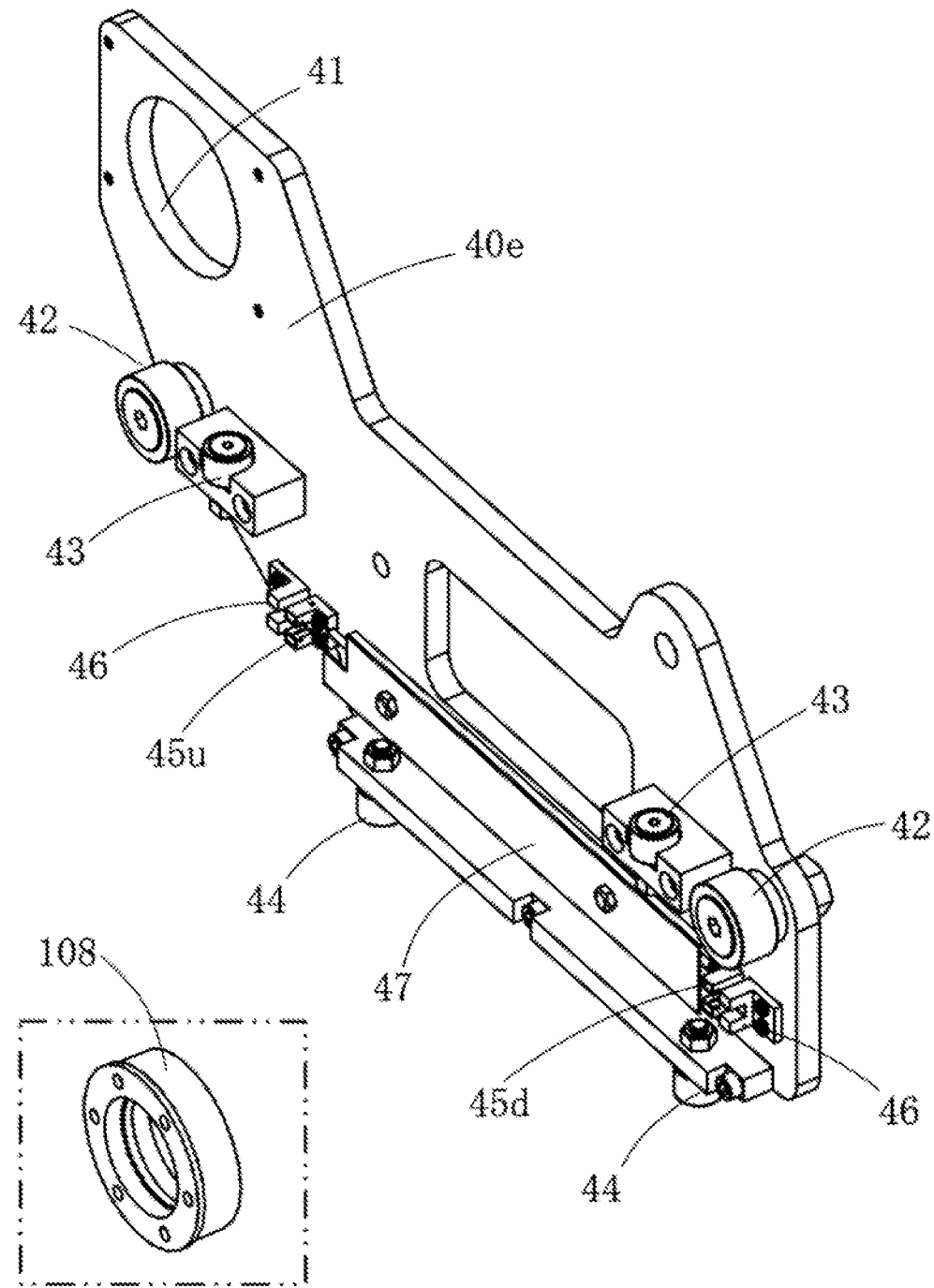
FIG. 8 is a perspective view of one embodiment of the left bogie of the gantry-shape carriage. (Embodiment 1, 2, 3)

FIG. 8 shows the left bogie. The bearing housing 108 of the pin-gear sprocket shaft is fitted in a bearing hole 41. For reference, the bearing housing 108 of the pin-gear sprocket shaft is shown inside of the closed two dotted line. Travel wheels 42, outward deflection stopper rollers 43 of the left leg structure, inward deflection stopper rollers 44, an upper floor side position sensor 45u, a lower floor side position sensor 45d, sensor protectors 46, and a sensor cable cover 47 are mounted on the left bogie base 40e. Cam followers are used for the wheels and rollers.

Figure 9:
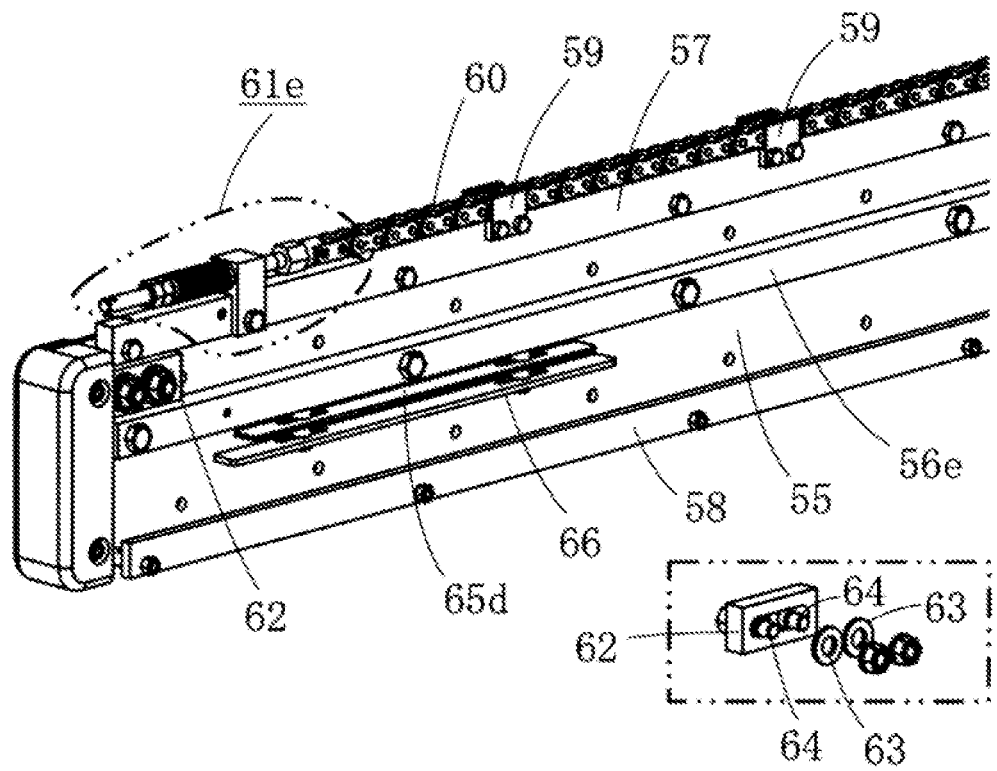
FIG. 9 is a perspective view of one embodiment of a bottom end of the left rail. (Embodiment 1,2,3)

FIG. 9 is a perspective view of an end portion of the lower floor side left rail seen from the inside of the staircase. A left bottom travel rail 56e and a bottom chain support-cum-stabilizer rail 57 are assembled on a bottom rail base 55. The travel wheel 42 runs in a gap between the bottom travel rail 56e and the bottom chain support-cum-stabilizer rail 57. This arrangement prevents the gantry-shape carriage from toppling backward and forward. The outward deflection stopper roller 43 is positioned in a gap between the bottom travel rail 56e and the bottom chain support-cum-stabilizer rail 57 and rolls on a surface of the bottom rail base 55 so that it prevents the left leg structure from deflecting outward.

A bottom inward deflection stopper rail 58 that prevents the left leg structure from deflecting inward is assembled on the bottom rail base 55. The inward deflection stopper roller 44 mounted on the left bogie is positioned in a gap between the bottom rail base 55 and the bottom inward deflection stopper rail 58, and rolls on a surface of the inward deflection stopper rail 58 so that it prevents the left leg structure from deflecting inward.

The chain 60 is disposed on the bottom chain support-cum-stabilizer rail 57. A chain guide 59 prevents the chain from coming off the bottom chain support-cum-stabilizer rail 57. A chain puller 61e is provided in order to absorb the expansion and contraction of the chain due to the chain loading.

A buffer stop 62 is assembled on the bottom rail base 55. An enlarged view of the buffer stop mechanism is shown in a rectangular area encircled by a two dotted line. A bolt hole of the buffer stop 62 is an oblong hole. The configuration of the buffer stop is as follows. The buffer stop 62 is attached on the bottom rail base 55. A Belleville spring 63 is stacked on the buffer stop 62. They are fastened with a nut and a shoulder bolt 64 which preloads the Belleville spring. If the travel wheel 42 should hit the buffer stop 62, the friction between the bottom rail base 55 and the buffer stop 62 will reduce an impact of the collision. Instead of using a chain and a sprocket, a rack as a traction rail and a pinion as a pin-gear sprocket can be adopted. In this embodiment, the chain and sprocket system is adopted on a basis of cost consideration.

The lower floor side stop-position-target 65d mounted at the end of the left bottom travel rail 56e is protected by a sensor target protector 66. In this embodiment, the lower floor side stop-position-target 65d is mounted on the left rail. The upper floor side stop-position-target 65u is mounted at the top of the right rail. (Refer to FIG. 50, FIG. 51). By this arrangement, the control system can firmly recognize the position where the gantry-shape carriage is, either the upper end or the lower end of the staircase, by checking the side, either left or right, of the bogie on which a detecting sensor is mounted. Since the control methods of the lift step at the upper floor stop-position and at the lower floor stop-position are different, it is important to distinguish between the upper floor stop and the lower floor stop.

The reason why the upper floor side position sensor 45u and the lower floor side position sensor 45d are provided on a bogie is explained with an example of movements of the gantry-shape carriage which travels downwards and stops at the bottom end of a rail. The left rail is taken as an example. The gantry-shape carriage travels downwards and the lower floor side position sensor 45d detects the lower floor side stop-position-target 65d. The gantry-shape carriage starts reducing its downward travel speed based on the detected signal. The gantry-shape carriage continues to travel downwards while reducing its speed. When the upper floor side position sensor 45u detects the lower floor side stop-position-target 65d, then the gantry-shape carriage stops its traveling.

Figure 11:
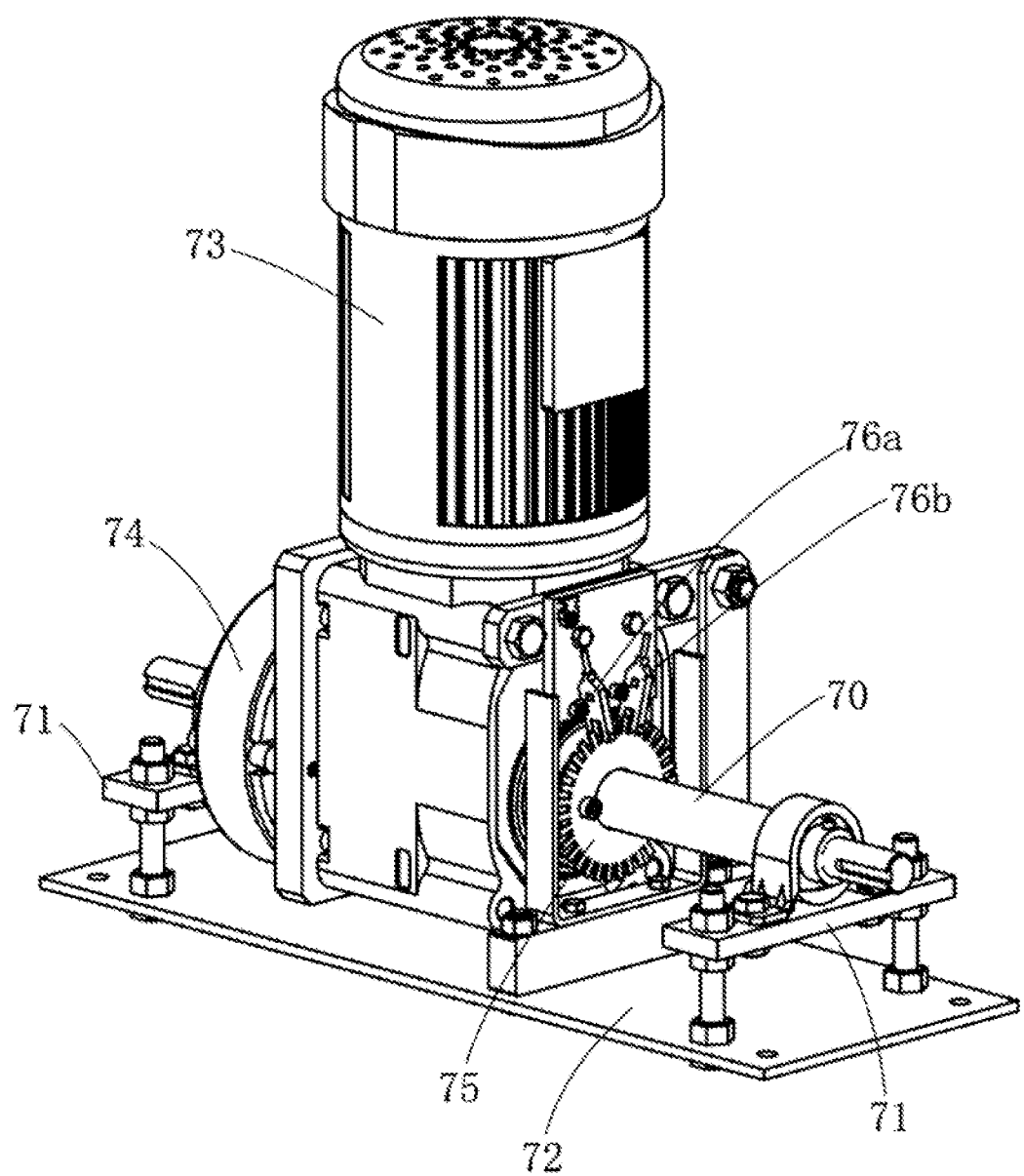
FIG. 11 is a perspective view of one embodiment of a travel power unit.

In addition, the travel power unit of this embodiment provides an encoder (Refer to FIG. 11). The number of pulses counted from the time when the lower floor side position sensor 45d detects the lower floor side stop-position-target 65d can be utilized to assist the travel stop operation. The travel position information can be managed with the number of pulses detected by the encoder. However, in this embodiment, it is necessary to take into account of the chain expansion due to loads, therefore, the utilization of the encoder is particularly effective for short distance measurements.

Figure 10:
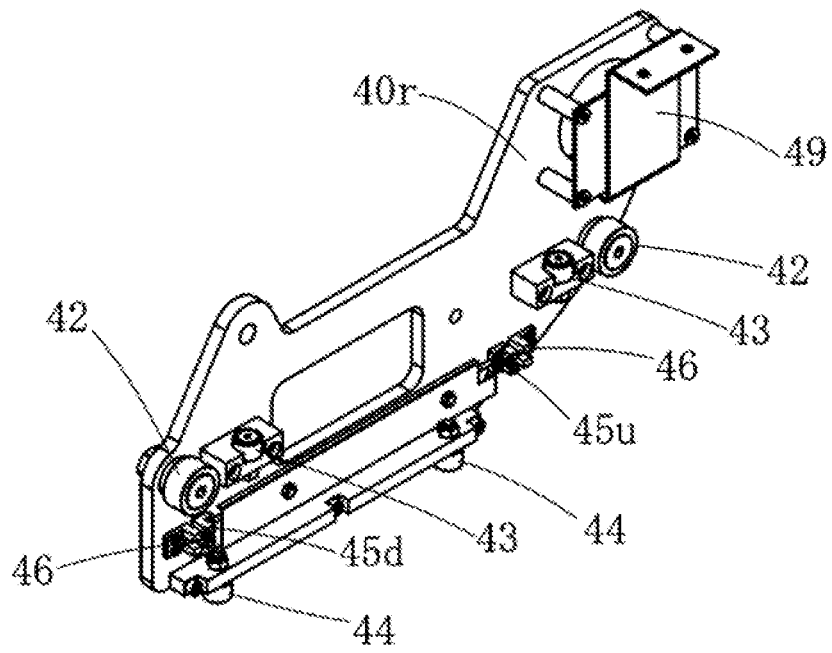
FIG. 10 is a perspective view of one embodiment of the right bogie. (Embodiment 1,2,3)

FIG. 10 shows the right bogie. The right bogie design is a mirror image of the left bogie design except an addition of a cable chain bracket 49. Further, in this embodiment, the left bogie base 40e also provides threaded holes to mount the cable chain bracket 49. It is for the standardization of the bogie bases.

FIG. 11 shows the travel power unit. Electric wires and sensor cables are not shown. In this embodiment, the geared motor with brake 73, which is driven by a three-phase induction motor, is adopted in order to make the travel speed of the gantry-shape carriage be equivalent to that of escalators. It is apparent that type of motors, such as AC, DC. Battery drives can be used in accordance with specifications of stair lifts.

Figure 17:
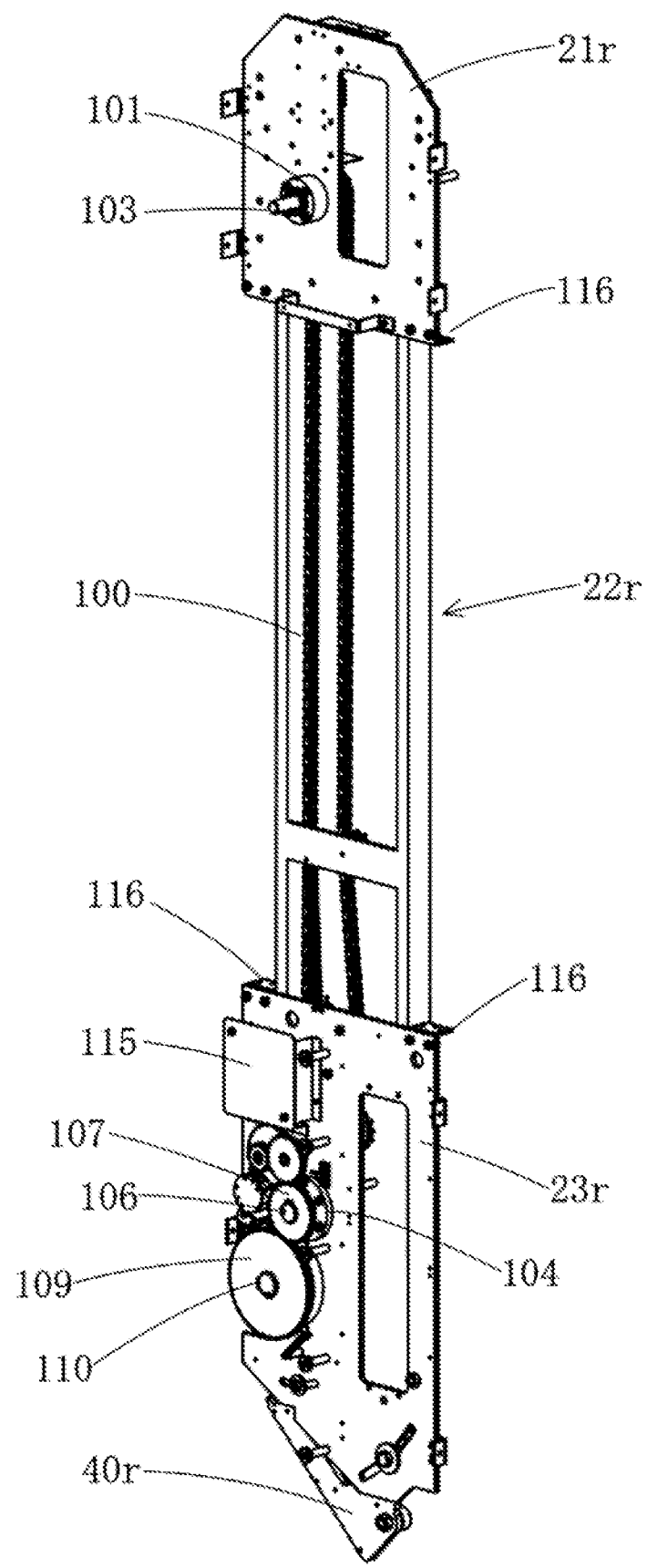
FIG. 17 is a perspective view of the travel drive mechanism shown in FIG. 16, seen from a different angle.

The position of a travel power output shaft 70 is adjustable for the purpose of aligning axles of a coupling that connects the travel power output shaft 70 and a drive sprocket shaft 103 (Refer to FIG. 17). The height of the travel power output shaft is adjusted by positions of mounting nuts of a bearing unit support 71. The horizontal position is adjusted when a travel power unit base 72 is mounted on the travel power unit mounting base 33. A travel power unit mounting hole 34 (Refer to FIG. 7) is an oblong hole for the adjustment. An electromagnetic power off brake 74 is provided for, as a primary objective, a countermeasure against an unexpected breakdown fault of a gear box of the geared motor with brake 73.

A slit disk 75 is mounted on the travel power output shaft 70 in order to measure the rotating direction, speed, and number of rotations of the travel power output shaft 70. Two sensors 76a and 76b, which detect the slits, are mounted so that their outputs have a 90 degrees phase shift. The slit disk 75 and two sensors 76a, 76b compose an encoder. Number of pulses detected can be utilized for stop position control. A falling down fault of the gantry-shape carriage caused by a breakdown of a gearbox can be detected by measurements of the direction and the speed of the output shaft. In such a case, the falling down fault can be averted by an activation of the electromagnetic power off bare 74.

Figure 12:
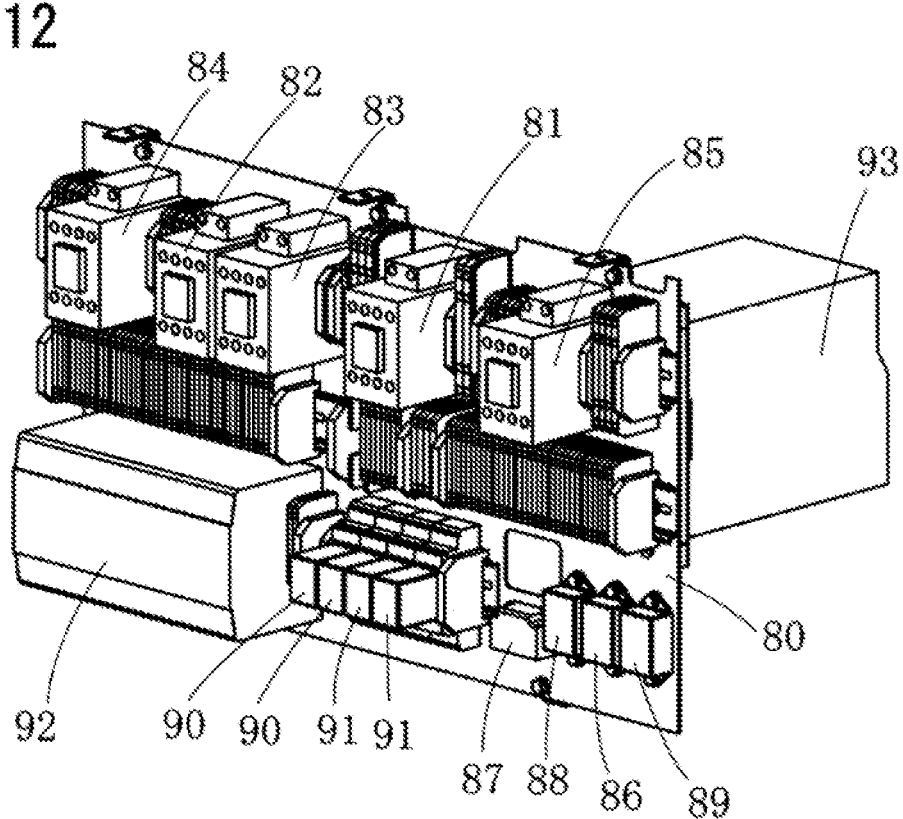
FIG. 12 is a perspective view of one embodiment of a control unit.

FIG. 12 is a perspective view of control apparatus mounted on a control panel base 80. Wires are not shown. A main magnetic contactor 81 which connects the main power supply, a magnetic contactor 82 which controls the geared motor with brake of the travel power source, a magnetic contactor 83 which controls the electromagnetic power off brake, a magnetic contactor 84 which controls the geared motor with brake for lifting the left side of the lift step, a magnetic contactor 85 which controls a geared motor with brake for lifting the right side of the lift step, a brake power rectifier 86 of the geared motor with brake of the travel power source, a power supply rectifier 87 of the electromagnetic power off brake, a brake power rectifier 88 of the geared motor with brake for lifting the left side of the lift step, a brake power rectifier 89 of the geared motor with brake for lifting the right side of the lift step, an interposing relay 90 which inputs on-off signals of the footswitch into the control apparatus, an auxiliary relay 91, a programmable logic controller 92, terminal blocks, and fuses are mounted on the control panel base.

Figure 13:
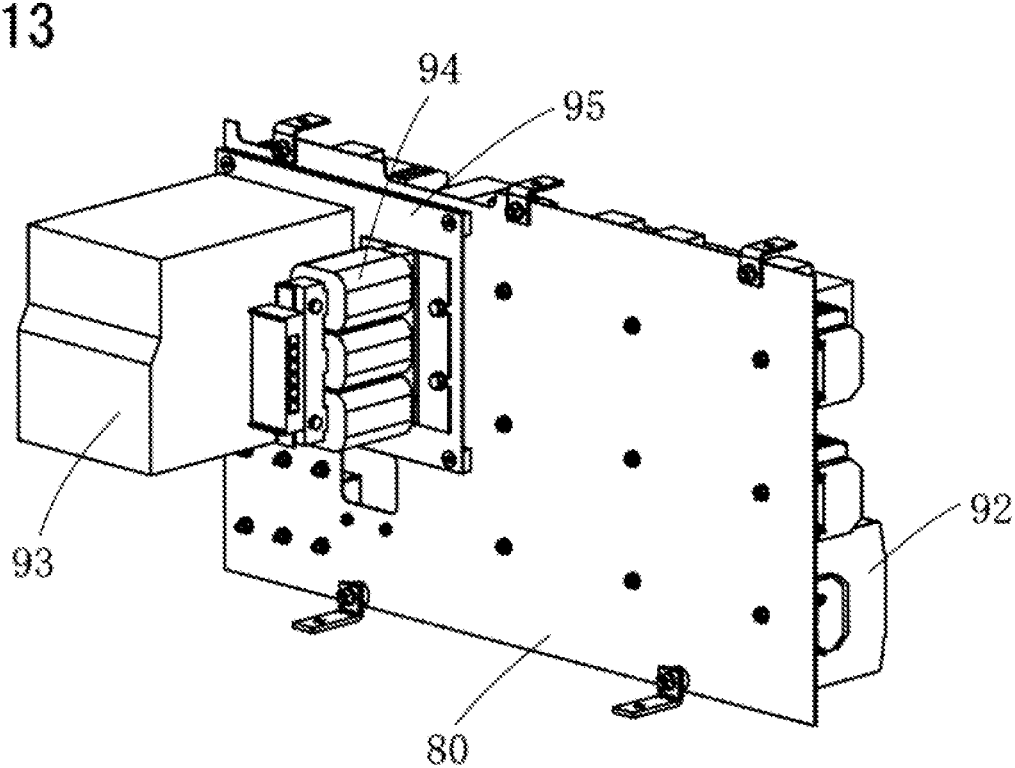
FIG. 13 is a perspective view of the control unit shown in FIG. 12 seen from a different angle.

FIG. 13 is a rear view of the control panel base 80 shown in FIG. 12. Wires are not shown. A single-phase input, three-phase output inverter 93 and an inverter reactor 94 are mounted on an inverter panel base 95. The reason why the inverter and the inverter reactor are mounted on the inverter panel base 95 is for convenience of the assembly work which assembles them in the connecting structure frame 30.

FIG. 14 is a perspective view of the travel power unit (Refer to FIG. 11) and the control apparatus (Refer to FIG. 12, FIG. 13) assembled in the connecting structure frame 30. Wires are not shown. FIG. 15 is a perspective view of the equipment shown in FIG. 14 seen from a different point of view. The single-phase input, three-phase output inverter 93 and the inverter reactor 94 are placed above the travel power output shaft 70. A brake resistor 96 is directly mounted on the connecting structure frame 30.

Figure 16:
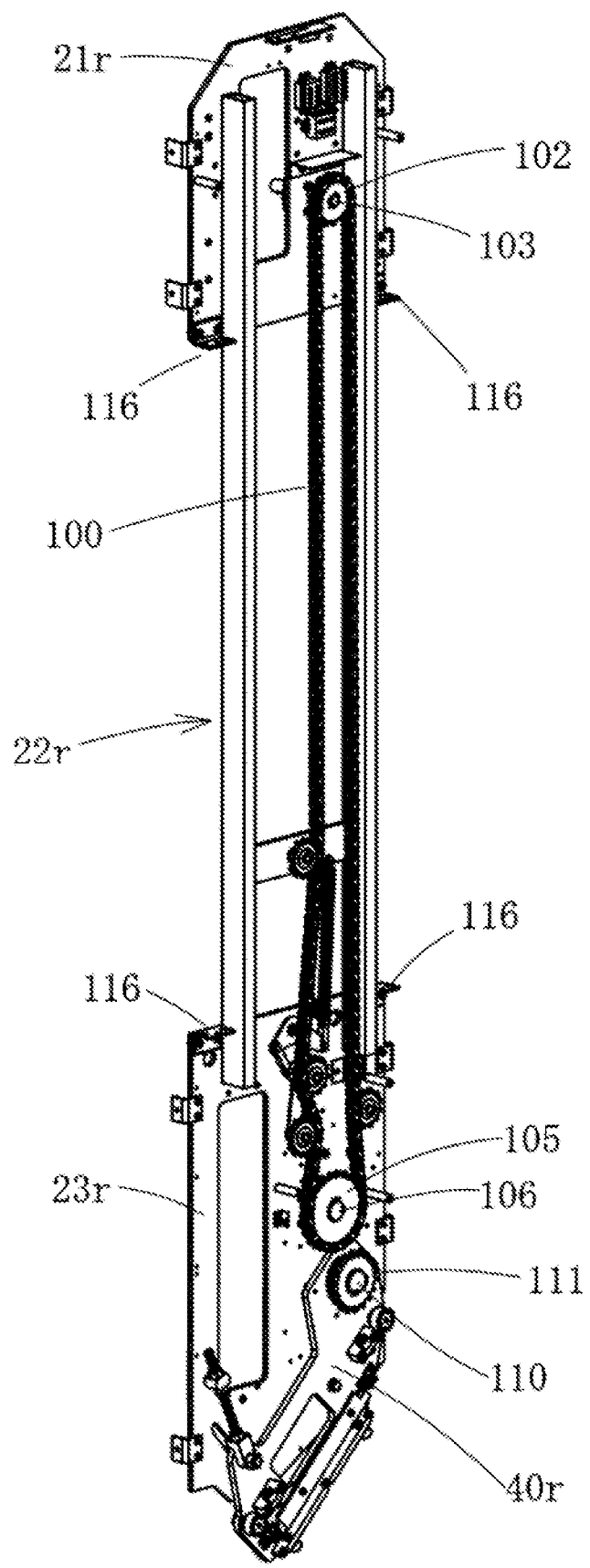
FIG. 16 is a perspective view of one embodiment of a travel drive mechanism mounted on a frame of the right leg structure.

The travel drive mechanism provided in the leg structure is detailed in the following. The travel drive mechanisms provided in the left and right leg structures are in a mirror image relation each other, therefore the travel drive mechanism provided in the right leg structure is explained. FIG. 16 is a perspective view of the travel drive mechanism mounted on the right leg structure frame 28r (Refer to FIG. 7). FIG. 17 is a perspective view of the mechanism shown in FIG. 16 seen from a different point of view. Parts which are not relevant to the explanation are not shown in order to avoid complexity of the drawing. Please refer to FIG. 6.

Figure 18:
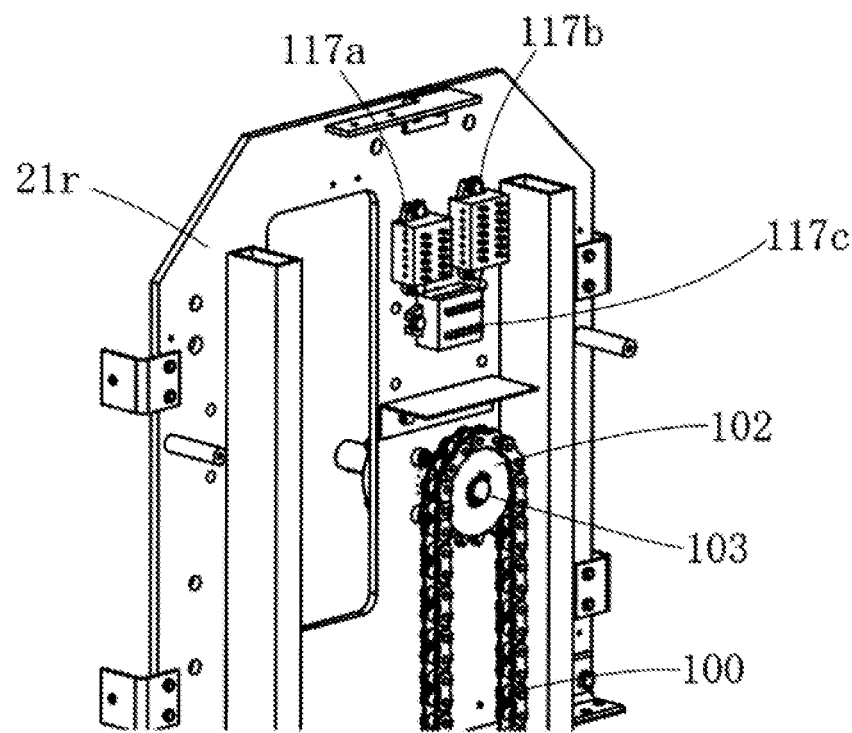
FIG. 18 is a partially enlarged view of a top base shown in FIG. 16.
Figure 19:
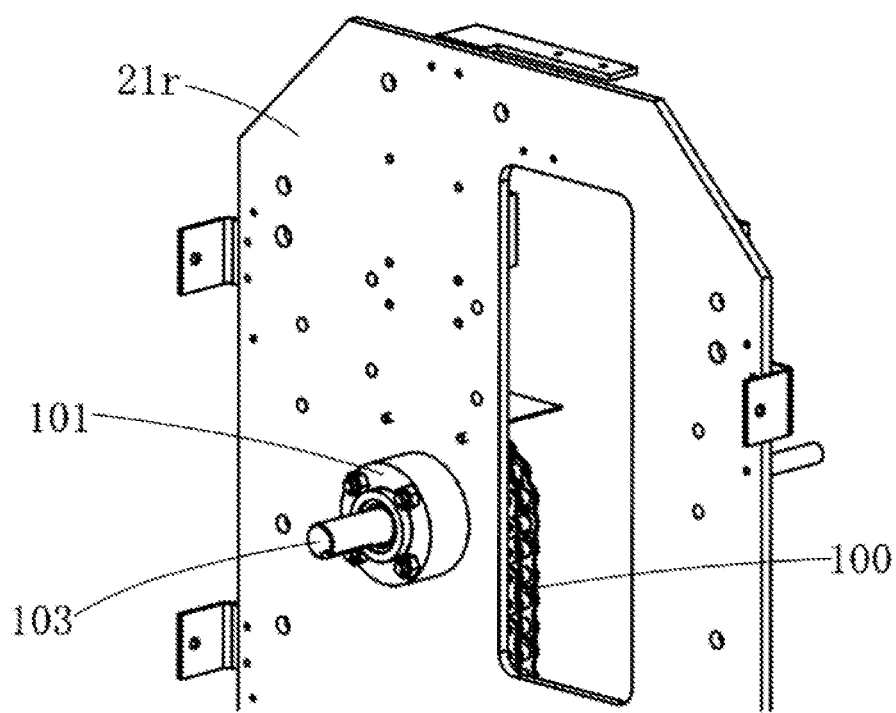
FIG. 19 is a partially enlarged view of the top base shown in FIG. 17.

FIG. 18 is a partially enlarged view of the top base 21r shown in FIG. 16. FIG. 19 is a partially enlarged view of the top base 21r shown in FIG. 17. A drive sprocket 102 is mounted on a drive sprocket shaft 103. The drive sprocket 102 and a chain loop 100 are placed in a gap between the two columns of the connecting column 22r. A bearing housing 101 of the drive sprocket shaft 103 pierces the top base 21r and is mounted on it. The drive sprocket shaft 103 is connected to the travel power output shaft 70 (Refer to FIG. 11) with a coupling which is not shown.

Figure 20:
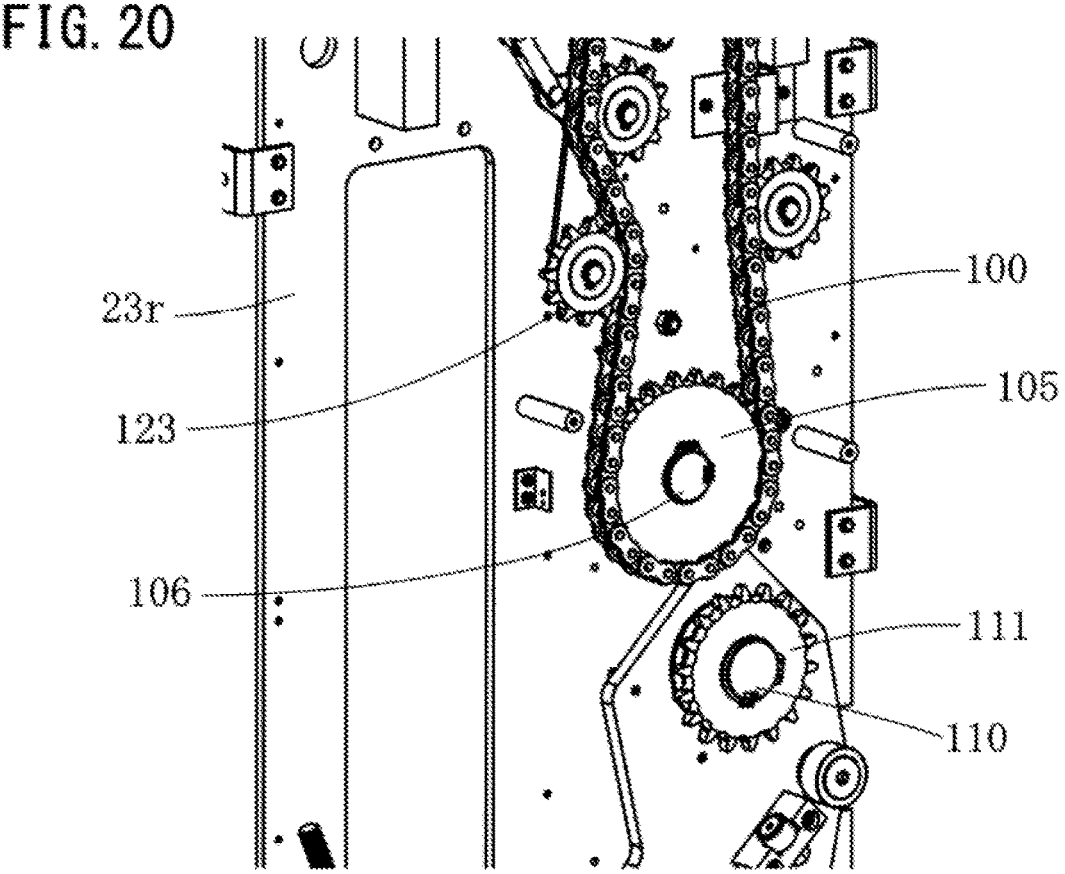
FIG. 20 is a partially enlarged view of a bottom base shown in FIG. 16.

FIG. 20 is a partially enlarged view of the bottom base 23r shown in FIG. 16. A driven sprocket 105 is mounted on a driven sprocket shaft 106. A pin-gear sprocket 111 is mounted on a pin-gear sprocket shaft 110.

Figure 21:
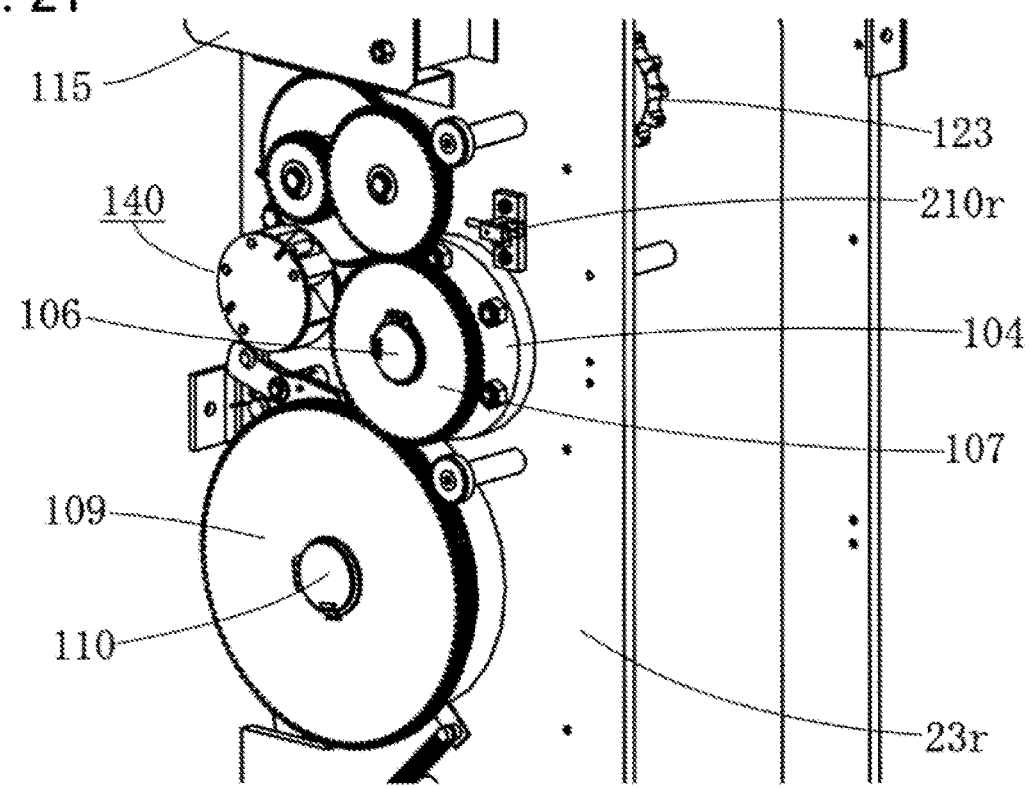
FIG. 21 is a partially enlarged view of the bottom base shown in FIG. 17.

FIG. 21 is a partially enlarged view of the bottom base 23r shown in FIG. 17. A bearing housing 104 of the driven sprocket shaft 106 pierces the bottom base 23r and is mounted on the base. A drive gear 107 is mounted on the driven sprocket shaft 106. A driven gear 109 is mounted on the pin-gear sprocket shaft 110. The bearing housing 108 (Refer to FIG. 8, FIG. 24) of the pin-gear sprocket shaft 110 pierces the bottom base 23r and mounted on the base. Wires gathered in the junction box 115 (Refer to FIG. 17) are pulled to the top base 21r through the connecting column 22r. Terminal blocks 117a. 117b and 117c are provided for relaying the wires (Refer to FIG. 18).

When the drive sprocket 102 rotates the chain lop 100, the driven sprocket 105 rotates, in consequence, the drive gear 107 mounted on the driven sprocket shaft 106 rotates. When the drive gear 107 rotates, the driven gear 109 which meshes with the drive gear 107 rotates. When the driven gear 109 rotates, the pin-gear sprocket 111 mounted on the pin-gear sprocket shaft rotates, in consequence, the gantry-shape carriage travels.

An arrangement of the chain loop 100, the driven sprocket 105, the bearing housing 104, the drive gear 107, the driven gear 109, the bearing housing 108, and the pin-gear sprocket 111 is devised to fulfil the following demands.

(1) A rail shall be installed at a position close to a side edge of staircase step as close as possible so that the rail does not hinder an ordinary walking through the staircase.

(2) A distance between the left and right leg structures of the gantry-shape carriage shall be made wide as much as possible.

To install the rail at a position close to a side edge of staircase step as close as possible is equivalent to make a distance between the left and right travel wheels as wide as possible. In order to make the distance between the left and right leg structures as wide as possible, it is necessary to make the thickness of the leg structure thin. It is specifically necessary to make the thickness of the portion of the gantry-shape carriage, wherein the portion corresponds to an upper body of a user.

For instance, if a travel power transmission chain loop directly drives a travel driving wheel, then the following drawbacks arise.

(a) If the chain loops are placed at the inside of the travel driving wheels, then a distance between the left and right chain loops becomes shorter than a distance between the left and right travel driving wheels. In consequence, a distance between the left and right leg structures becomes narrow and the above condition (2) cannot be fulfilled.

(b) If the chain loops are placed at the outside of the travel driving wheels, then a distance between the left and right travel driving wheels becomes narrow. In consequence, a distance between the left and right rails becomes narrow and the above condition (1) cannot be fulfilled.

(c) If the chain loops are placed at the inside of the travel driving wheels, for instance, at the lift step side of the bottom base 23, then a countermeasure to prevent conflicts between the chain loops and the lifting mechanisms of the lift step becomes an additional requisite and the fulfilment of the above condition (2) becomes more difficult.

As shown in FIG. 16 and FIG. 17, the mechanism which arranges bearing housings 104 and 108 piercing the bottom base 23r has an effect to avert the drawbacks mentioned above. Namely, the travel power transmission chain loop is placed almost right above the pin-gear sprocket which is the travel driving wheel. The above (1) and (2) conditions are satisfied by the arrangement. An effect which prevents the conflicts between the travel drive mechanism and the lifting mechanism of the lift step is also recognized.

A chain tensioner provided for the chain loop 100 is detailed in the following. The tension always acts on the chain loop 100 because the gravity acts on the gantry-shape carriage. The right side of the chain loop 100 shown in FIG. 20 is always the tension side regardless of travel directions of the gantry-shape carriage, such as going up or down. The chain tensioner is provided at the slack side, i.e., the left side of the chain loop 100. The chain tensioner design is elaborated since the chain loop is arranged vertically.

Figure 22:
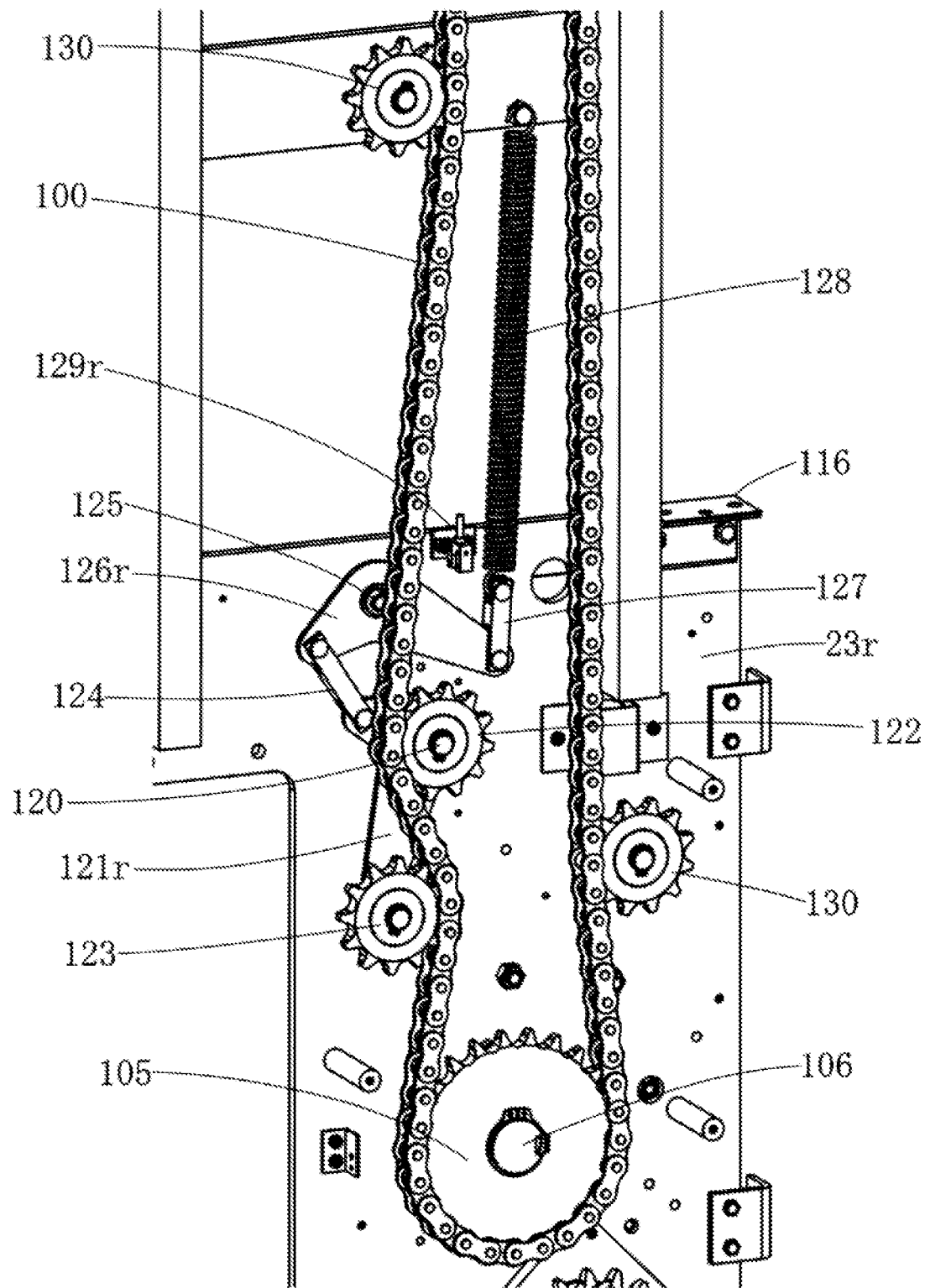
FIG. 22 is a perspective view of a chain tensioner mechanism mounted on the frame of the right leg structure.

FIG. 22 is a perspective view of the chain tensioner mechanism provided on the right leg structure. The devised chain tensioner provides a rotating arm 121r on which an idler sprocket 123 is mounted and rotates the rotating arm so that the idler sprocket pushes a part of the chain spanning between the driven sprocket 105 and an idler sprocket 122 inward. The design is effective to take up chain elongation by utilizing a narrow space effectively.

An application of an extension spring is elaborated as a drive power some of the rotating arm. According to a design which drives the rotating arm by the extension spring, the drive torque reduces as the rotating arm rotates in response to the chain elongation. Therefore, the alleviation of the reduction of the torque which rotates the rotating arm is elaborated. Namely, the extension spring drives a separately provided drive arm. The rotating an and the drive am are connected with a drive link. By the arrangement, the transmission of the driving torque is controlled and a reduction of the torque which rotates the rotating arm is alleviated.

The composition of parts of the chain tensioner is as follows. An axle 120 fixed on the bottom base 23r is the axle of the rotating arm 121r and the idler sprocket 122. The rotating arm 121 is shaped like a bell crank and the idler sprocket 123 is mounted at an end of an arm. The drive link 124 is connected to the other arm. An axle 125 fixed on the bottom base 23r is the axle of the drive arm 126r. The drive arm is shaped like a bell crank and an arm is connected to the extension spring 128 via a connecting member 127. The other arm is connected to the drive link 124. A chain elongation sensor 129r detects the drive arm 126r so that the chain elongation which reaches a preset value is detected. An idler sprocket 130 is provided to prevent interference between the chain loop 100 and other parts.

The force acting on the drive link 124 which pushes the rotating arm 121r is considered. The length of a perpendicular drawn from the center of the axle 125 to the center line of the extension spring 128 increases as the drive arm 126r rotates. Hence, the torque acting on the drive arm 126r does not reduce as much as a reduction of the tension of the extension spring 128 when the drive arm 126r rotates. When the drive arm 126r rotates, the length of a perpendicular drawn from the center of the axle 125 to a line passing the centers of two pins of the drive link 124 reduces. Hence, the force that pushes the drive link 124 in order to counter the torque acting on the drive arm 126r does not reduce as much as a reduction of the force calculated under an assumption that the length of the perpendicular is constant. On the other hand, the length of a perpendicular drawn from the center of the axle 120 to the line passing the centers of the two pins of the drive link 124 increases when the drive arm 126r rotates. Hence, the reduction of the torque which rotates the rotating arm 121r is alleviated. In consequence, the reduction of the chain tension in response to the chain elongation is effectively alleviated.

Figure 23:
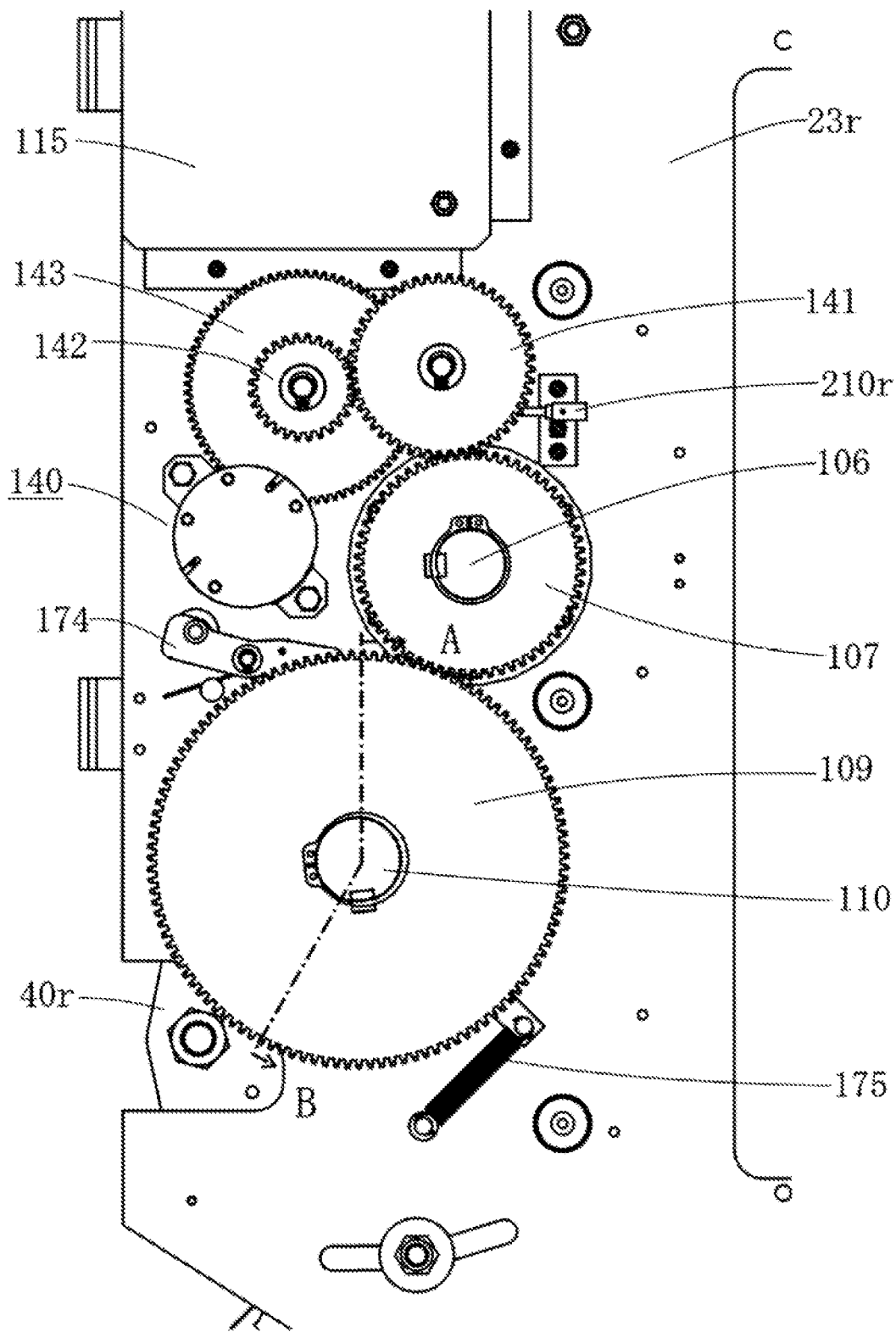
FIG. 23 is a side view of a portion of the right travel drive mechanism which is mounted on the bottom base, seen from the lift step side.

The mechanical emergency brake mechanism is described in the following. FIG. 23 is a side view of a portion of the travel drive mechanism which is provided in the right leg structure. The portion is a part of the mechanism mounted on the bottom base 23r. The view is seen from the lift step side. The drive gear 107 meshes with the driven gear 109 which drives the pin-gear sprocket 111 (Refer to FIG. 20). The drive gear 107, at the same time, meshes with a first speedup gear 141 which drives an overspeed detector 140. The first speedup gear 141 meshes with a second speedup gear 142. The second speedup gear 142 and a third speedup gear 143 are formed in one body. The third speedup gear 143 meshes with a drive gear 147 of the overspeed detector 140 (Refer to FIG. 28).

Figure 24:
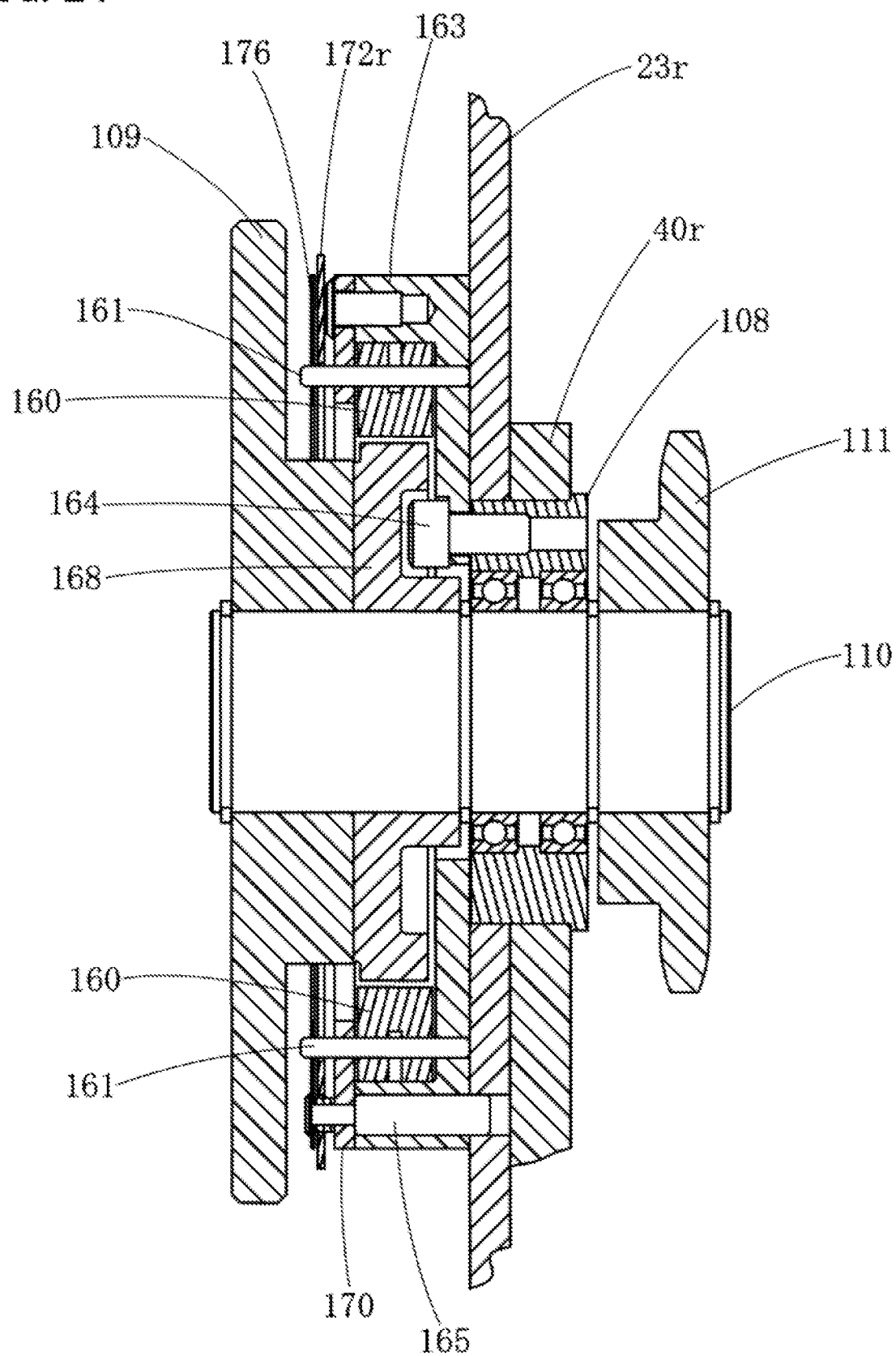
FIG. 24 is a cross-sectional view of a cross section indicated by A-B in FIG. 23.

FIG. 24 is an explanatory sectional view of the cross section which is indicated by a dotted line A-B in FIG. 23. An emergency brake mechanism is placed in a space between the bottom base 23r and the driven gear 109. A spring 162 (Refer to FIG. 26) which pushes a sprag 160 is not shown. The bogie base 40r and the bottom base 23r are sandwiched between a flange of the bearing housing 108 (refer to FIG. 8) of the pin-gear sprocket shaft and a brake base 163, and tightened by a bolt 164. The bearing housing 108 of the pin-gear sprocket shaft is also an axle of mounting angle adjustment between the bogie base 40r and the bottom base 23r. The relative position of the brake base 163 and the bottom base 23r is fixed by a whirl-stop pin 165.

Figure 25F:
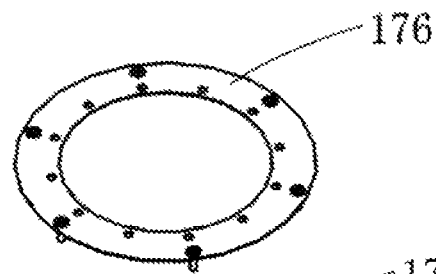
FIGS. 25A-25F are a perspective view of one embodiment of components of a mechanical emergency brake provided on the right bottom base.
Figure 25E:
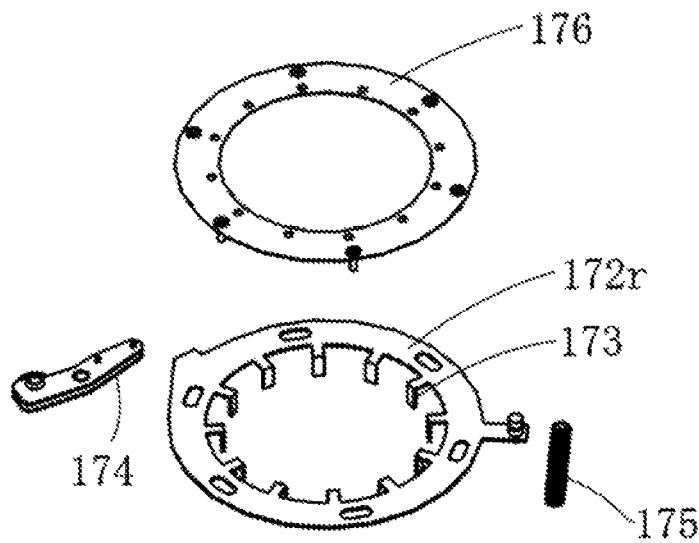
Figure 25D:
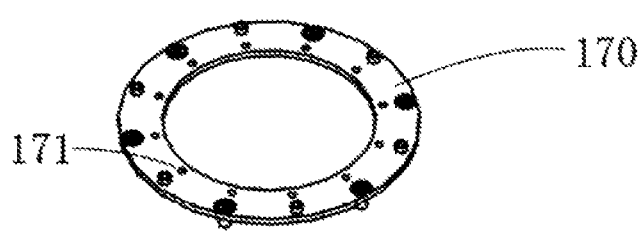
Figure 25C:
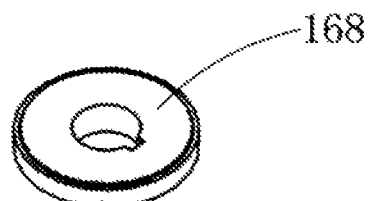
Figure 25B:
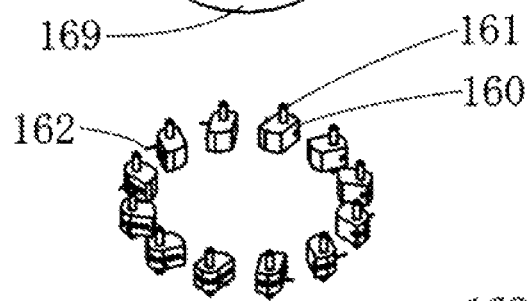
Figure 25A:
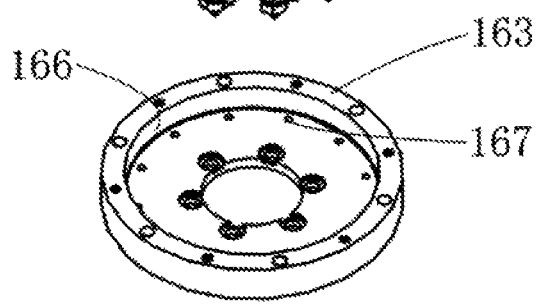
Figure 26:
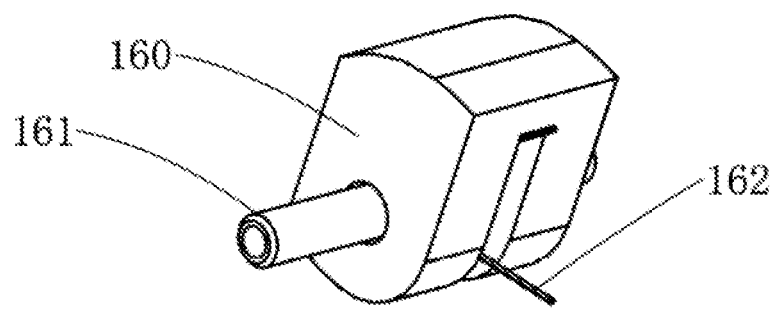
FIG. 26 is a perspective view of one embodiment of a sprag, a spring and a sprag axle.

FIGS. 25A-25F are an explanatory view of the dismantled components of the emergency brake mechanism. The emergency brake is activated under a state that the gantry-shape carriage travels downwards as if it were falling. FIG. 25A is a view of the brake base 163. The sprag 160 contacts an inner surface 166 of the circular portion. FIG. 25B is a view of the sprag 160, a sprag axle 161, and a sprag spring 162 placed in a circular arrangement. An enlarged view of the sprag 160 and the sprag spring 162 assembled on the sprag axle 161 is shown in FIG. 26. The diameter of the sprag axle 161 is smaller than that of an axle hole provided in the sprag 160, hence, sprag 160 can simultaneously contact the inner surface 166 of the circular portion of the brake base and a cylindrical outer surface 169 of a brake drum. The spring 162 pushes the sprag 160 so that the sprag 160 is capable to contact both the inner surface 166 of the brake base and the cylindrical outer surface 169 of the brake drum.

FIG. 25C is a view of the brake drum. The brake drum 168 is mounted on the pin-gear sprocket shaft 110 (Refer to FIG. 27). When the emergency brake is activated, the sprag 160 contacts the cylindrical outer surface 169 of the brake drum and the inner surface 166 of the circular portion of the brake base simultaneously and stops the rotation of the brake drum. FIG. 25D is a view of a lid 170 which provides axle holes 171 for supporting ends of the sprag axles 161. The other ends of the sprag axles are fixed in axle holes 167 provided on the brake base 163. The lid 170 is fixed on the brake base 163.

FIG. 25E is a view of a sprag retainer ring 172r, a latch 174, and an extension spring 175. The sprag retainer ring 172r provides the hook 173 which restricts the rotation of the sprag 160. While the sprag retainer ring 172r catches the sprag 160 with its hook 173 and turns against the force of the spring 162 which pushes the sprag 160, the contact between the sprag 160 and the cylindrical outer surface 169 of the brake drum is disconnected. The latch 174 keeps the sprag retainer ring 172r at the rotated position where the contact between the sprag 160 and the cylindrical outer surface 169 of the brake drum is disconnected. When the latch 174 is released, the extension spring 175 speeds up the rotation of the sprag retainer ring 172r and keeps the sprag retainer ring at a position where the rotation stops. FIG. 25 is a view of a brake cover 176. The sprag retainer ring 172r is positioned in a space between the brake cover 176 and the lid 170 which supports ends of sprag axles.

Figure 27:
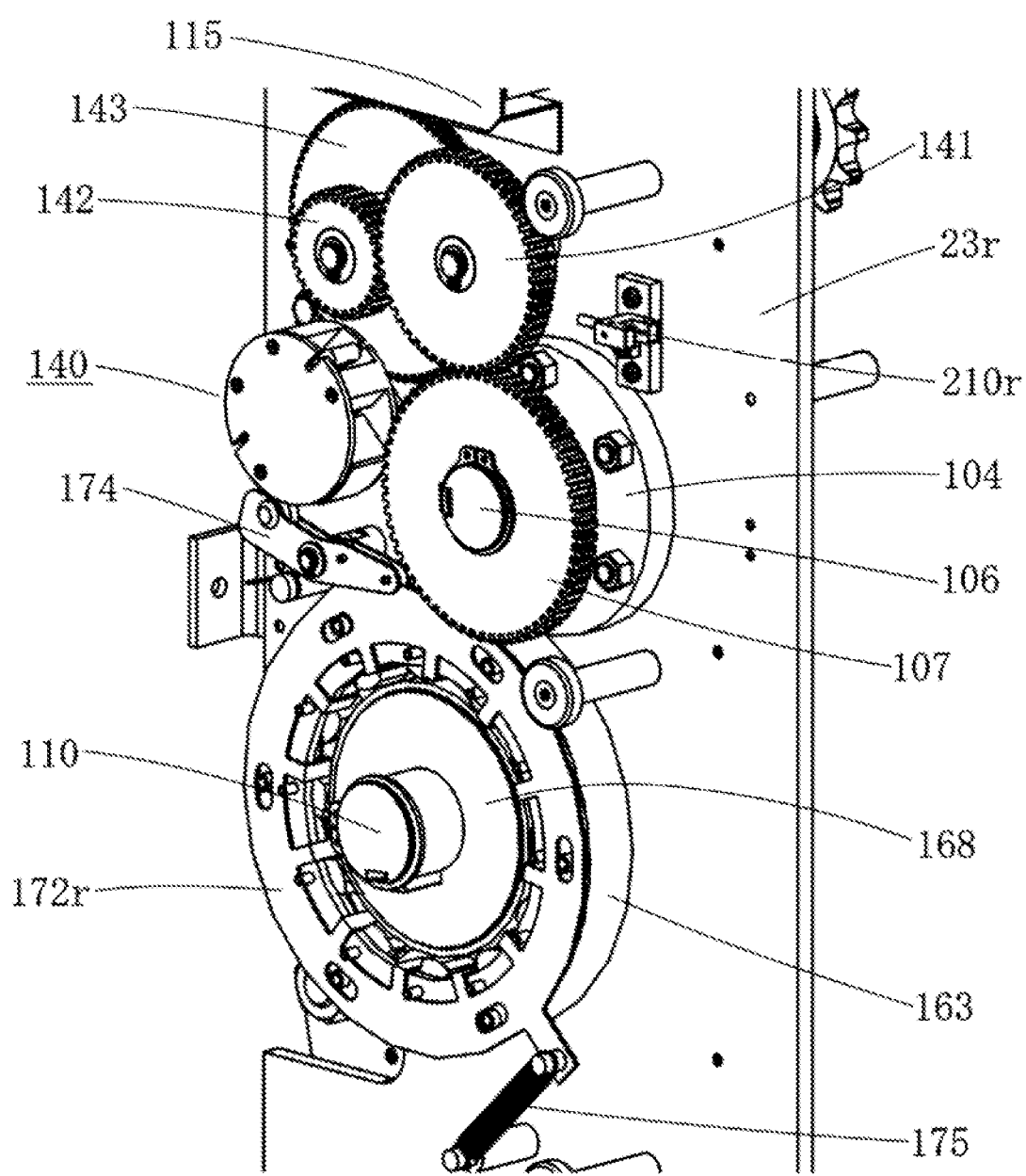
FIG. 27 is a perspective view of a portion of the right travel drive mechanism, which is mounted on the bottom base, seen from lift step side. For clarity of explanation, a driven gear mounted on a pin-gear sprocket shaft and a brake cover are removed and not shown in the figure.

FIG. 27 is a perspective view of the travel drive mechanism provided on the right bottom base 23r, seen from the lift step side. In order to explain a standby state of the emergency brake, the driven gear 109 (Refer to FIG. 23, FIG. 24) and the brake cover 176 (Refer to FIG. 24 FIGS. 25A-25F) are removed in the view. A speedup mechanism of the overspeed detector 140 (Refer to FIG. 28) is also shown. The drive gear 107 also meshes with the first speedup gear 141 which drives the overspeed detector 140. When the overspeed detector 140 is activated, the latch 174 is released by an impact brought by a hammer 155 (Refer to FIG. 29, FIG. 30).

When the latch 174 is released, the sprag retainer ring 172r is turned by the reactive force of the spring 162, which push the sprag 160, and the pulling force of the extension spring 175. The sprag 160 is pushed by the spring 162 and contacts both the cylindrical outer surface 169 of the brake drum and the inner surface 166 of the circular portion of the brake base and stops the rotation of the brake drum 168. The brake drum 168 is mounted on the pin-gear sprocket shaft 110. Hence, the rotation of the pin-gear sprocket 111, which is mounted on the pin-gear sprocket shaft 110, stops so that the gantry-shape carriage stops.

The mechanical type emergency brake mechanism detailed above adopts the sprag which acts directly on the drive shaft of the pin-gear sprocket which is the travel driving wheel. It is very much suitable to install in a narrow space.

Figure 28:
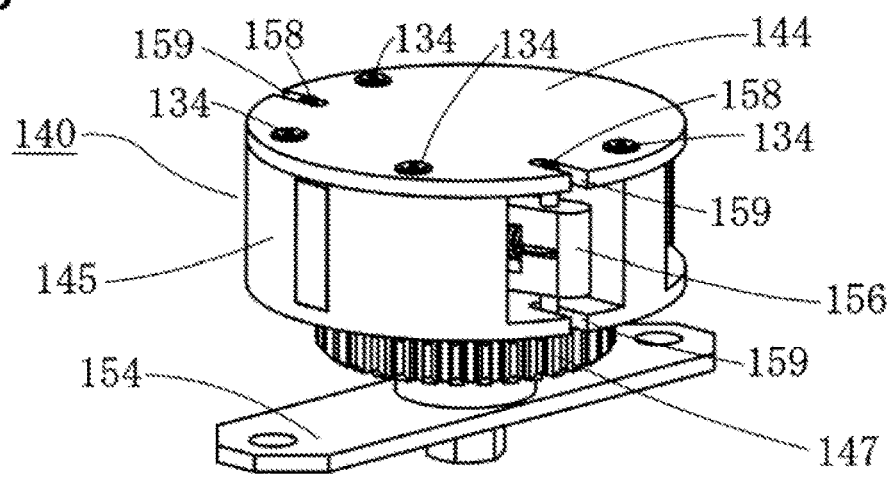
FIG. 28 is a perspective view of one embodiment of an overspeed detector.

The mechanical type overspeed detector 140 which release the latch 174 is described in the following. FIG. 28 is a view of the overspeed detector which is assembled as a unit on a mounting base 154. The drive gear 147 meshes with the third speedup gear 143 (Refer to FIG. 27). A casing lid 144 is screwed on a casing body 145 with fixing screws 134. A slot 159 in which an axle 158 slides is provided in the casing lid 144 and the casing body 145.

Figure 29:
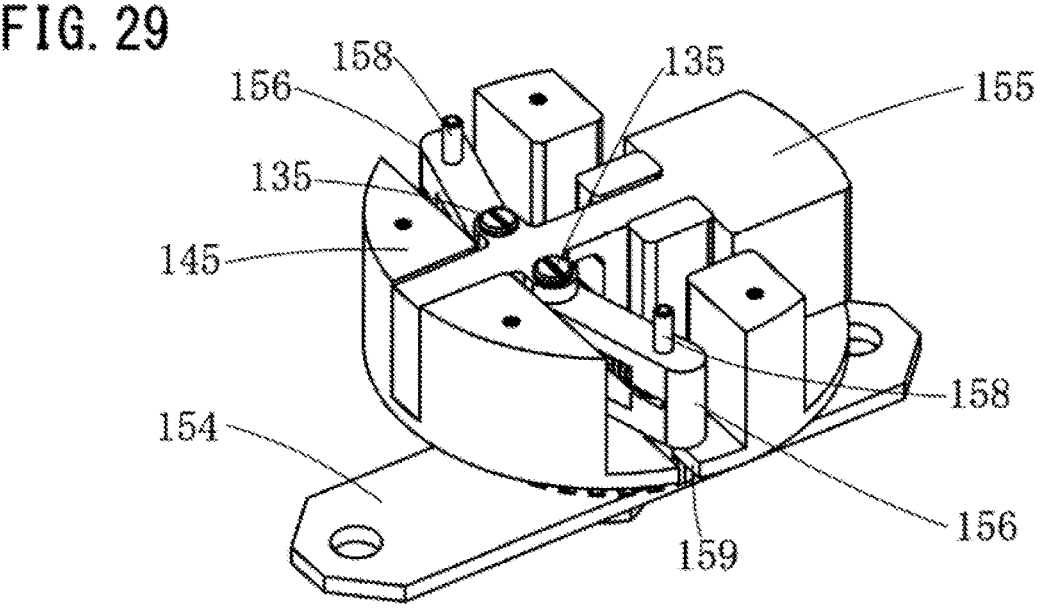
FIG. 29 is a perspective view of the overspeed detector, of which a lid is removed.

FIG. 29 is a perspective view of an internal structure of the overspeed detector 140 in its standby state. The casing lid 144 is removed. The hammer 155 is guided by a slot provided in the casing body 145 and slides along a line formed by crossing planes which are a plane including the rotation axis of the casing and a plane vertical to the plane. Links 156 are symmetrically, pivotably mounted at the middle of a handle portion of the hammer 155. An axle 158 which pierces the link 156 slides in the slot 159 in response to the movement of the hammer 155. The slots 159 are provided in a plane which is parallel to the plane including the axis of the rotation of the casing and is also vertical to the sliding direction of the hammer 155.

Figure 30:
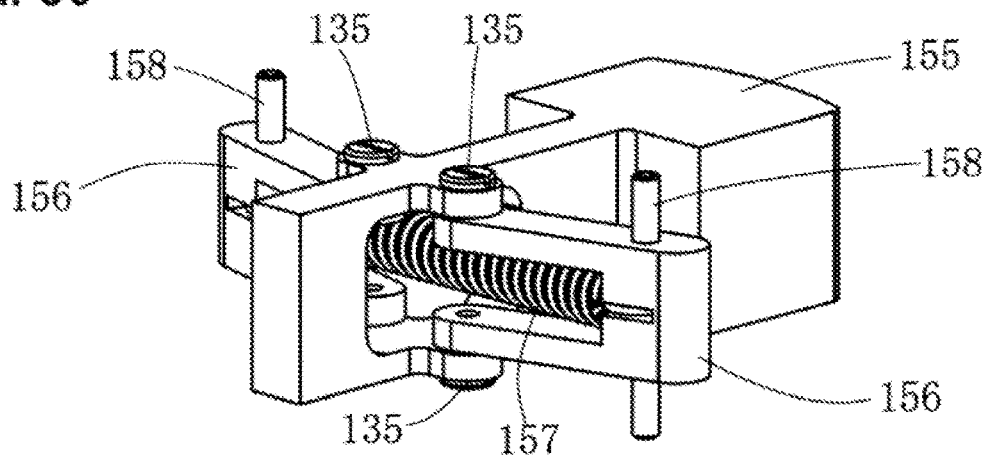
FIG. 30 is a perspective view of a hammer, links and an extension spring of the overspeed detector.

FIG. 30 is a view of the hammer 155, the link 156, the axle 158 which pierces the link 156, and an extension spring 157 which spans between the axles 158 of both sides in a standby state of the overspeed detector. The link 156 is pivotably mounted on the hammer 155 with a special screw 135 which has an axle at its tip. The extension spring 157 is positioned in a fork shaped gap of the link 156 and through an opening provided in the middle of the handle portion of the hammer 155.

The hammer 155 being in its standby state shown in FIG. 29 is retained at its standby position by the tension of the extension spring 157 spanned between the both side axles 158. The casing lid 144, the casing body 145, and parts assembled in them. i.e., the hammer 155, the link 156, and the both side axles 158 which slide in the casing slots 159 form a toggle mechanism. Hence, the force which is due to the extension spring 157 and which retains the hammer 155 at its standby position is at its maximum when the toggle mechanism is at its standby position.

When the rotating speed of the casing increases and the centrifugal force acting on the hammer 155 exceeds the force which retains the hammer 155 at its standby position, then the hammer 155 starts moving to the direction to spring out from the casing. When the hammer 155 slides and reaches at the dead center of the toggle mechanism, the retaining force becomes zero, after the moment, the tension of the extension spring 157 acts on the hammer 155 in the direction to stick the hammer out. Because of the above, stability of performance of the overspeed detector is anticipated. By the positioning of the extension spring 157 through the opening of the hammer 155 as well as in the gap of the fork shaped link 156, the small size of the overspeed detector is attained. Hence, it becomes possible to mount the overspeed detector 140 on the bottom base of the lift step side.

Figure 31:
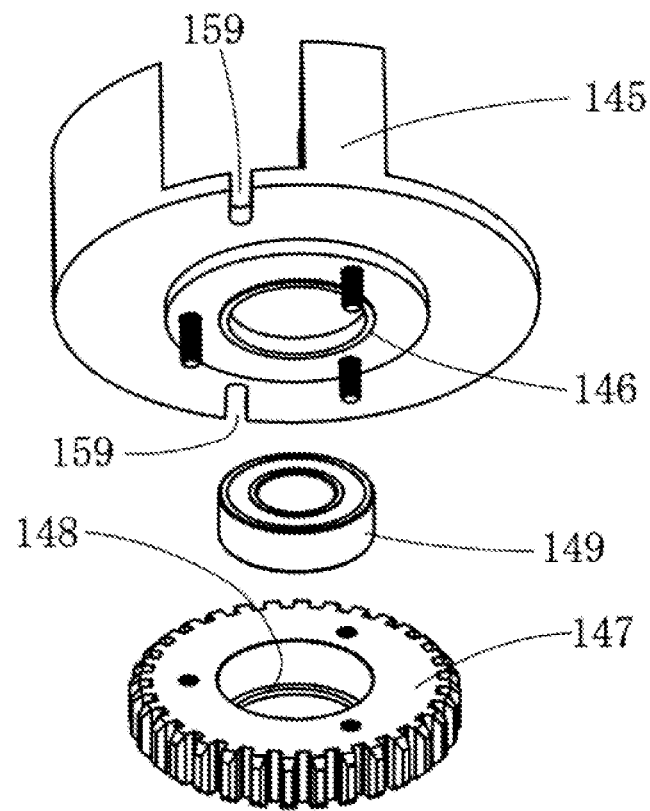
FIG. 31 is a dismantled view of a casing body, a bearing, and a drive gear of the overspeed detector.

FIG. 31 is a view to explain a method how to fix the drive gear 147 and the casing body 145 on an outer ring of a bearing 149. The bearing 149 is inserted in the drive gear 147. The outer ring of the bearing 149 rests on a flange 148 of the drive gear 147. A ring-shaped protrusion 146 is provided on the casing body 145 as shown in the view. The drive gear 147 sandwiches the outer ring of the bearing 149 between the flange 148 provided in the drive gear and the ring-shaped protrusion 146 of the casing body and is screwed on the casing body 145.

Figure 32:
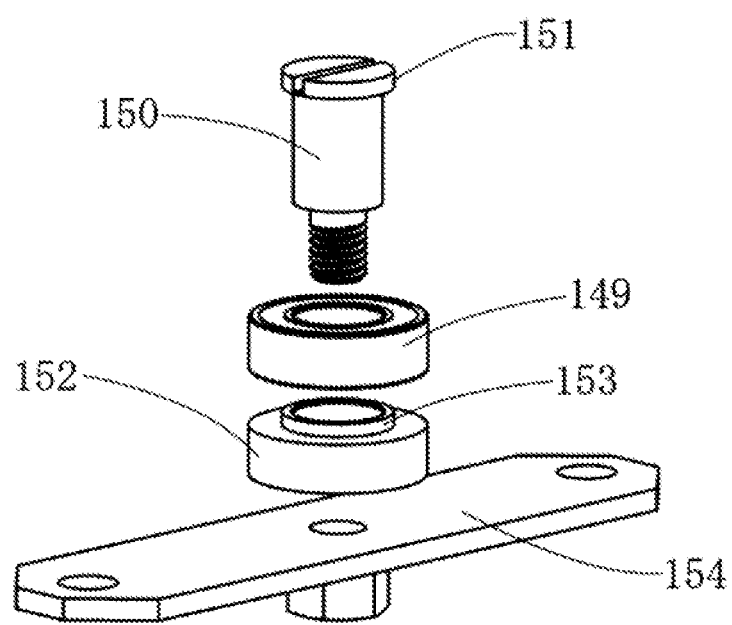
FIG. 32 is a perspective view to explain a mounting structure of the over-peed detector.

FIG. 32 is a view to explain the method how to fix an inner ring of the bearing 149 on a shaft 150. The shaft 150 provides a flange 151 at its top portion in order to hold the inner ring of the bearing. A base 152 provides, on its top, a ring-shaped protrusion 153 which contacts the inner ring of the bearing 149. The inner ring of the bearing 149 is sandwiched between the flange 151 of the shaft and the protrusion 153 of the base and is fixed on a mounting base 154.

As an example of other methods to release the latch of the emergency brake, a system which adopts a device to detect the acceleration of the falling gantry-shape carriage and activates a solenoid via control apparatus can be considered. The above described mechanical system has a distinctive feature that operates independently from the control apparatus. The system has an advantage of being operable even if a failure of the control apparatus happens.

The provision of the bogie which makes the stair lift applicable to various angles of staircases, and a mechanism which adjusts and fixes the bogie mounting angle are described in the following. It is expected that an inclination angle of a staircase on which a stair lift is installed differs from each individual staircase. Therefore, if a design which mounts travel wheels directly on the bottom base is adopted, then the bottom base must be designed for each individual staircase. Hence, the adopted design provides the bogie on which the travel wheels are mounted, and assembles the bogie on the bottom base with a mechanism to adjust the mounting angle of the bogie in accordance with a staircase angle.

In order to keep a meshing condition of the travel traction rail and the travel driving wheel constant, it is important to keep a relative position of the travel driving wheel and travel wheels constant. Mounting the travel driving wheel and the travel wheels on the bogie base has merit to keep the relative position of them regardless of a staircase angle. Considering travel power transmission to the travel driving wheel, it is preferable that a travel power transmission mechanism mounted on the bottom is not adversely affected by the staircase angle.

Figure 33:
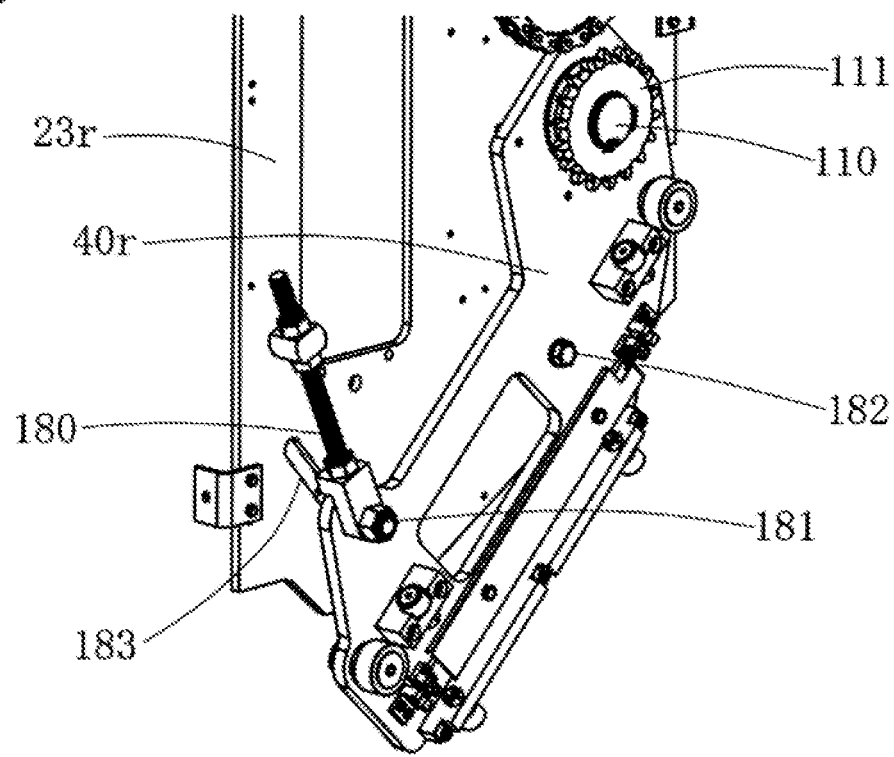
FIG. 33 is a perspective view of the bogie mounted on the bottom base 23r.

Hence, the adopted design joins the bottom base and the bogie base via the bearing housing of the travel driving wheel, wherein the bearing housing is an axle of the rotation of the bogie base. A bogie mounting angle adjustment-cum-support mechanism is explained by referring the right leg structure as an example. FIG. 33 is a perspective view of the bogie mounted on the bottom base 23r. The bogie base 40r is mounted on the bottom base 23r via the bearing housing 108 (FIG. 8, FIG. 24) of the pin-gear sprocket shaft 110. The bogie base mounting angle fixing rod 180 is provided in order to adjust and fix the mounting angle of the bogie base 40r on the bottom base 23r. Reinforcing bolt 181 and 182 reinforce the mounting of the bogie base 23r on the bottom base 23r.

Figure 34:
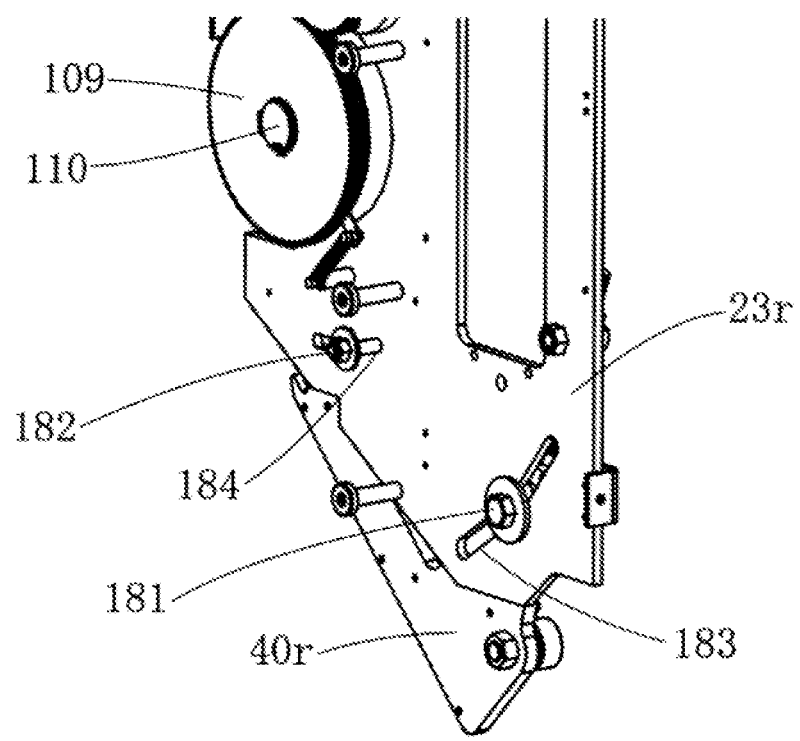
FIG. 34 is a perspective view of the bogie shown in FIG. 33 seen from the lift step side.

FIG. 34 is a perspective view of the bogie shown in FIG. 33 seen from the lift step side. Arc-shaped slots 183 and 184 on the bottom base 23r are provided for bogie mounting angle adjustment. Reinforcing bolts 181 and 182 are fixed through the slots. Thus, the travel power is transmitted to the travel driving wheel regardless of the staircase angle. The mounting angle of the bogie base to the bottom base is finalized and fixed by adjusting the length of a bogie base mounting angle fixing rod 180.

A lift step lifting mechanism provided in the leg structure is described in the following. FIG. 35 shows the lifting mechanism mounted in the left and right leg structure frames and the lift step. Other parts are not shown to avoid complexity of the figure. Since the left and right lifting mechanisms are in mirror image relationship, the right lifting mechanism is explained. A support base 191 (Refer to the left figure) on which a geared motor with brake 190 which is a lifting power source is mounted on the top base 21r. An output shaft of the geared motor with brake 190 is connected to a connecting rod 193 via a universal joint 192. The other end of the connecting rod 193 is connected to a screw shaft 195 via a universal joint 194.

The screw shaft 195 is supported by a top bearing 196 and a bottom bearing 197 which are mounted on the outer side of the bottom base 23r. A nut 198 is fitted on the screw shaft 195. The nut 198 moves up and down in response to the rotation of the screw shaft 195. Two guide rails 199 (Refer to the left figure) are mounted on the inner side of the bottom base 23r in parallel. A slider 200 runs on the guide rail 199. A step lifting guide base 203r on which sliders 200 are fixed moves up and down along the guide rails 199. The step lifting guide base 203r supports the lift step via a connecting means.

Figure 36:
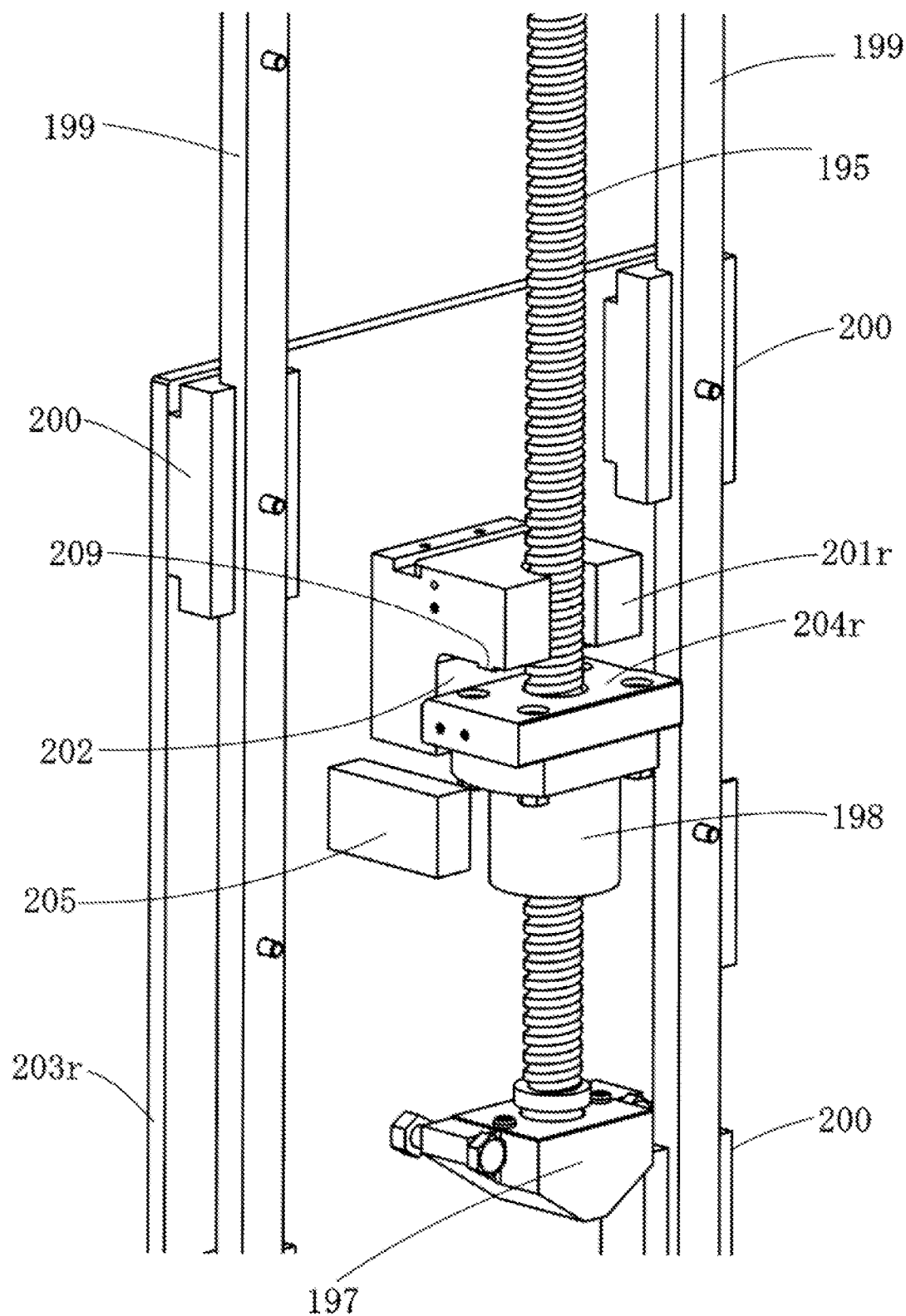
FIG. 36 is an enlarged perspective view in the vicinity of a hook and a load table of the lifting mechanism of the lift step.

FIG. 36 is an explanatory view of a drive mechanism of the step lifting guide base 203r. The bottom base 23r is not shown in order to show the drive mechanism clearly. Hence, the guide rails 199 and the step lifting guide base etc. are seen through in the view. A sensor mounted on a hook 201r, a sensor target mounted on a load table 204r etc. are not shown in order to show clearly an interrelationship between the hook 201r and the load table 204r.

The hook 201r is mounted on the step lifting guide base 203r. The load table 204r is mounted on the nut 198. A side surface of the load table 204r and a facing surface 202 of the hook slide each other. Owing to this arrangement, rotations of the nut 198 with the screw shaft 195 is averted. A separation stopper block 205 is mounted on the step lifting guide base 203r. The separation stopper block 205 prevents the side surface of load table 204r coming off the surface 202 of the hook during transportation, installation and assembling of the gantry-shape carriage.

A procedure that the load table 204r pushes up the step lifting guide base 203r is explained in the following. The screw shaft 195 is rotated in the direction which the nut 198 moves upwards. The load table 204r pushes up the hook 201r so that the step lifting guide base 203r moves upwards. The rotation of the screw shaft 195 is stopped at the time when the lift step 1 reaches a position suitable for the gantry-shape carriage to travel.

A procedure that the step lifting guide base 203r moves downwards and stops is explained in the following. The screw shaft 195 is rotated in the direction which the nut 198 moves downwards. The load table 204r moves downwards with the hook 201r on it. When the lift step 1 lands on a step of a staircase or a floor, the step lifting guide base 203r which is linked to the lift step 1 stops its downward movement. Thus, the hook 201r mounted on the step lifting guide base 203r stops its downward movement.

Figure 37:
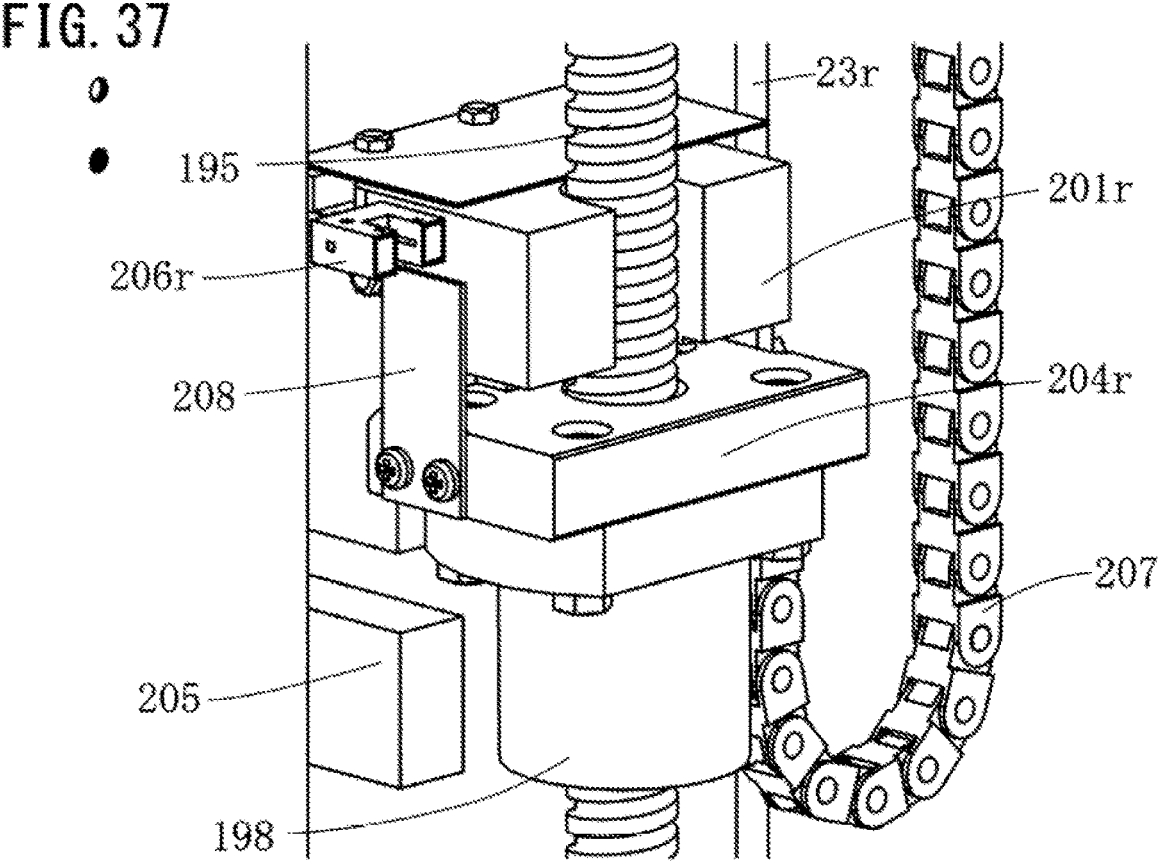
FIG. 37 is a perspective view to explain a sensor mounted on the hook and a sensor target mounted on the load table of the lifting mechanism of the lift step.

The rotation of the screw shaft 195 is stopped by a mechanism explained with FIG. 37. A sensor 206r is mounted on the hook 201r. Its sensor cord protected with a cable chain 207 is pulled to the bottom base 23r. A sensor target 208 is mounted on the load table 204r. After the hook 201r stops its downward movement, while the screw shaft 195 continues its rotation, the load table 204r moves downwards so that the sensor 206r detects a coming off of the sensor target 209. The rotation of the screw shaft is stopped by using the signal detected. It is apparent that the sensor 206r can be replaced by a microswitch and the sensor target 208 can be replaced by an actuator of the switch.

The hook 201 is pushed up by the load table 204 as they are explained with FIG. 36 and FIG. 37. While the hook and the load table move downwards together, when the hook stops its downward movement, then a gap occurs between the hook and the load table. The above system which detects a stoppage of the downward movement of the hook by detecting the gap has the following advantages.

(1) The load table does not generate the force which pulls down the hook, hence no abnormal stress occurs in the lift step lifting mechanism while the lift step is in its landing procedure.

(2) The hook is mounted on the step lifting guide base which moves up and down vertically. The hook surface 209 (Refer to FIG. 36) which contacts the load table is designed to be on an intersection line formed with a plane which contains a centerline of the screw shaft and a plane which is parallel to the surface of the load table. There is an effect preventing a generation of bending force applied on the screw shaft. However, the buckling force is excluded.

(3) If there is an obstacle on a step of a staircase and the lowering lift step gets on the obstacle, then the rotation of the screw shaft stops without compressing the obstacle by the driving force of the lift step lifting mechanism.

(4) When a travel stop position of the gantry-shape carriage deflects, then a stop position of the lowering sliding guide base deflects. The above detection system has no adverse effect caused by the deflection of the travel stop position.

The above advantages become more evident, when an application of other systems of the lift step lifting mechanisms is imagined. For instance, a system which solidly connects a nut which is moved up and down by rotations of a screw shaft and a step lifting guide base together, then such a system requires a different system which detects a landing of the lift step. If a lowering stop position of the step lifting guide base is fixed in accordance with a relative position of the bottom base of the leg structure and the step lifting guide base, then in such a case, the lift step presses a step of a staircase so that the compression stress occurs in the lift step lifting mechanism, or the inadequate lowering of the lift step happens. If landing sensors are mounted on a bottom surface of the lift step, then an arrangement of the sensors and cabling of sensor outputs become troublesome. The system which lifts the load table on which the hook is placed avoids these drawbacks.

Figure 38:
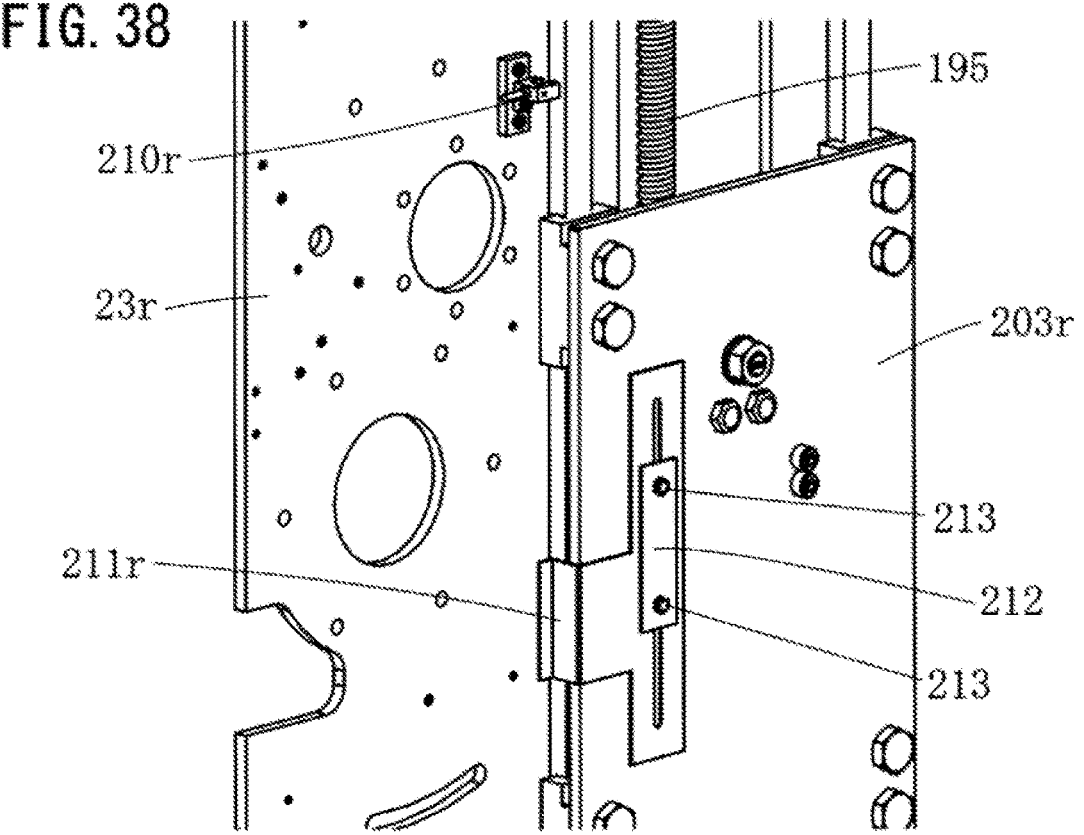
FIG. 38 is a perspective view to explain an upper stop position detection mechanism of a step lifting guide base.

FIG. 38 is a view to explain a mechanism which detects a raising stop position of the step lifting guide base. The raising stop position of the step lifting guide base is a relative position of the step lifting guide base and the bottom base while the gantry-shape carriage travels along rails. A sensor 210r is fixed on the bottom base 23r. A sensor target 211r is screwed on the step lifting guide base 203r via a retainer 212 so that its position becomes adjustable. When the sensor 210r detects the sensor target 211r, the geared motor with brake 190 which is a lifting power source is stopped. If the detection of the sensor target 210r should lose while the gantry-shape carriage travels, then the travel of the gantry-shape carriage will be stopped.

The position of the sensor target can be adjusted with the following sequence. Remove an inner cover (A right cover corresponding to FIG. 1, 4e) mounted on the bottom base 23r. Screws 213 which fix the sensor target 211r appear. Loose the screws 213 and adjust the position of the sensor target 211r. If a space between the gantry-shape carriage and adjacent walls is narrow, the above design has advantages of working from the lift step side.

The raising stop position of the step lifting guide base can be decided in the following way. When the gantry-shape carriage arrives at the upper floor stop position, the height of the lift step is to be the height of a step which is an extension of the upper floor. Considering a horizontal distance between the step and the lift step, the travel stop position of the gantry-shape carriage at the upper floor is decided. The gantry-shape carriage is stopped at the stop position decided. The position of the step lifting guide base is decided so that the height of the lift step is equal to the height of the upper floor. The sensor target position is adjusted so that the position becomes the raising stop position.

A coupling means of the step lifting guide base and the lift step is described in the following. While the gantry-shape carriage is standing by at the upper floor of the staircase, the lift step lands on a step of the staircase. When a user of the staircase goes up and down without using the stair lift it is expected that the landed lift step does not protrude from the step of the staircase. When a user standing on the upper floor starts up the gantry-shape carriage, the lift step rises to the height of the upper floor. It is expected that the height of the lift step is to be equal to the height of the upper floor in order to prevent the user from stumbling. At the same time, conflicts between the lift step and the steps of the staircase must be prevented.

Regarding a coupling means of the lift step and the step lifting guide base, comparisons between a movable type and a fixed type are shown in FIG. 39A, FIG. 39B FIG. 40A and FIG. 40B. The following two conditions are taken into account.

(1) When a user gets on and off a stair lift at an upper floor, the height of the lift step shall be the height of the upper floor.

(2) The lift step which lands on a step of a staircase shall not protrude from the step of the staircase. The gap 221g between the lift step and the step is set in accordance with the condition (1). It is, assumed that the staircase provides a nosing. Comparisons are made on cases that the lift step rises from its standby position to its travel position which is the position while the gantry-shape carriage travels. Movements of the lift step are schematically indicated with arrows.

Figure 39A:
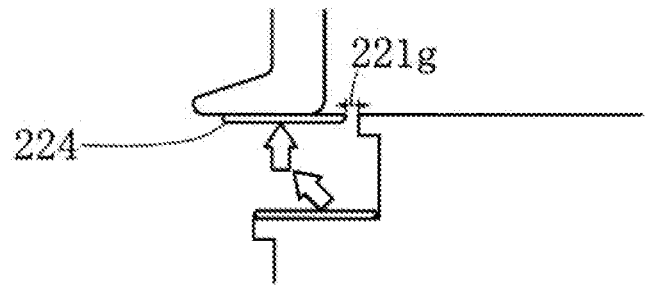
FIGS. 39A and 39B are schematic side views to compare movements of a fixed type lift step and a movable type lift step at an upper floor.
Figure 39B:
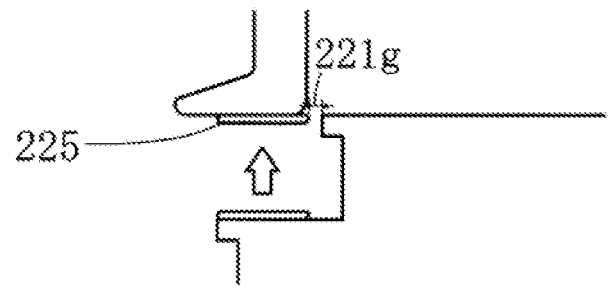

FIGS. 39A and 39B are an explanatory view to compare the lift step movements at a upper floor with schematic views of the user's foot. A movement of a movable type lift step 224 is shown in FIG. 39A. A movement of a fixed type lift step 225 is shown in FIG. 39B. The dimension of the depth of the movable type lift step is a sum of a dimension of the depth of the tread and a dimension of the nosing of the staircase. On the contrary, a dimension of the depth of the fixed type lift step is a result of subtraction of a dimension of the gap 221g from the dimension of the depth of the tread of the staircase. The depth of the lift step is narrower than that of the movable type. The user's toe significantly sticks out from the lift step 225 so that the user suffers an inconvenience for riding.

Figure 40A:
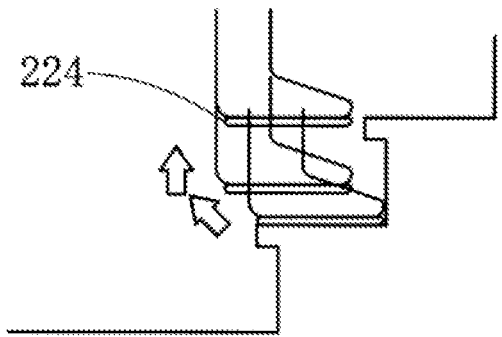
FIGS. 40A and 40B are schematic side views to compare movements of the fixed type lift step and the movable type lift step at a lower floor.
Figure 40B:
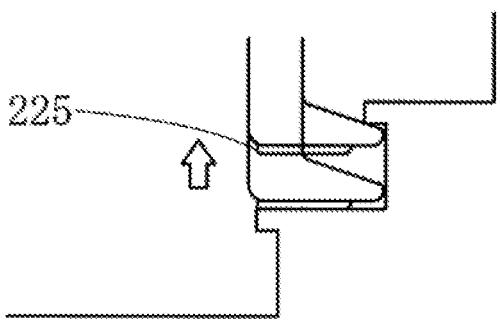

FIGS. 40A and 40B are an explanatory view to compare the lift step movements at a lower floor with schematic views of a user's foot. A movement of the movable type lift step 224 is shown in FIG. 40A. The user's toe is usually put under the nosing of the staircase as shown in the figure. Moving toward the lower floor side, the lift step rises as shown in the figure. Hence, the user's toe does not conflict with the nosing of the staircase. A movement of the fixed type lift step 225 is shown in FIG. 40B. In case of the fixed type, there is a significant risk that the user's toe is caught by the nosing of the staircase. If the nosing of the staircase is filled for the risk prevention, then the user's heel substantially protrudes from the lift step 225. It is feared that the user suffers an inconvenience for riding.

This embodiment adopts a movable type coupling means in order to avoid the drawbacks of the fixed type. As the coupling means of the step lifting guide base and the lift step, a coupling mechanism which uses a parallelogram linkage is adopted. The left and right coupling mechanisms are in a mirror image relationship. The movements of the lift step are explained with FIG. 41, FIG. 42, and FIG. 43. In order to explain the movements of the lift step, the parallelogram linkage, and the step lifting guide base, portions which are irrelevant to the explanation including rails are not shown. In the figures, a triangular prism shaped member 232 is attached to a corner of the nosing and a riser of the staircase. This is an example of safeguards to protect user's toe from unexpected situations.

Figure 41:
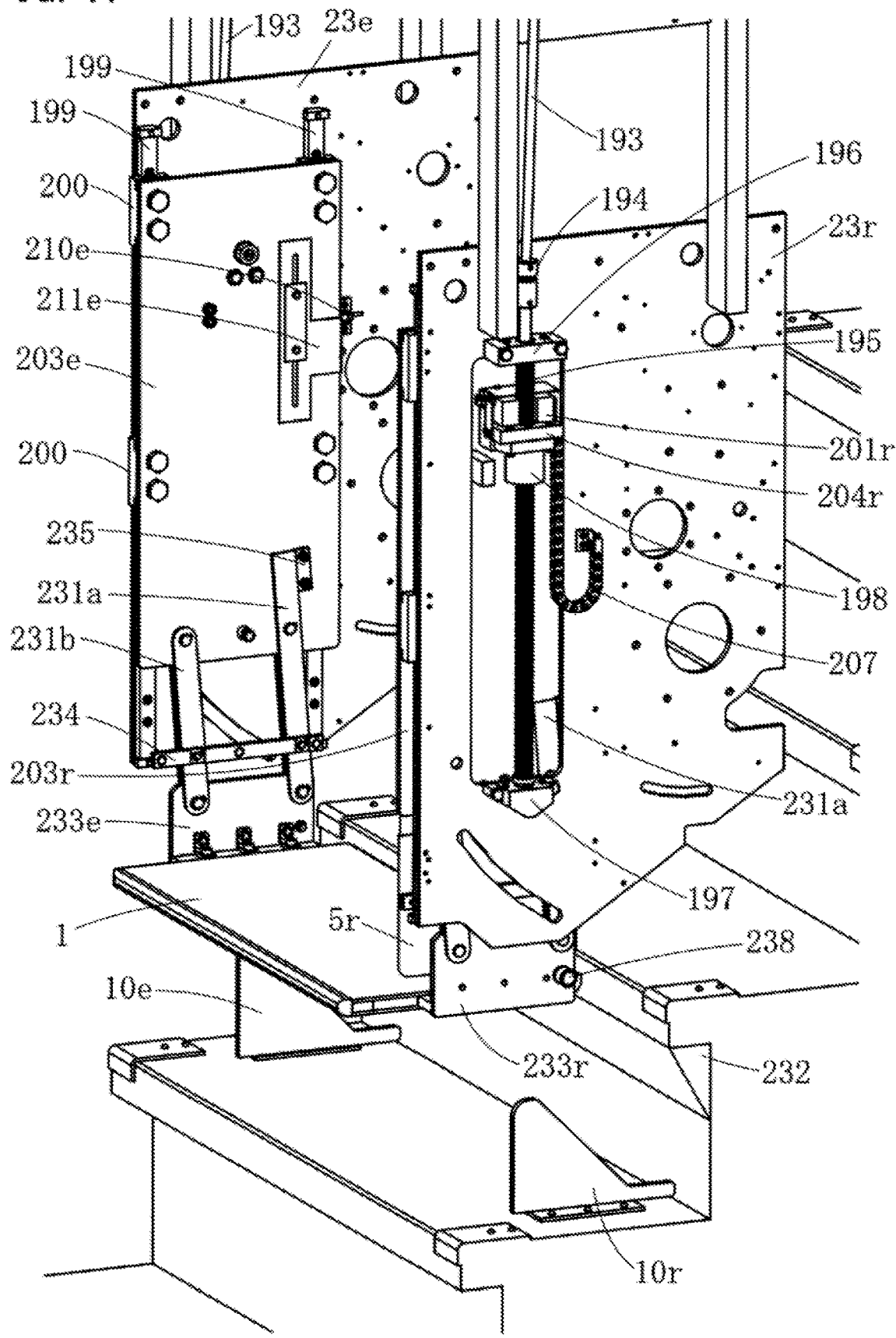
FIG. 41 is a perspective view to explain a connecting mechanism of the lift step and the step lifting guide base. The lift step is at a position designated for traveling of the gantry-shape carriage. A left protection cover is removed in order to show a state of a parallelogram linkage.

FIG. 41 shows the state that the gantry-shape carriage has arrived at the lower floor stop position and stops its downward travel. A left protector 5e corresponding to the right protector 5r is removed to show the left parallelogram linkage. A left step suspension base 233e is attached to the left end of the lift step 1. In the same way, a right step suspension base 233r is attached to the right end of the lift step 1. The left step lifting guide base 203e and the step suspension base 233e are connected with links 231a and 231b. The right step lifting guide base 203r and step suspension base 233r are connected with links 231a and 231b as well. A protector support 234 of the protector 5 is mounted in the middle of the parallelogram linkage. A swing stopper 235 which restricts swings of the parallelogram linkage is mounted on the step lifting guide base 203. The rotation of the link 231a is stopped by the swing stopper 235 at the position where the gravity acting on the lift step generates a torque. Hence, the lower floor side swing of the lift step is stopped and the stability of the lift step position is also achieved. The guide slopes 10e and 10r are installed on a step of the staircase. Cam followers 238 are provided on the left and right step suspension baes 233e and 233r.

Figure 42:
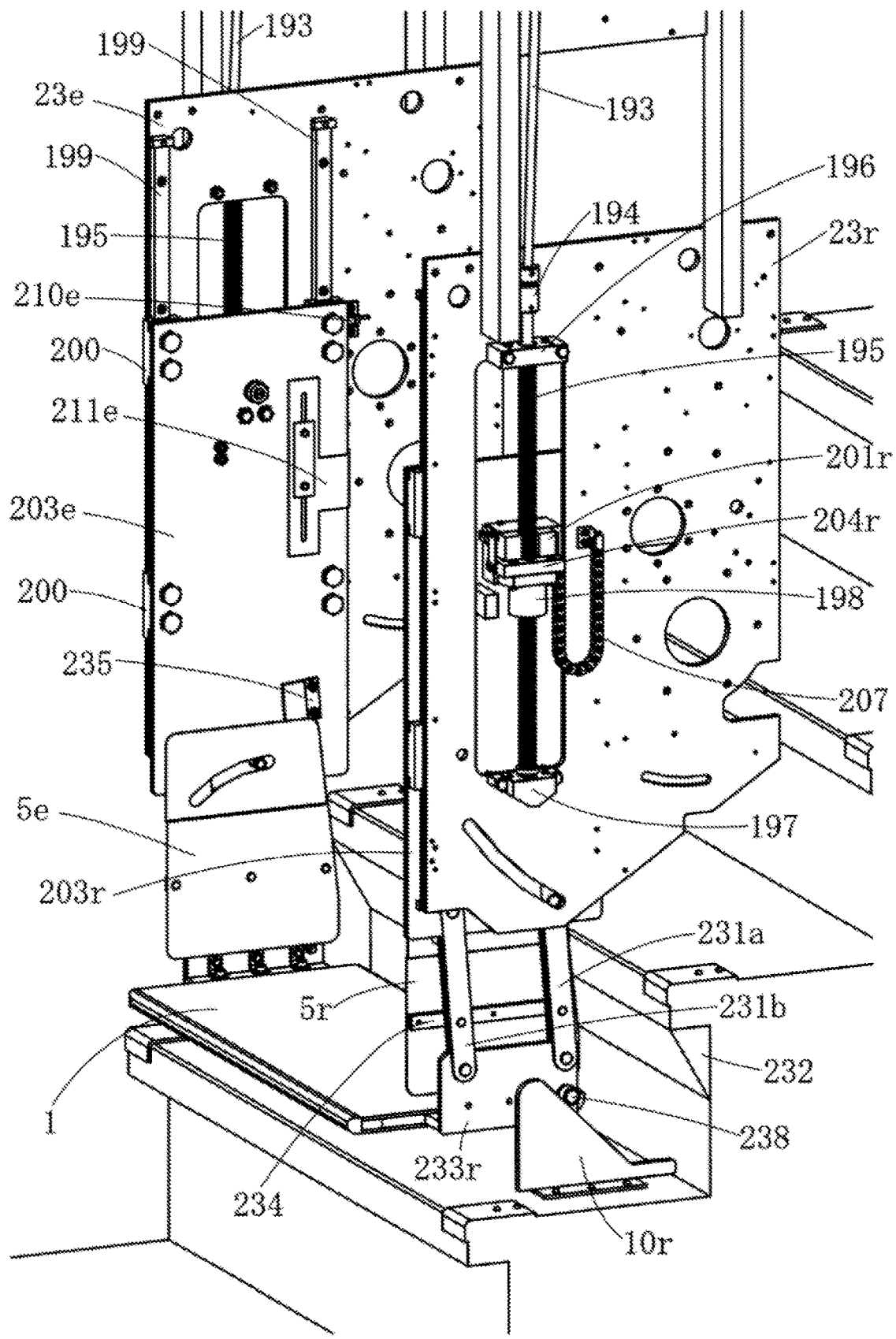
FIG. 42 is a perspective view to explain the connecting mechanism of the lift step and the step lifting guide base. The view shows a state at the moment when a cam follower mounted on a step suspension base has just touched a guide slope while the lift step goes down.

FIG. 42 shows the state at the moment when the left cam follower 238 contacts the left guide slope 10e and the right cam follower 238 contacts the right guide slope 10r, while the step lifting guide base 203 is moving downwards by rotations of the left and right screw shafts 195. The rotation of the links 231a are stopped by the swing stoppers 235. The lift step 1 has moved downwards from FIG. 41 state to FIG. 42 state. When the left and right screw shafts 195 rotate and the step lifting guide bases 203 further move downwards from the positions shown in FIG. 42, the left and right cam followers 238 move downwards while rolling down the guide slopes 10e and 10r on which each cam follower contacts respectively. When the step lifting guide bases move downwards, the lift step 1, which is guided by the cam followers 238, moves downwards while moving toward a riser of the staircase. When the lift step 1 lands on a step of the staircase, the step lifting guide base 203 stops its downward movement via the parallelogram linkage. Hence the rotation of the screw shafts 195 is stopped in the way explained with FIG. 37.

Figure 43:
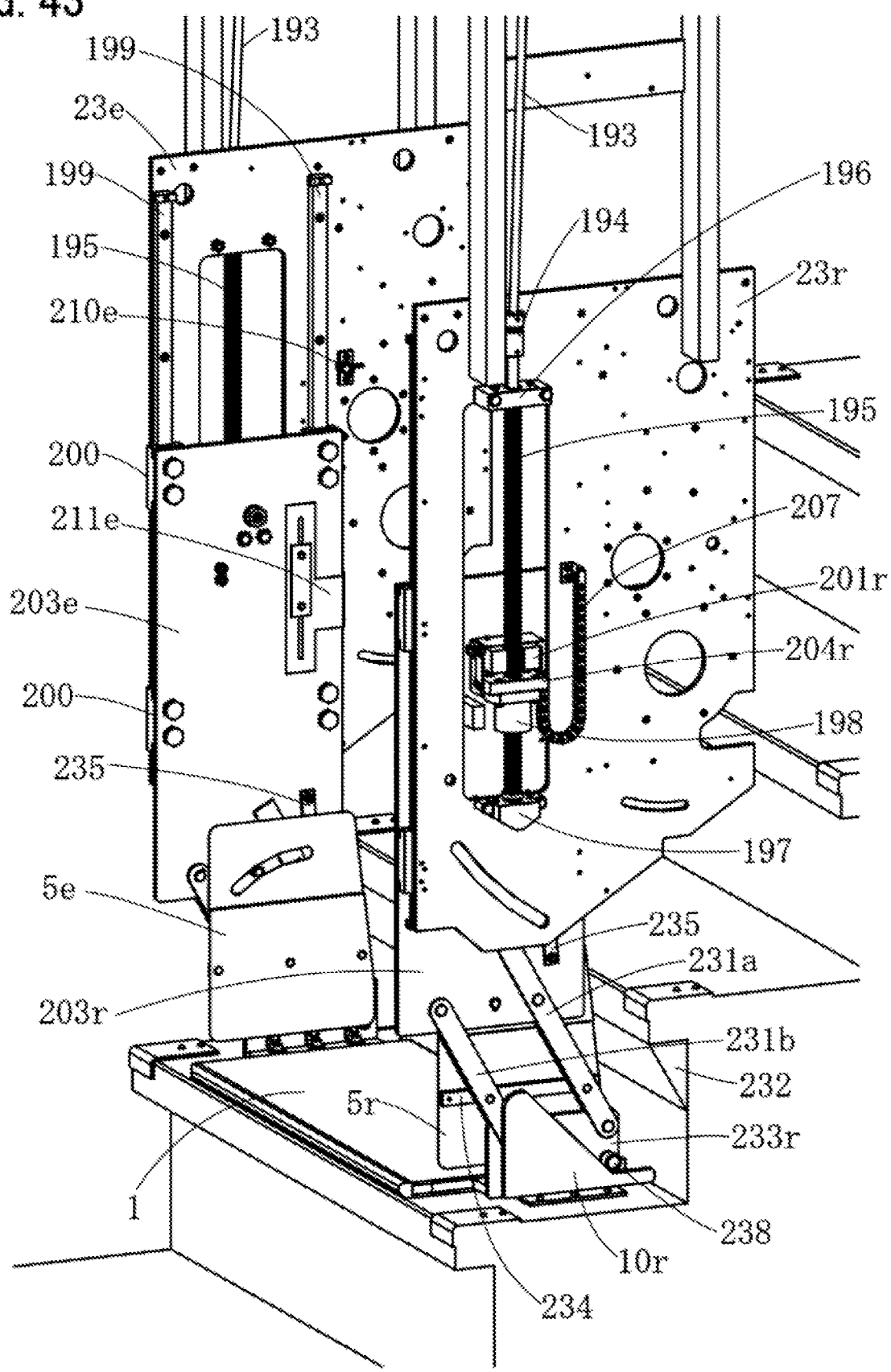
FIG. 43 is a perspective view to explain the connecting mechanism of the lift step and the step lifting guide base. The lift step has landed on a step of a staircase.

FIG. 43 shows the state that the lift step 1 has landed on the step of the staircase. Regarding a relative position of the step of the staircase and the lift step 1 when the lift step 1 lands on the step of the staircase, the relative position is determined by relative positions of the guide slopes 10 and the cam followers 238 mounted on the step suspension bases 233. For instance, when the gantry-shape carriage stops at a wrong position so that the guide slopes 10 and the cam followers 238 change the contact positions which are explained with FIG. 42, however, the landing position of the lift step 1 which is guided by the cam followers 238 is invariable. There is an advantageous effect that the landing position of the lift step 1 is fixed.

In case the width of the lift step 1 is narrow, it is assumed that loads of the lift step ridden by a user is almost evenly borne by the left and right step suspension bases 233. Therefore, the drive system is designed to drive independently the left and right screw shafts 195 by a geared motor with brake 190 respectively. In case the balance of the left and right loads is lost significantly, synchronization of the drive mechanism will be considered.

Regarding the operation-handrail mechanism, the right upper floor side operation-handrail 3r is described as an example in the following. The upper floor side and the lower floor side mechanisms are in mirror image relationship each other. Please refer to 2e, 2r, 3e, and 3r in FIG. 1 through FIG. 6.

Figure 44:
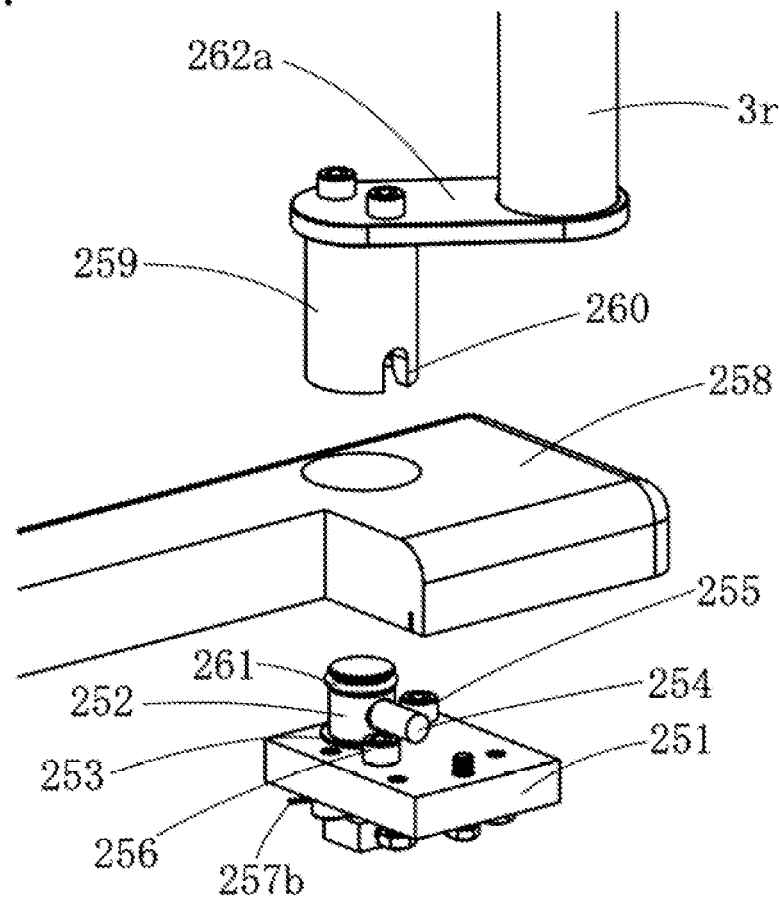
FIG. 44 is a perspective view to explain a dismantled bottom portion of an operation handrail.

FIG. 44 is a dismantled view to explain a bottom support mechanism. A bottom base 251 is mounted on the bottom base 23r of the leg frame via a bracket 116 (Refer to FIG. 16). A bottom shaft 252 is fitted in an axle hole provided on the bottom base 251 via a plastic bearing 253. A rotation limiting rod 254 is inserted at the upper portion of the bottom shaft 252. Stoppers 255, 256, and the rotation limiting rod restrict a rotation angle of the bottom shaft 252. The lower portion of the bottom shaft 252 protrudes from a lower surface of the bottom base 251. A return spring 257b is fitted on a lower portion of the bottom shaft 252. Regarding a return spring mechanism, please refer to a return spring 257a shown in FIG. 45. While the gantry-shape carriage is standing by, the rotation of the bottom shaft 252 is pushed by the return spring 257b and stays at the position shown in the figure. A cover 258 of the bottom base 23r of the leg frame is mounted on the bottom base 251. The rotation limiting rod and stoppers 255, 256 are positioned in a hollow space provided in the cover 258. A socket 259 is fitted on the bottom shaft 252. A notch 260 of the socket slips on the rotation limiting rod 254. An O-ring 261 fitted on the bottom shaft 252 prevents the socket 259 from playing on the bottom shaft 252. A support arm 262a is mounted on the socket 259. The operation-handrail 3r is supported by the support arm 262a.

Figure 45:
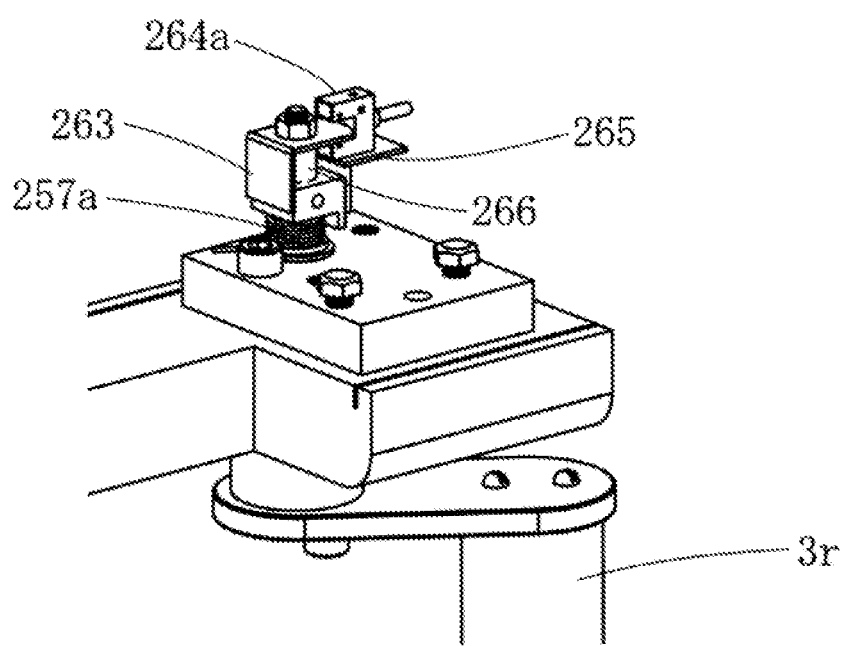
FIG. 45 is a perspective view to explain an upper portion of the operation handrail.

FIG. 45 is an explanatory view of a top support mechanism and a sensor mechanism. The top support mechanism comprises a mechanism which is a mirror image of the bottom support mechanism, and additional parts, i.e., a sensor target 263 and its mounting parts, a sensor 264a, and a sensor bracket 265. A top shaft 266 and the bottom shaft 252 are arranged on a straight line. When a user pulls the operation-handrail to the user's body, the sensor target 263 rotates. The sensor 264a detects the sensor target 263 and transmits a signal to a controller.

Figure 46:
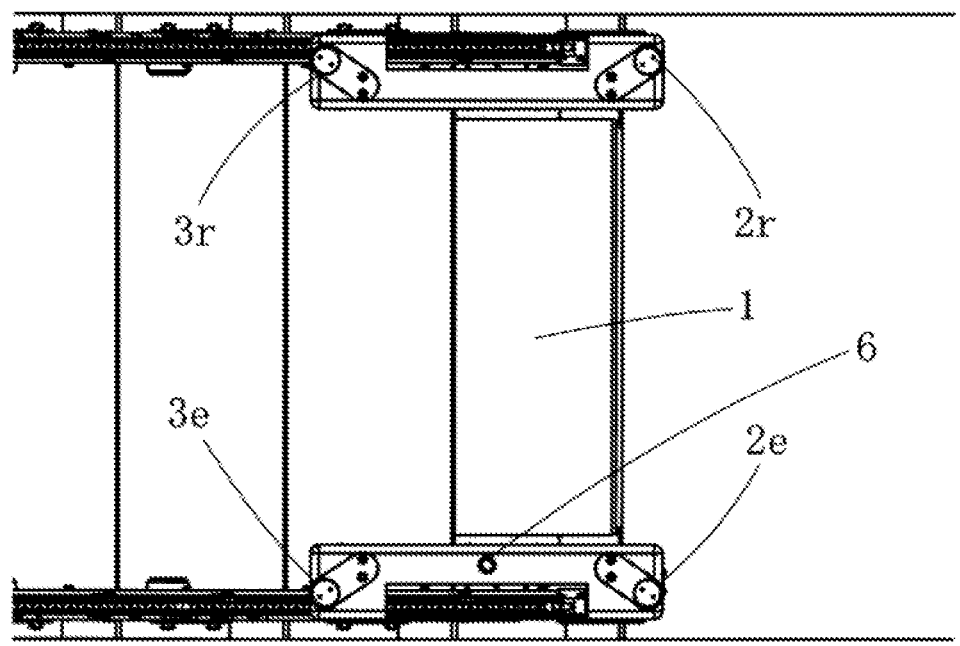
FIG. 46 is a top view to explain positions of the operation handrails while the gantry-shape carriage stands by at the lower flower.
Figure 47:
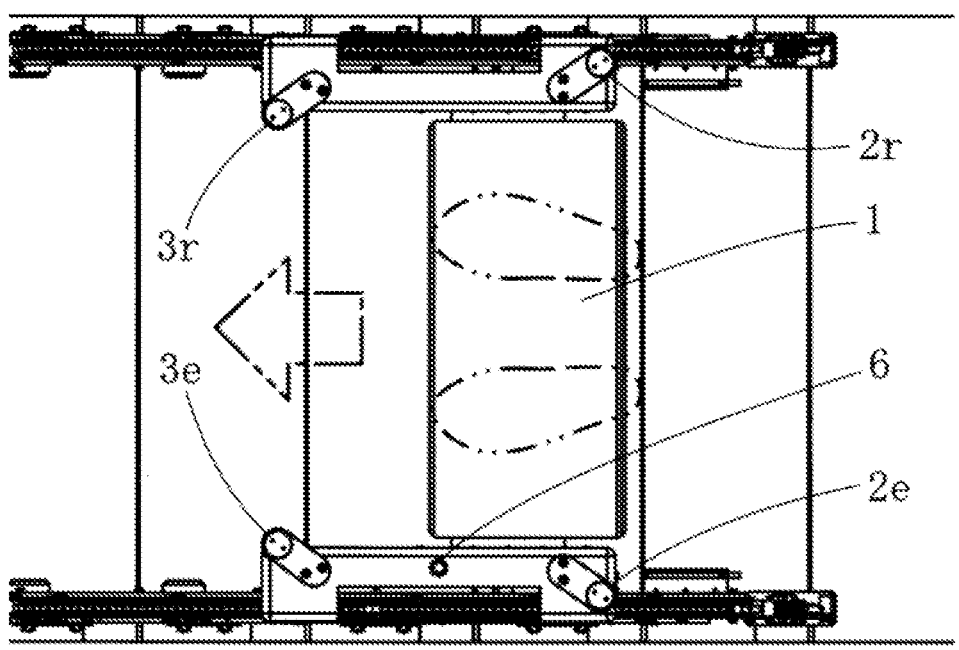
FIG. 47 is a top view to explain positions of the operation handrails while the gantry-shape carriage is traveling to upward direction indicated by an arrow in the figure. A user is not shown but only positions of feet are shown.
Figure 48:
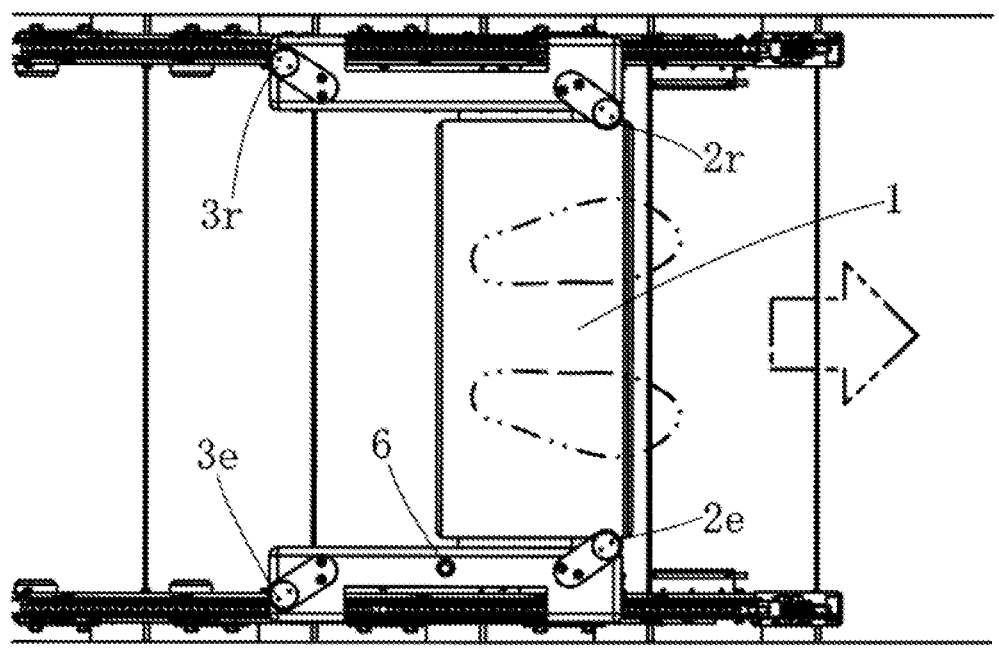
FIG. 48 is a top view to explain positions of the operation handrails while the gantry-shape carriage is traveling to downward direction indicated by an arrow in the figure. A user is not shown but only positions of feet are shown.

In this embodiment, the sensor mechanism of the operation-handrail is provided on each of the top support mechanisms. Since each operation-handrail sensor mechanism is independent of each other, different operation modes can be set up with combinations of the operations. FIG. 46, FIG. 47, and FIG. 48 are explanatory top views of the operation-handrails and the lift step. A user is shown only by user's foot positions. A travel direction of the gantry-shape carriage is indicated by an arrow. FIG. 46 shows the standby positions of the operation-handrails while the gantry-shape carriage is standing by at the lower floor. Each operation-handrail which is pushed by the return spring stays at its standby position. FIG. 47 and FIG. 48 shows examples of an operation mode which requires simultaneous operations of the two operation-handrails of either the upper floor side or the lower floor side. FIG. 47 shows the positions of the operation-handrails while the gantry-shape carriage is traveling toward the upper floor. The upper floor side left and right operation-handrails 3e, 3r are pulled inward by the user. FIG. 48 shows the positions of the operation-handrails while the gantry-shape carriage is traveling toward the lower floor. The lower floor side left and right operation-handrails are pulled inward by the user. The operations which require the user to pull the operation-handrails toward user's body are helpful to hold user's posture, therefore, it is considered that the safety of the stair lift increases.

In this embodiment, the operation mode switch 6 is provided. Please refer to FIG. 1 through FIG. 6. For instance, if a family has a member who has troubles with foot and/or waist, then it is imaginable that low speed operations are required. It is possible to set up the following operation mode. A base operation mode is a mode which requires simultaneous operations of two operation-handrails as mandatory operations and its travel speed is set at a low speed. When the operation mode switch 6 is depressed, higher speed operations become available. It is possible to set up another operation mode which is based on one operation-handrail operations. The travel speed of one operation-handrail operation mode and the travel speed of two operation-handrails operation mode are set at a same speed which is a base speed. When the operation mode switch 6 is depressed, the base operation mode is changed to a mode which requires simultaneous operations of two operation-handrails as mandatory operations and its travel speed is set at a speed which is higher than that of the base mode. It is an example for a user who has troubles with hands. It is also an example for a user who wishes to keep one hand free.

Figure 49:
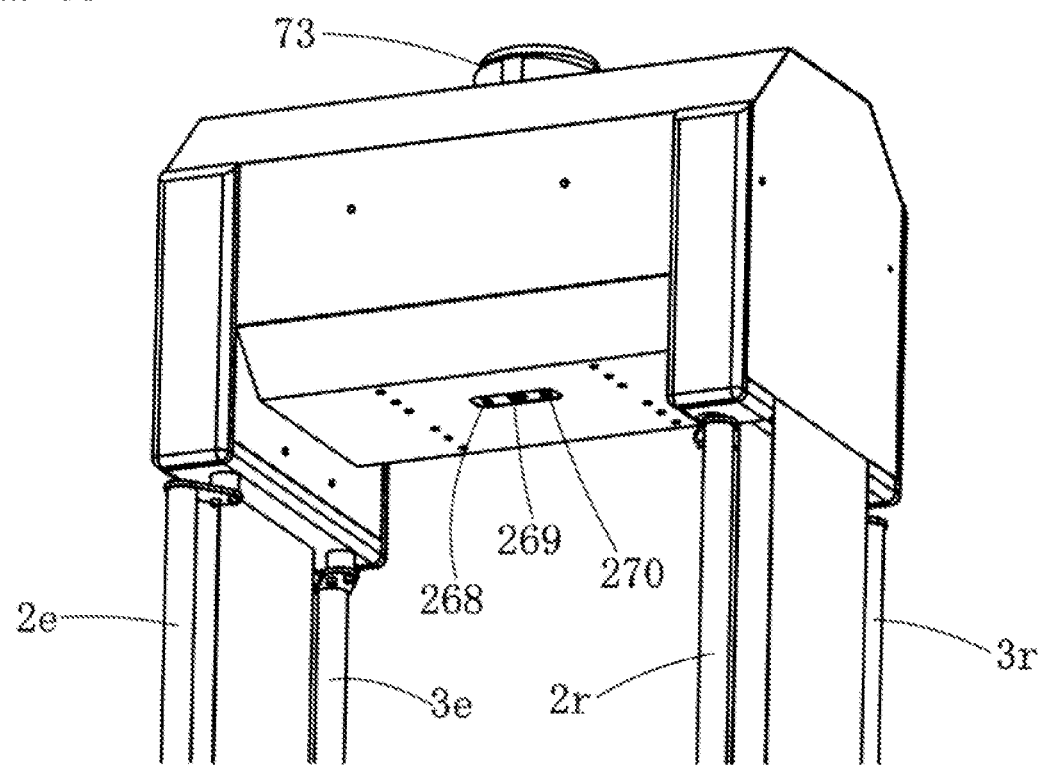
FIG. 49 is a perspective view of the connecting structure looked up from a lower floor side.

For instance, if a family has a dementia patient with a weak leg and/or waist, it is assumed that the use of the operation mode switch 6 is not preferable. It is presumed that the patient forgets operation rules and depresses the operation mode switch 6. In order to counter such situations, a change-over switch which nulls the operation mode switch 6 is provided. FIG. 49 is an explanatory view which looks up the connecting structure. A mode selector null switch 268, a pilot lamp 269, and a travel speed selector switch 270 are provided. The mode selector null switch 268 changes over signals of the operation mode switch 6 on or off. The travel speed selector switch 270 selects a base travel speed from low speed, middle speed, and high speed and sends the selected signal to control apparatus. The above operation mode settings are examples imagined in this embodiment.

Another set-up of the standby positions of the operation-handrails is described in the following. When a user goes from the lower floor to the upper floor, the user faces the upper floor and pulls operation-handrails to user's body. When a user goes from the upper floor to the lower floor, the user gets on the lift step, looking down the lower floor. Hence, depending on user's preference, it is conceivable that the user pushes operation-handrails outwards when the gantry-shape carriage travels downwards. This arrangement can be achieved by swapping the standby positions and operating positions of the operation-handrails. However, the lower floor side operation-handrails protrude inward at their standby positions.

It is assumed that a staircase specification varies by its installed location. When a stair lift is installed, an abbreviation or a reduction of the installation design for each of the staircases is expected to bring merits of a cost reduction and a shorter delivery time. A rail system which can be applicable on a wide range of a staircase specification variation and which is suitable for mass production is described in the following.

Figure 50:
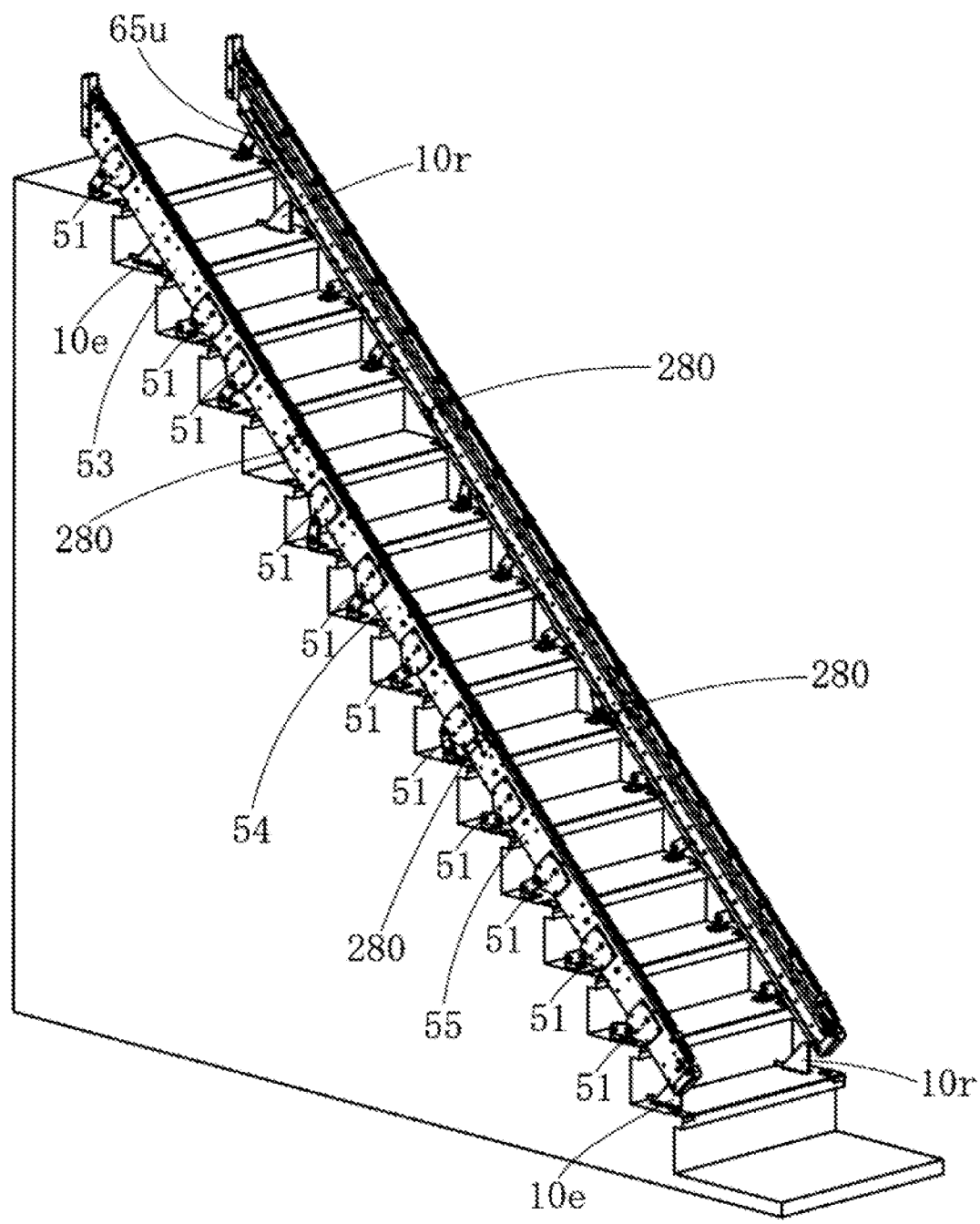
FIG. 50 is a perspective view to explain a state of rails installed on a staircase. The figure shows a case that a landing position of the lift step at the lower floor is a first step of the staircase.
Figure 51:
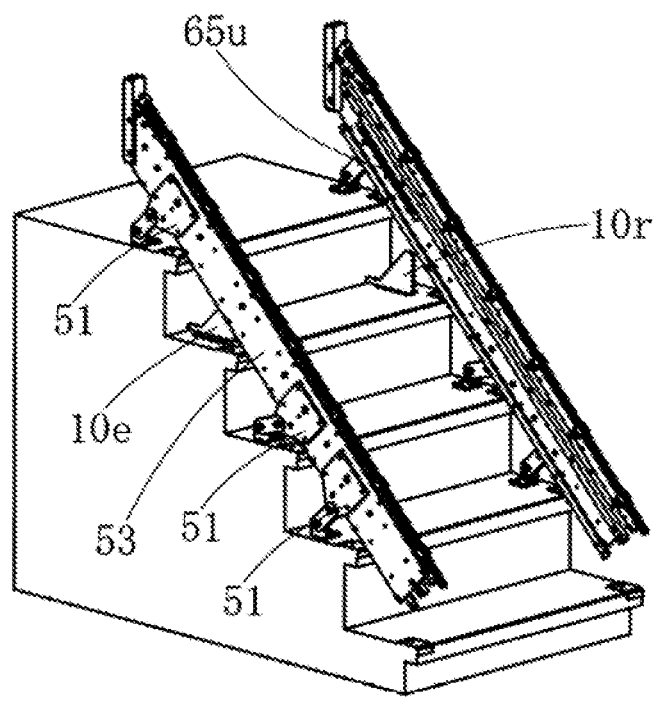
FIG. 51 is a perspective view to explain a state of an installation of upper floor side rails.
Figure 52:
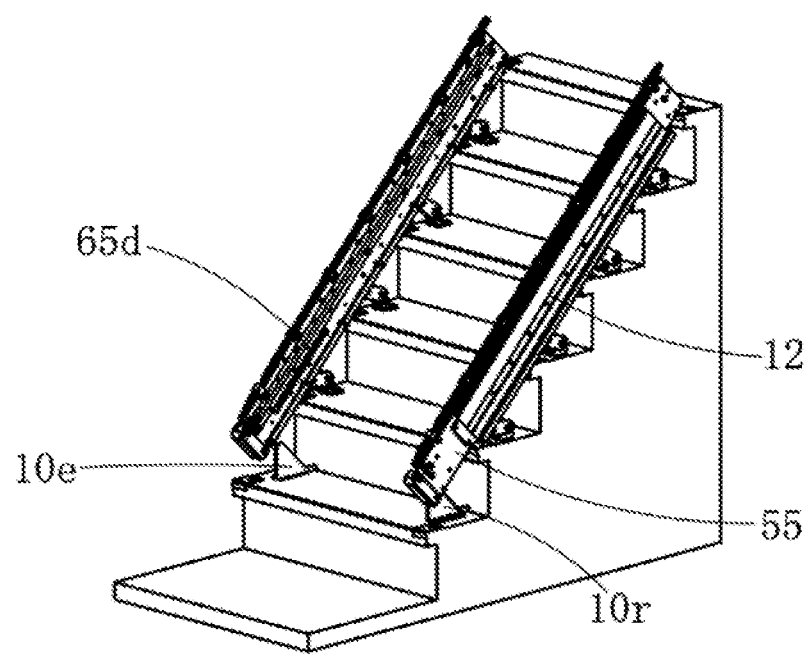
FIG. 52 is a perspective view to explain a state of an installation of lower floor side rails. The figure shows the case that the landing position of the lift step at the lower floor is the first step of the staircase.

FIG. 50 is an explanatory view of installed rails. The figure shows a case that the lift step landing position at a lower floor is a first step of a staircase from the lower floor. It is expected to reduce or avoid a protrusion of the stair lift into an outside of the staircase. When the lift step landing position at the lower floor is the lower floor, the rails are extended downwards by one step of the staircase and the guide-slopes 10e, 10r are installed on the lower floor. The rails are divided into three sections, i.e., top, middle, and bottom sections and are connected at rail joints 280. FIG. 51 is an explanatory view of the top section of the rails shown in FIG. 50. FIG. 52 is an explanatory view of the bottom section of the rails shown in FIG. 50. By standardizing the top and the bottom sections of rails, the mass production of them is expected to reduce costs. Regarding the middle section of the rails, a preparation of rails of which lengths are different in a stepwise manner is effective to counter variations of the rail length. The division of rails is effective for the transportation of the rails into narrow installation sites.

Figure 53:
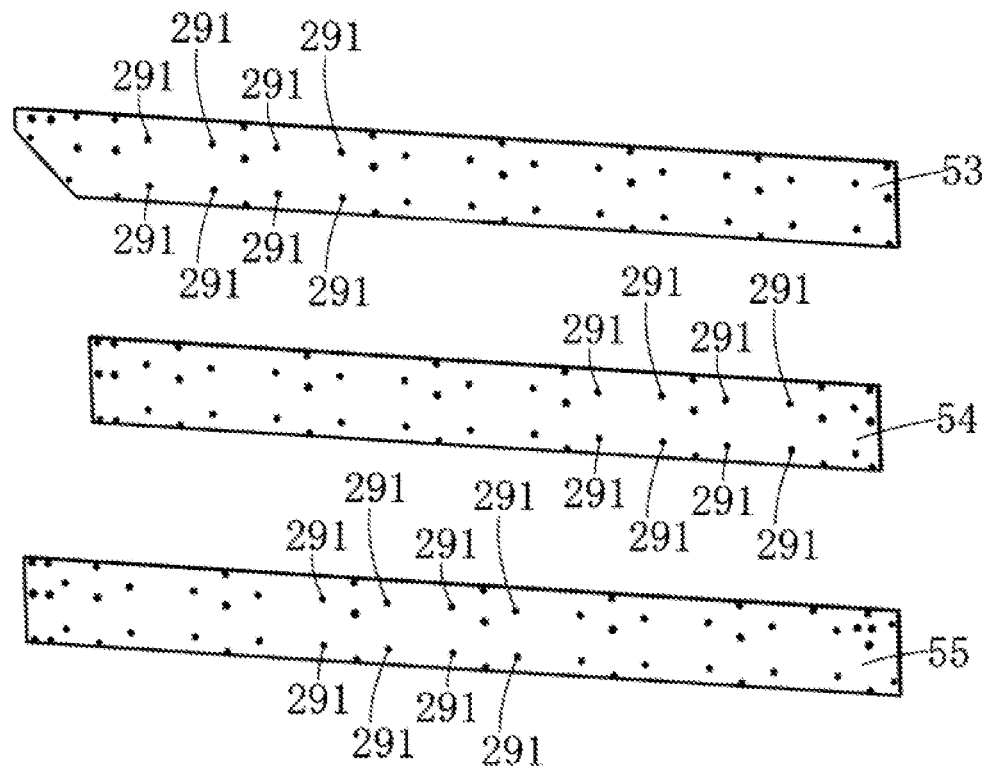
FIG. 53 is a perspective view of rail bases.
Figure 54:
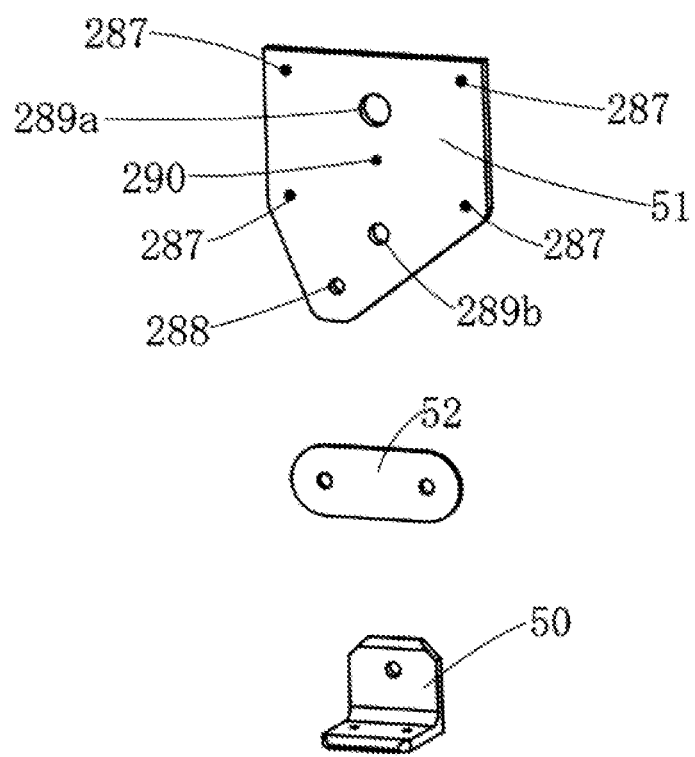
FIG. 54 is a perspective view of rail installation parts.

FIG. 53 is an explanatory view of examples of the top rail base 53, the middle rail base 54, and the bottom rail base 55. Please refer to FIG. 9. FIG. 54 is an explanatory view of rail installation devices. A rail mount auxiliary plate 51 is mounted on the rail base. A rail anchor 50 is properly installed on a step of a staircase or on a floor adjacent to the staircase. A link 52 connects the rail mount auxiliary plate 51 and the rail anchor 50. The rail mount auxiliary plate 51 provides threaded holes 287 for mounting itself on the rail base, a clearance hole 288 for a bolt which connects the link 52, and holes 289a, 289b which avert fasteners mounted on the rail base. The holes 289a and 289b are so arranged that the positions of the holes are invariable when the front and the back of the rail mount auxiliary plate is interchanged and mounted on the rail base. A threaded hole 290 is also provided for mounting the cable chain guide 12. A pitch of clearance holes 291 provided on the rail base for mounting the rail mount auxiliary plate 51 is the distance between the threaded holes 287 provided on the rail mount auxiliary plate 51 measured in a longitudinal direction of the rail base. Clearance holes provided on the rail base for mounting the travel rail and the inward deflection stopper rail (Refer to FIG. 9) are so arranged that positions of the clearance holes agree with positions of the holes 289a, 289b provided on the rail mount auxiliary plate 51 in order to prevent conflicts with fasteners when the rail mount auxiliary plate 51 is mounted on the rail base.

Figure 55:
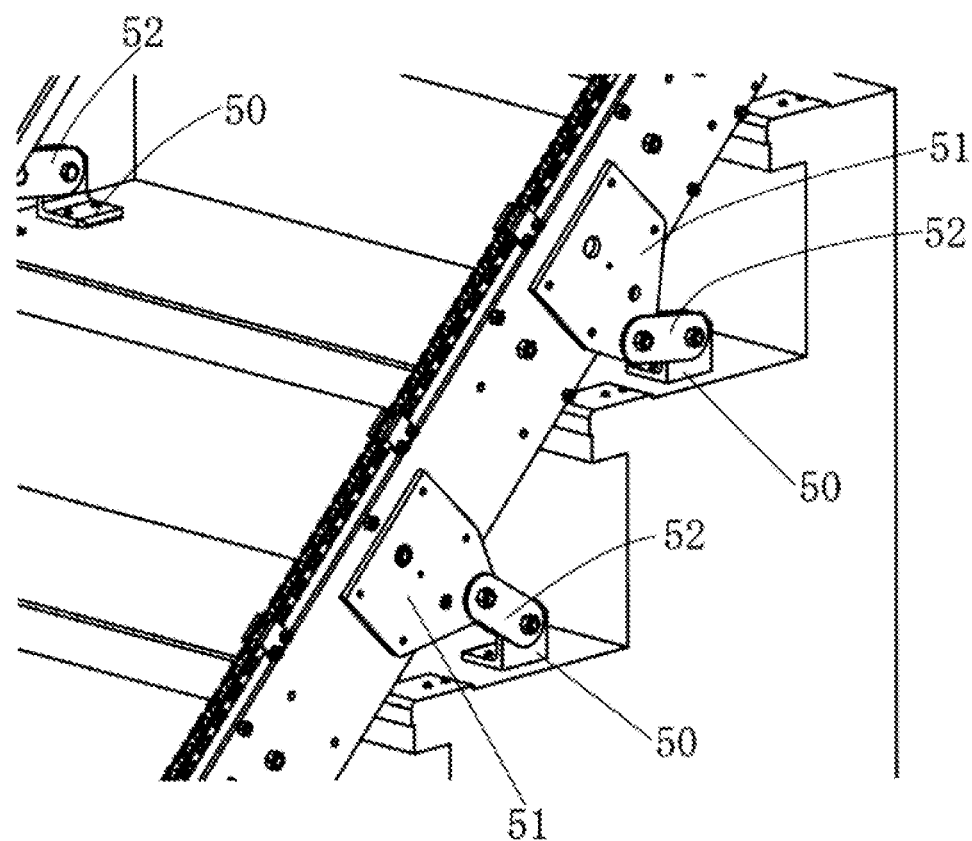
FIG. 55 is a perspective view to explain rail installation methods.

FIG. 55 is an explanatory view of a method installing the rails on a staircase. The rail mount auxiliary plate 51 can be mounted on the rail base without regarding its mounting face either the front face or the back face. However, when the front face and the back face of the rail mount auxiliary plate is interchanged and the plate is mounted on the rail base, the position of the clearance hole 288, which is for connection of the link 52, measured in a longitudinal direction of the rail base differs. The height of the clearance hole 288 measured in a vertical direction to the rail base longitudinal direction is invariant. By arranging the clearance hole 288 in the way described above, a choice of a mounting position of the rail mount auxiliary plate 51 gains more freedom when the rail mount auxiliary plate is mounted on the rail base.

A mounting position and a sense of the rail mount auxiliary plate 51 are decided in accordance with a relative position of the rail base and steps of the staircase. After connecting the rail mount auxiliary plate 51 mounted on the rail base and the rail anchor 50 placed on a step of the staircase or a floor adjacent to the staircase with the link 52, the position of the rail anchor 50 is fixed. In this embodiment, the rail mount auxiliary plate 51 is fixed with four low-head-screws inserted from the inside of the staircase. The rail anchor 50 and the rail mount auxiliary plate 51 are sandwiched between two links 52 and connected so that the rail is fixed on the staircase.

Figure 56:
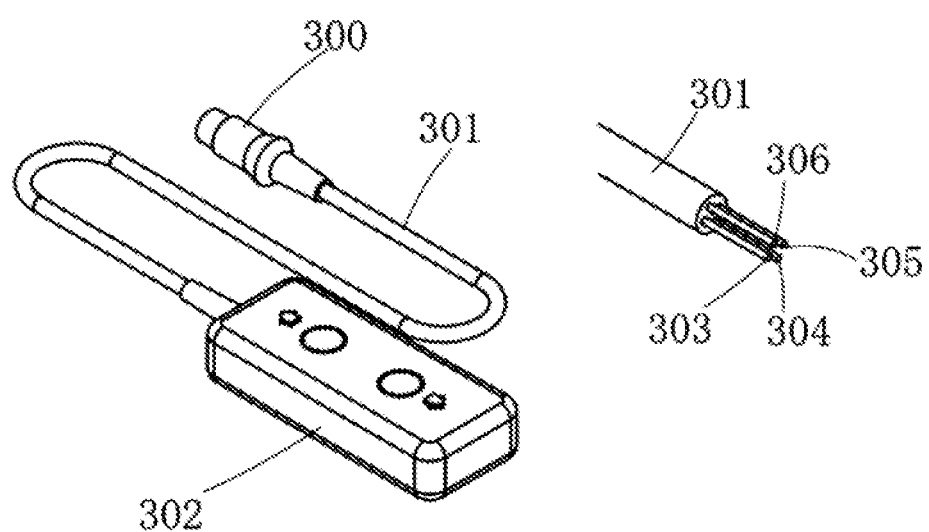
FIG. 56 is a perspective view to explain an example of a caregiver switch.

An example of a usage of the stair lift for caregiving is described in the following. FIG. 56 is an explanatory view of an example of a caregiver switch. A plug 300 is connected to the receptacle 7 (Refer to FIG. 1 through FIG. 5). A caregiver switch 302 can be a push button switch for a hoist. A cable 301 is a four-core cable. The cores are an up-command core 303, a down-command core 304, a common-core 305, and a common-core 306 to detect the connection of the plug. When the caregiver switch is connected, the control functions of the stair lift is transferred from the operation-handrails to the caregiver switch. A planned scheme is as follows. A caregiver stands at the lower floor side of the gantry-shape carriage. The caregiver is looking after a user, controlling the caregiver switch and climbs the staircase up and down. The travel speed of the gantry-shape carriage shall be set under the walking speed of the caregiver. With the caregiver switch, it will be possible to transport loads by the gantry-shape carriage.

An example of a stair lift installation method is described in the following. An installation work commences from the installation of rails on a staircase. Please refer to FIG. 50. After the installation, the gantry-shape carriage is fitted on the rails. The gantry-shape carriage is restrained to the rails in order to prevent derailing, and travels on the rails. Hence, it will be considered to fit the gantry-shape carriage from an end of the rails. However, a method of fitting from the top end of rails might be restricted by the height of a corridor adjacent to the staircase. A method of fitting from the bottom end of the rails might be inapplicable to an installation of the stair lift which lands the lift step on the lower floor. This embodiment adopts chains as travel traction rails and pin-gear sprockets as travel driving wheels. When the gantry-shape carriage is fitted from an end of the rails, the support devices of the chains mounted at the ends of the rails need to be dismantled, because they become obstacles against passing of the pin-gear sprockets.

Figure 57:
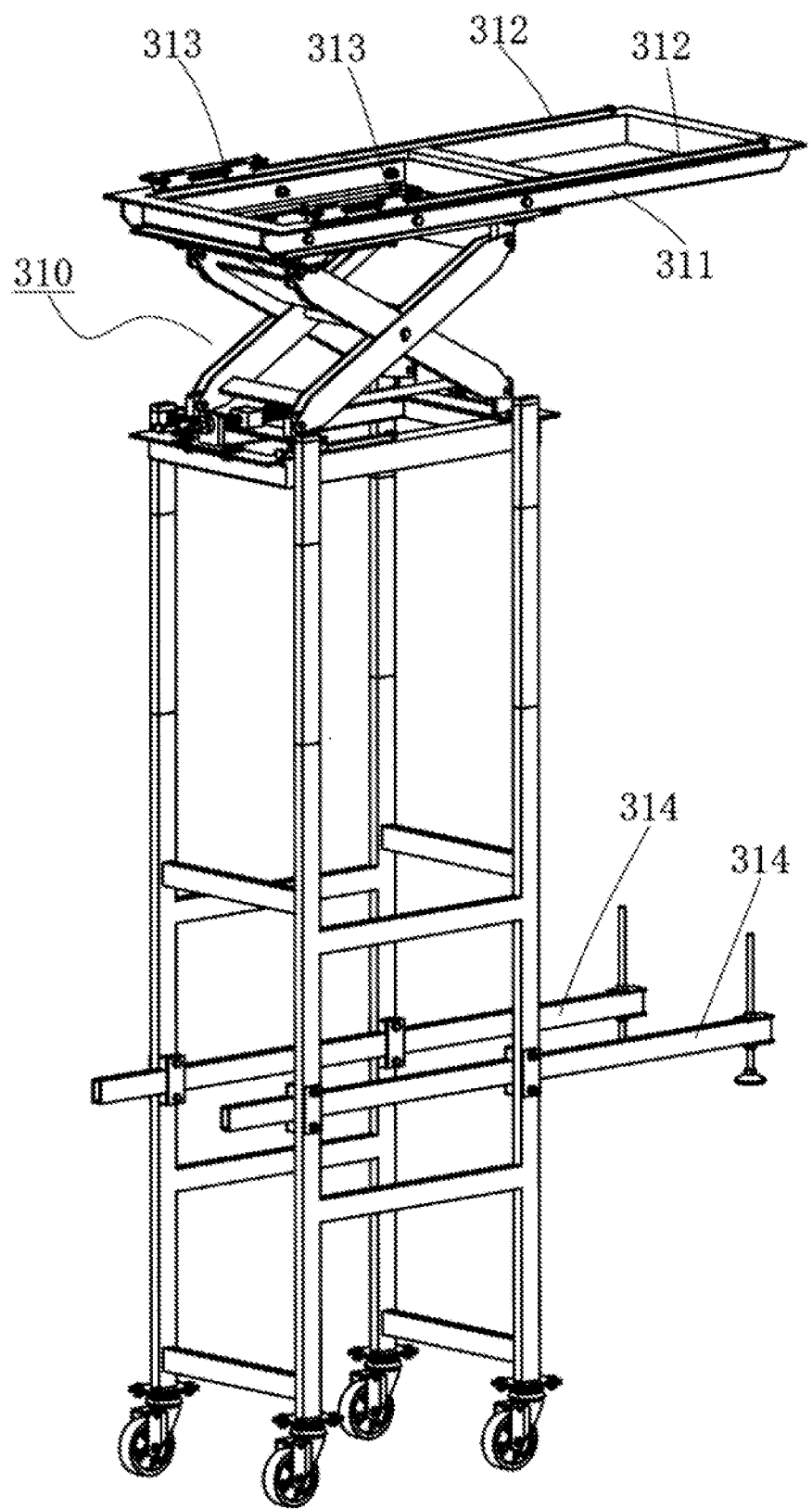
FIG. 57 is a perspective view to explain an example of a trestle for an installation work of the stair lift.

An example of a method which uses an installation work support and fits the gantry-shape carriage at the bottom end of rails is described in the following. FIG. 57 is a perspective view to explain the installation work support. A frame 311 of which height is adjusted by a pantograph mechanism 310 is provided at the top of the support. Guide rails 312 are mounted on the frame 311. A carrier 313 which moves along the guide rail is provided. An anti-toppling support 314 prevents the installation work support from toppling. The gantry-shape carriage is placed on the carriers 313. The bottom travel rails and the bottom chain support-cum-stabilizer rails (Refer to FIG. 9) have been dismantled from the bottom rail bases.

Figure 58:
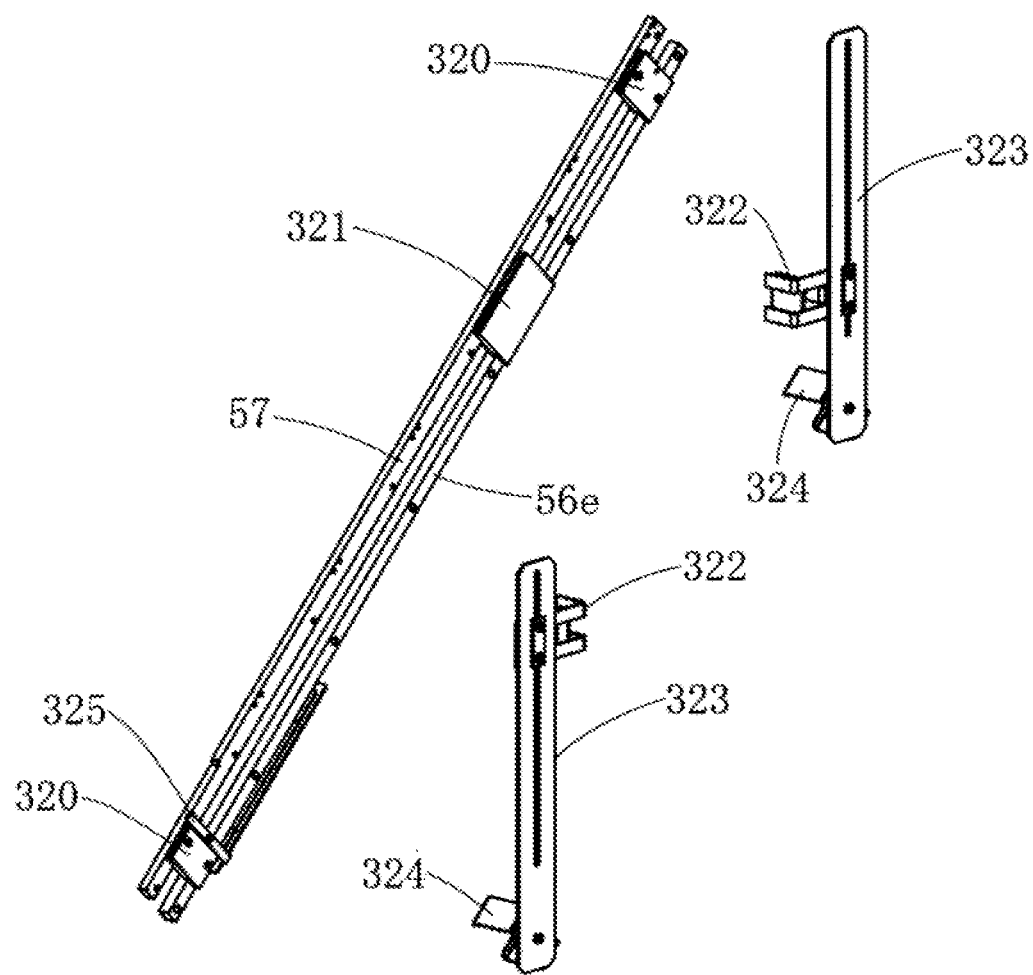
FIG. 58 is a perspective view to explain temporary support equipment for a travel rail and a chain support-cum-stabilizer rail.
Figure 59:
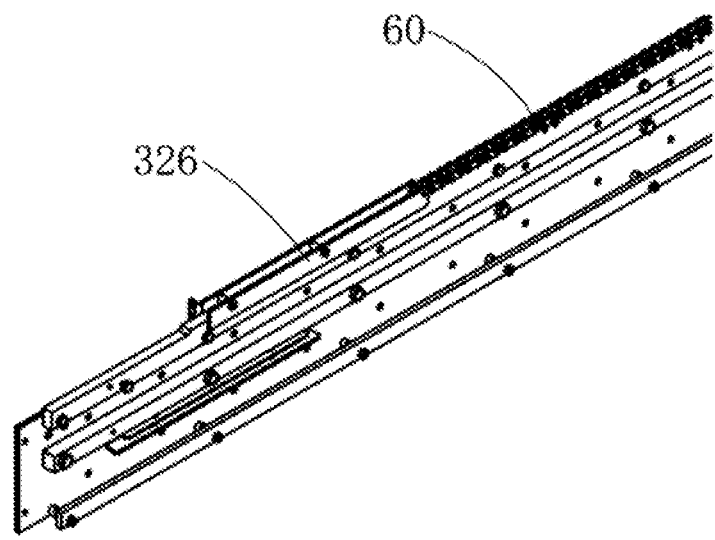
FIG. 59 is a perspective view of an example of a jig which pulls a chain during installation works of the stair lift.

FIG. 58 is an explanatory view of temporary supports of the travel rail and the chain support-cum-stabilizer rail. An application method of the temporary supports is explained with the left bottom rail as an example. A temporary holder block 320 is screwed on both ends of the bottom travel rail 56e and the bottom chain support-cum-stabilizer rail 57 (Refer to FIG. 9). The temporarily supported two rails are fitted on the left bogie, holding the travel wheels 42 (Refer to FIG. 8) in a space between the two rails. A clamp 322 is mounted on a front and a rear cover of a bottom portion of the leg structure of the gantry-shape carriage. A support 323 is mounted on the clamp 322 in height adjustable manner. A holder 324 is mounted on the bottom of the support 323. Each of the temporary holders 320 and a temporary holder block 321 provide a slot to fit a claw like portion of the holder 324. The temporary holder block 321 is temporarily attached on the above mentioned temporary bound rails with a strip of double-sided tape so that the claw like portion of the upper floor side holder 324 fits in a slot of the block 321. The temporary bound rails are movable in their longitudinal direction since the slot of the temporary holder block and the claw like portion of the holder slide each other. A falling off stopper 325 is provided on the bottom temporary holder 320. FIG. 59 shows an example of a chain puller jig. After the travel rail and the chain support-cum-stabilizer rail are fixed on the rail base, the chain 60 is mounted with the chain puller jig 326 shown in the figure.

Figure 60:
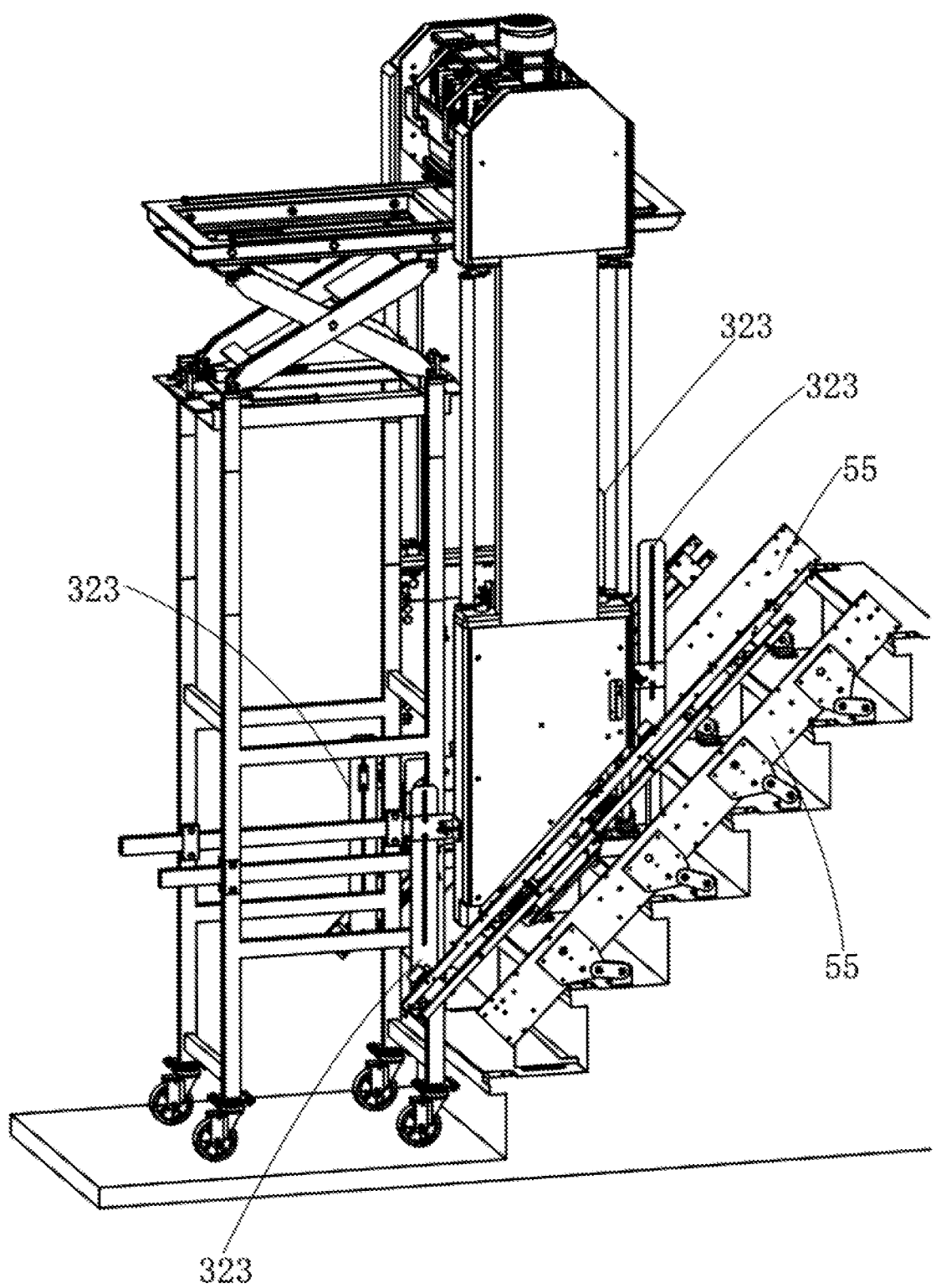
FIG. 60 is a perspective view to explain an example of an installation work of the gantry-shape carriage of the stair lift which lands the lift step on a first step of a staircase.

FIG. 60 shows an example of installation work of the gantry-shape carriage of the stair lift which lands the lift step on the first step of the staircase. The installation work is imagined as follows.

(1) The carriers 313 of the installation work support are positioned above the pantograph mechanism 310.

(2) The gantry-shape carriage without the inner covers of the leg structures and the covers of the connecting structure is placed on the carriers 313. The coupling which connects the travel power output shaft 70 (Refer to FIG. 11) and the drive sprocket shaft 103 (Refer to FIG. 17) is disconnected.

(3) The temporary supports (Refer to FIG. 58) are attached on the gantry-shape carriage. The above mentioned temporarily bound rails are attached to the temporary supports.

(4) The installation work support is set at a position shown in the figure.

(5) The gantry-shape carriage is moved to the position shown in the figure, then its height is adjusted with the pantograph mechanism 310.

(6) The temporarily bound travel rails and chain support-cum-stabilizer rails are fixed on the rail bases.

(7) The temporary supports are removed. Then, the chain is pulled with the chain puller jig and fixed. The pin-gear sprocket is turned by the passing of the chain.

(8) The coupling of the travel power output shaft and the drive sprocket shaft is joined.

(9) The installation work support is removed. The cover and power supply equipment are mounted.

Embodiment 2

Embodiment 2 deals with the lifting mechanism of the lift step. Regarding the lifting mechanism of the lift step, another method which stops the downward movement of the step lifting guide base is described with an example of the right lifting mechanism. The method of the embodiment 2 is a method which fixes the load table downward stop position regardless of the movement of the hook. Since threaded holes provided on the bottom base for mounting parts, clearance holes provided on the step lifting guide base for mounting parts, the hook, and the load table are different from those of the embodiment 1, reference signs shown in figures are different.

Figure 61:
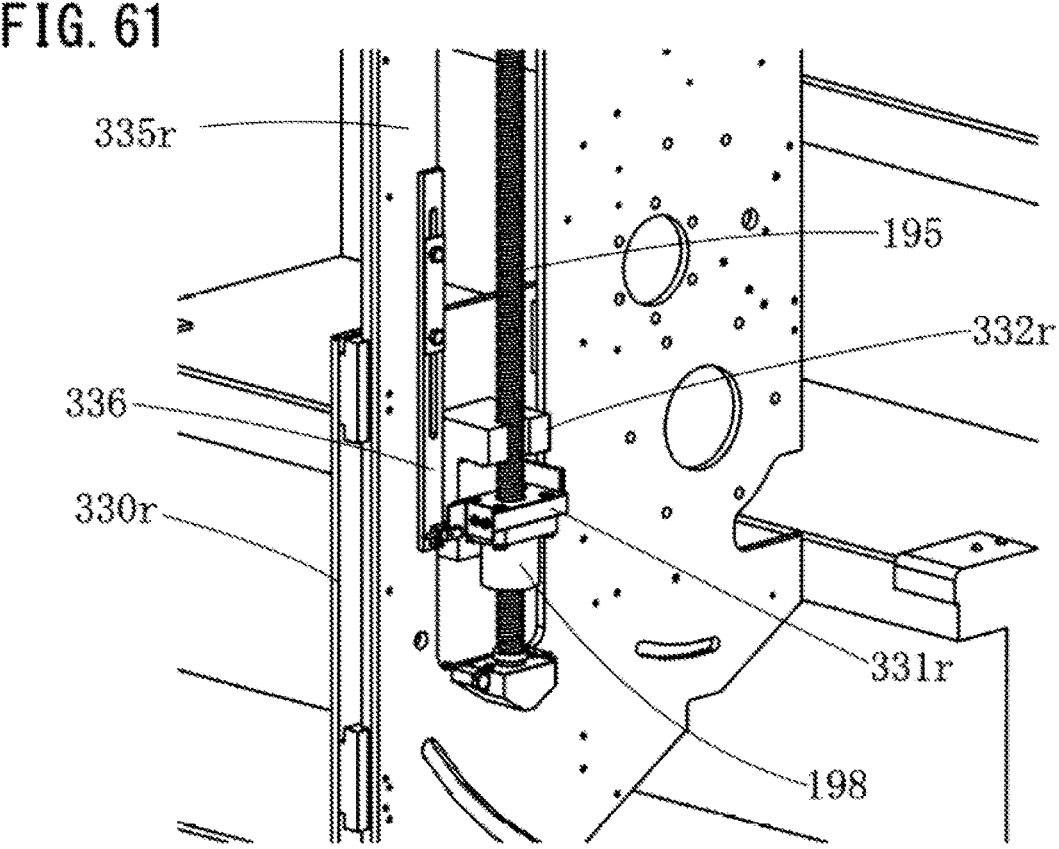
FIG. 61 is a perspective view to explain a state of a load table, which lifts a step lifting guide base up and down, has stopped after a lift step landed on a step of a staircase. (Embodiment 2)

FIG. 61 shows a state that the lift step has landed on a step of a staircase and the load table 331$r$ which drives the step lifting guide base up and down stops. A hook 332$r$ is mounted on the step lifting guide base 330$r$. The load table 331$r$ is mounted on the nut 198. A gap between the surface of the load table 331$r$ which pushes up the hook 332$r$ and the facing surface of the hook 332r is wider than the gap shown in FIG. 37 in terms of comparison.

Figure 62:
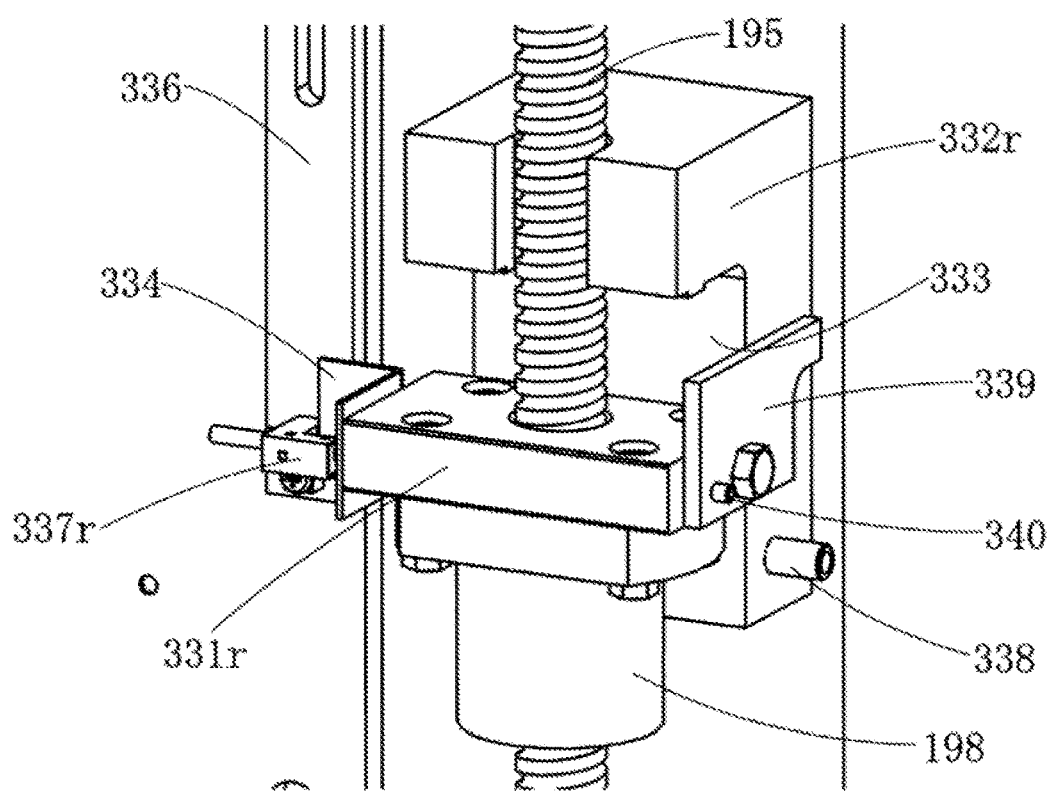
FIG. 62 is a partially enlarged perspective view of the hook and the load table shown in FIG. 61, seen from a different angle. (Embodiment 2)

FIG. 62 is an enlarged perspective view of the hook and the load table shown in FIG. 61, seen from a different point of view. A sensor target 334 is attached to the load table 331r. A sensor 337r is fixed on a sensor bracket 336. The sensor bracket 336 is mounted on the bottom base 335r in a position adjustable manner. The sensor 337 detects the sensor target 334.

If the travel stop position of the gantry-shape carriage deflects from its target position, then the downward stop position of the hook 332r changes in response to the deflection of the stop position. The fact can be explained as follows. The lift step landing position is fixed in accordance with the relative position of the guide-slope which is installed on a step of a staircase or on a floor and the cam follower which is mounted on the step suspension base. Therefore, a deflection angle of the parallelogram linkage which connects the step lifting guide base and the step suspension base varies in response to the change of the gantry-shape carriage stop position. Hence, the downward stop position of the step lifting guide base varies in response to the change of the gantry-shape carriage stop position.

Providing that the maximum deflection of the travel stop position of the gantry-shape carriage is determined, the lowest limit of the downward stop position of the hook 332r is fixed. Based on the load table 331r position which corresponds to the lowest limit, the load table downward stop position is set at a further down position. The sensor 337r position is adjusted to detect the sensor target 334 which is lowered at the further down stop position. The rotation of the screw shaft 195 is stopped with a signal detected by the sensor 337r.

Hence, as shown in FIG. 62, a sliding distance of the hook surface 333 and the side surface of the load table 331r is set to be longer than that of the embodiment 1. A separation stopper pin 338 is provided on the hook 332r. The separation stopper pin 338 and a stopper 339 prevent sliding movements of the side of the load table 331 and the hook surface 333 from coming off during the gantry-shape carriage transportation and installation work.

Since the sensor 337r is fixed, its sensor code is fixed. Hence, there is an advantage that a sensor cabling method becomes simpler than that of the embodiment 1. On the other hand when a moving up and down speed of the load table 331r is set at a slower speed, a time lag between the moment when the lift step lands and the moment when the step lifting guide base stops its downward movement becomes longer. When the lift step gets on an obstacle on a step of a staircase during its downward movement, the mechanism which drives the step lifting guide base downwards does not stop instantly. If the lift step gets on a big obstacle during its downward movement and the stopper 339 hits the separation stopper pin 338, then the load table 331r which is driven downwards pushes the hook 332r downwards. In such a case, there will be risks that the obstacle is compressed and an excessive stress is applied on the lift step lifting mechanism. As a countermeasure against the risks. It is recommended to adopt a shear-pin for a pin 340 which is used for mounting the stopper 339.

Embodiment 3

The embodiment 3 introduces a method which restricts the swinging of the lift step toward the upper floor side while the gantry-shape carriage is traveling. While the gantry-shape carriage is traveling, the link of the parallelogram linkage connecting the lift step and the step lifting guide base is kept at a deflected position from its vertical direction with the swing stopper 235. The lower floor side swing of the lift step is restricted with the swing stopper 235. On the other hand, the upper floor side swing of the lift step is not restricted.

When a user gets on the lift step, the gravity generates a torque which acts on the parallelogram linkage to turn to a vertical direction. The torque is countered with the swing stopper 235 so that the position of the lift step is stabilized, as it is mentioned in the embodiment 1. Counter torques which cancel the torque applied on the parallelogram linkage due to the gravity are a torque generated by the acceleration during a stopping procedure of the traveling gantry-shape carriage, a torque generated by the acceleration during a starting up of a downward travel of the gantry-shape carriage and etc.

The parallelogram linkage deflection angle from its vertical direction is set at around 4.6 degrees in the embodiments. The above torque due to the accelerations does not disturb the stability of the lift step, while the generated accelerations are about 0.4 m/s/s. However, for instance, if a mischief such that a child hangs from the operation-handrails and kicks the lift step is anticipated, then a countermeasure is needed. From a theoretical point of view, when the gantry-shape carriage stops its traveling in a quite short time, there may be a risk to lose the stability of the lift step.

Figure 63:
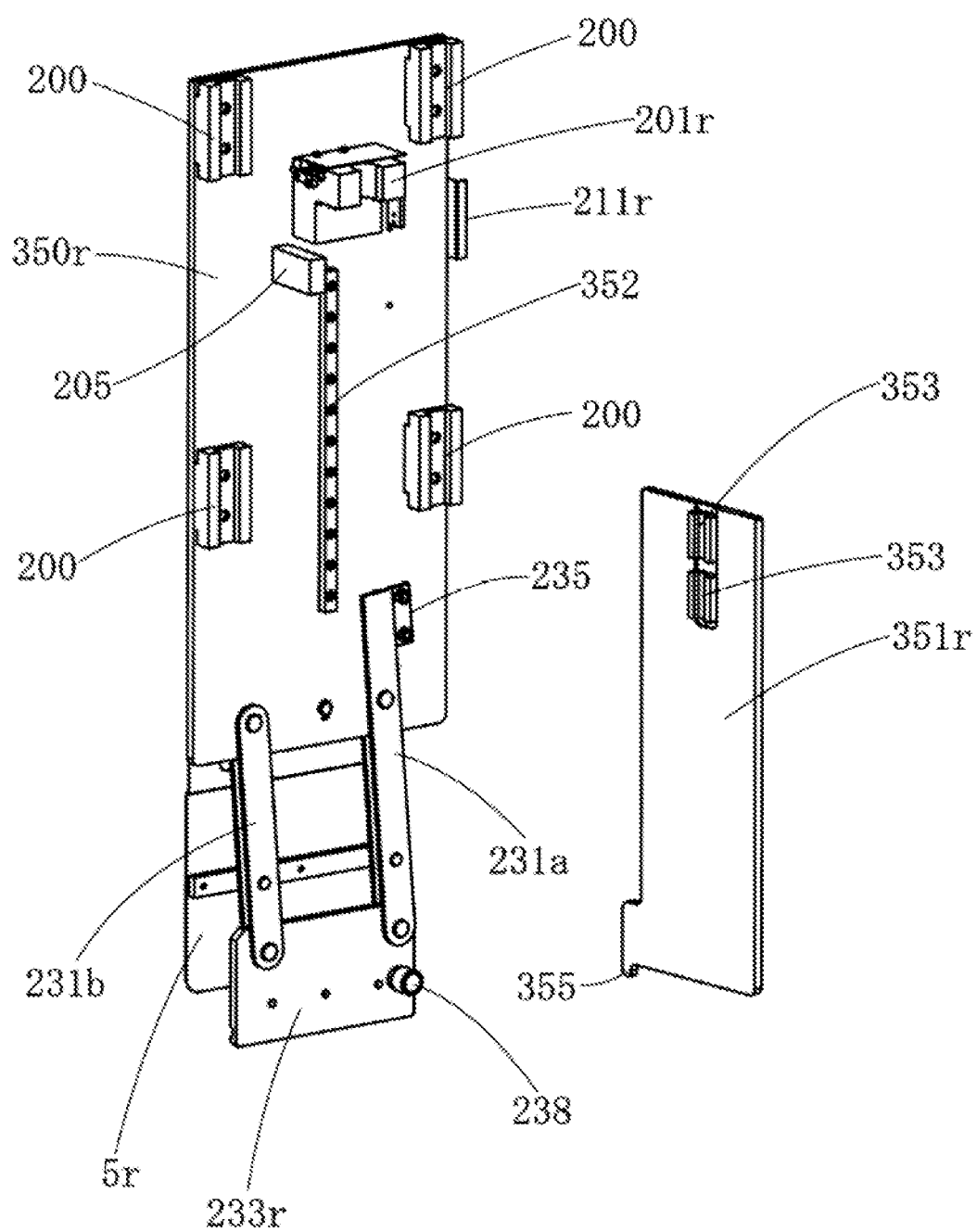
FIG. 63 is a perspective view of a floating lock plate, which restricts upper floor side swing of a lift step while the gantry-shape carriage travels, a step lifting guide base, and related equipment. (Embodiment 3)

FIG. 63 shows a right step lifting guide base 350r and a right floating lock plate 351r. A guide rail 352 is mounted on the step lifting guide base 350r in parallel to the up and down movements of the step lifting guide base 350r. Sliders 353 which slide along the guide rail 352 are mounted on the floating lock plate 351r. A portion 355, which protrudes downwards, of the bottom of the floating lock plate 351r is provided in order to restrict the swinging of the cam follower 238 toward upper floor side. The floating lock plate 351r is positioned between the step lifting guide base 350r and the bottom base 23r.

Figure 64:
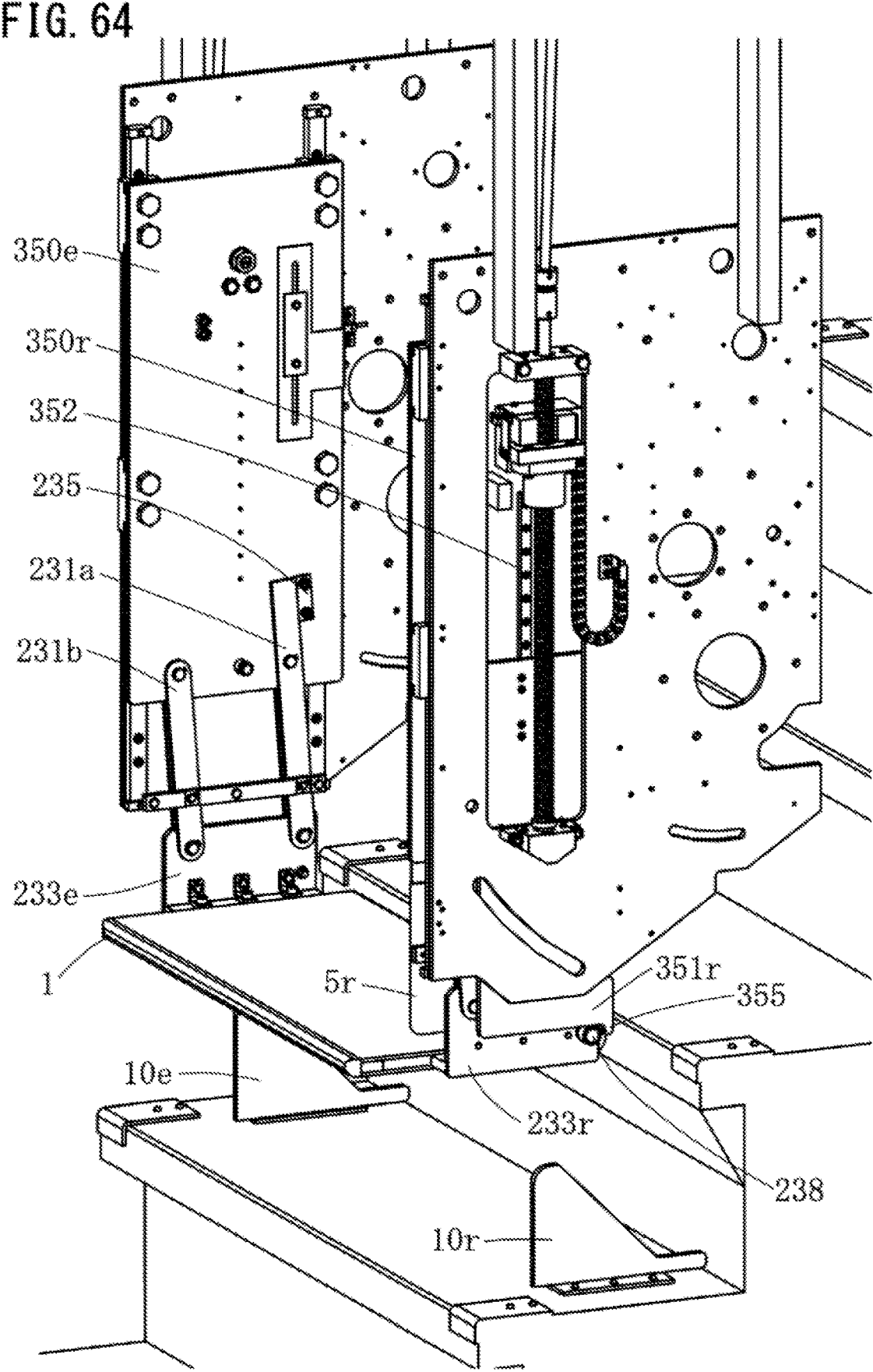
FIG. 64 is a perspective view of the floating lock plate, the step lifting guide base, and the related equipment while the lift step is at a position designated for a traveling gantry-shape carriage. A left protection cover is removed in order to show a state of the parallelogram linkage. (Embodiment 3)

FIG. 64 is an explanatory view of the lift step 1 while the gantry-shape carriage is traveling. The left protector 5e is removed to show the state of the parallelogram linkage. The floating lock plate 351r falls free along the guide rail 352, then the falling is stopped with the cam follower 238 mounted on the step suspension base 233r. When the lift step 1 swings to the upper floor side, the cam follower 238 hits the protruding portion 355 of the floating lock plate 351r so that the upper floor side swing of the lift step 1 is restricted. In order to prevent the floating lock plate 351r from coming up due to a component force generated at the time when the cam follower 238 hits the protruding portion 355, the protruding portion is formed in such a way that the tangent plane of the cam follower 238 and the protruding portion 355 is in a vertical direction.

Figure 65:
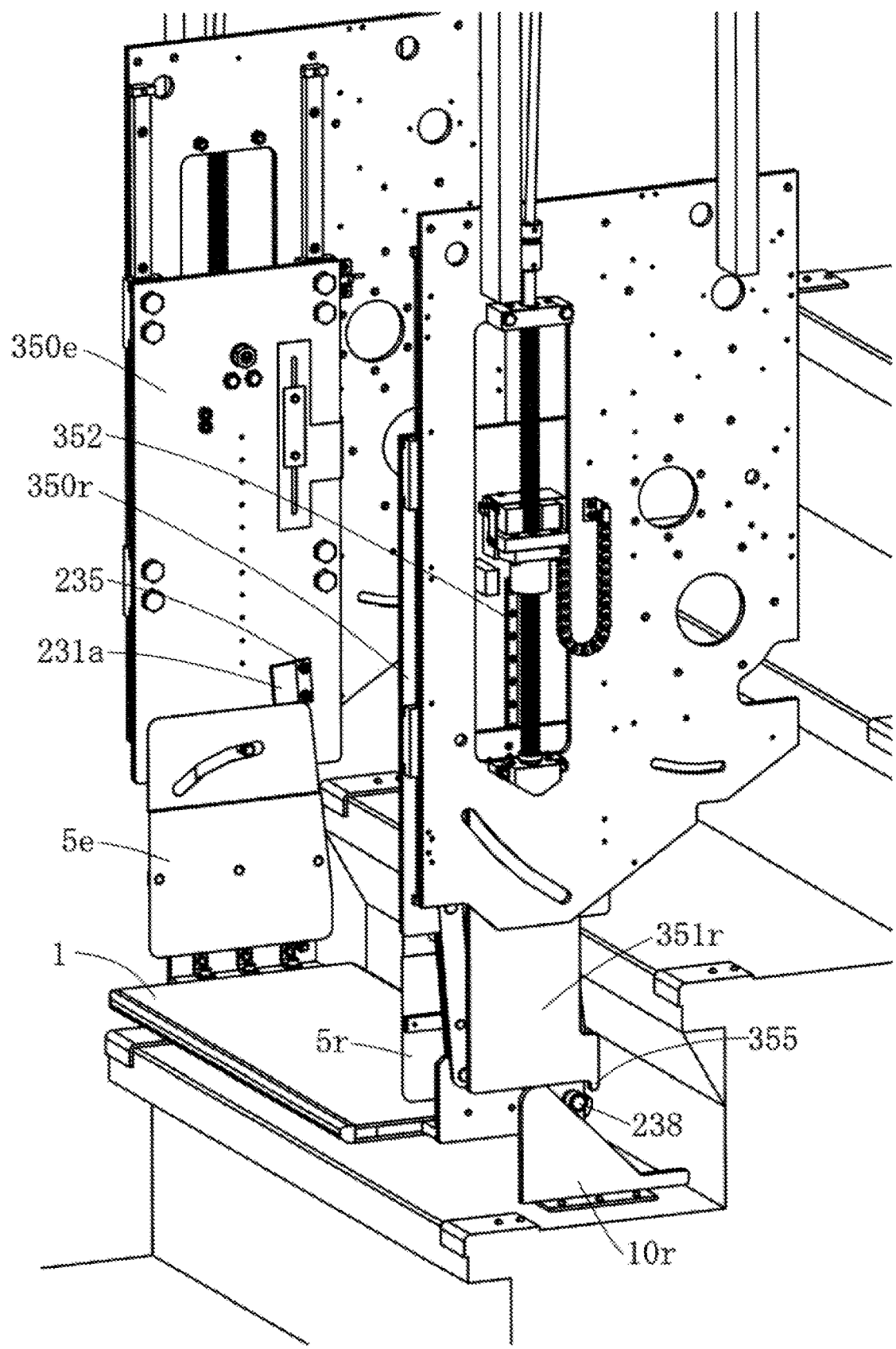
FIG. 65 is a perspective view of the floating lock plate and the step lifting guide base at the moment when a cam follower, which is mounted on a step suspension base, touches the guide slope after the floating lock plate goes down and is stopped by a collision with the guide slope while the lift step is moving downwards, then the lift step further moves downwards. (Embodiment 3)

When the lift step 1 moves downwards, the floating lock plate 351r hits the guide-slope 10r and stops its downward movement during the lowering procedure. The lift step 1 continues to move downwards and the cam follower 238 contacts the guide-slope 10r. FIG. 65 shows the state at the moment when the cam follower 238 contacts the guide-slope 10r. After the moment, the cam follower 238 rolls downwards on the guide-slope 10r. Hence, the lift step 1 goes downwards, moving toward a riser of the staircase, then lands on a step of the staircase.

It is required that the protruding portion 355 of the floating lock plate 351r should not obstruct the movement of the cam follower 238 which rolls downwards on the guide-slope 10*r*. Hence, it is necessary to pay careful attention to the following. Keeping the state shown in FIG. 64, assume that the cam follower 238 moves to the direction of rolling downwards on the guide-slope 10*r*. Under the assumption, set the horizontal gap between the cam follower 238 and the protruding portion 355 in order to prevent a conflict between the cam follower 238 and the protruding portion 355.

When the lift step 1 moves downwards from the state shown in FIG. 64 and the cam follower 238 contacts the guide-slope 10*r* before the floating lock plate 351*r* contacts the guide-slope 10*r*, then risks of conflicts between the cam follower 238 and the protruding portion 355 arise. In order to prevent the conflicts, it is recommended to form the bottom shape of the floating lock plate 351*r* so that the floating lock plate 351*r* contacts the guide-slope 10*r* before the cam follower 238 contacts the guide-slope 10*r*, even when the travel stop position of the gantry-shape carriage deflects to the lower floor side.

The state shown in FIG. 65 is also a state at a moment when the cam follower 238 detaches from the guide-slope 10*r* while the lift step is moving upwards from its landed position. After the moment, the vertically moving cam follower 238 hits the floating lock plate 351*r*, then the floating lock plate 351*r* and the step lifting guide base 350*r* moves upwards together.

Figure 66:
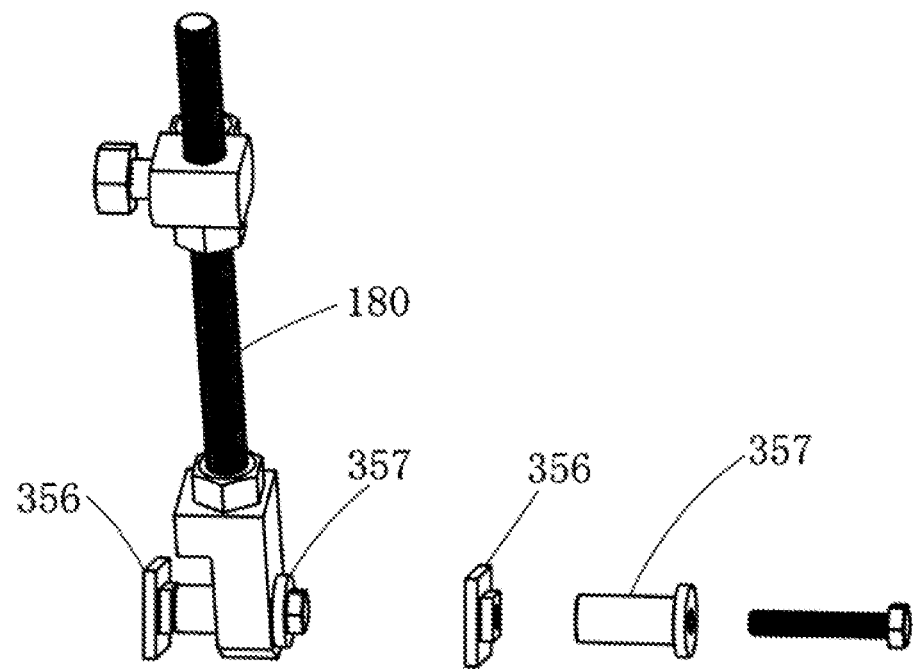
FIG. 66 is a perspective view of an example of a clamping method to mount a bogie base mounting angle fixing rod. (Embodiment 3)

The floating lock plate needs to be positioned between the step lifting guide base and the bottom base. Hence, a careful attention is necessary to prevent conflicts with the reinforcing bolt 181 (Refer to FIG. 34) which protrudes from the bottom base to the lift step side in order to mount the bogie base. FIG. 66 shows an example of a fastening method which avoids the conflicts with the floating lock plate and which mounts the bogie base angle fixing rod 180 (Refer to FIG. 33) on the bottom base. A special nut 356 is fitted in the slot 183 provided on the bottom base. An end bracket of the bogie base angle fixing rod 180 and the special nut 356 are fastened with a bolt fitted through a special pin 357 of which diameter is the same of the reinforcing bolt 181.

According to the embodiment 3, regarding the mischief such that a child hangs from the operation handrails and kicks the lift step, swings of the lift step to the upper floor side can be restricted while the gantry-shape carriage is traveling. Because the downward movement of the floating lock plate is based on the gravity, the mass of the gantry-shape carriage is increased by the mass of it. It is necessary to provide a countermeasure to prevent the floating lock plate from falling off during the transportation and installation of the gantry-shape carriage.

Embodiment 4

Figure 67:
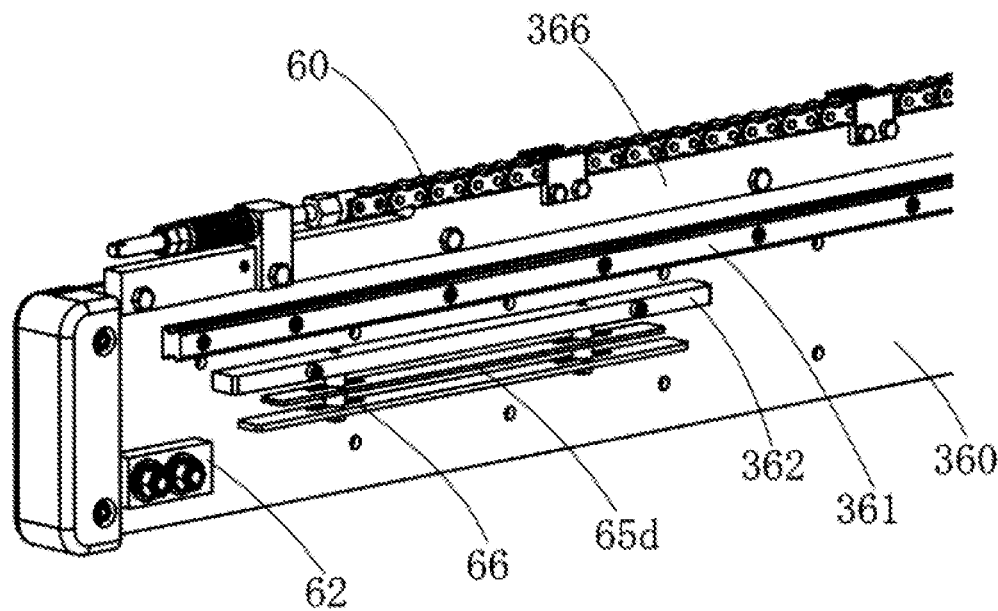
FIG. 67 is a perspective view of a lower floor side of a left rail when guide rails and sliders are applied to a traveling mechanism of the gantry-shape carriage. (Embodiment 4)

The embodiment 4 is a system which adopts guide rails and sliders for rails and bogies of the stair lift. An example of a left bottom rail and a bogie are described in the following. FIG. 67 shows the left bottom rail. A bottom guide rail 361 is mounted on a bottom rail base 360. The lower floor side stop-position-target 65*d* and the sensor target protector 66 are mounted on a support bracket 362. The buffer stop 62 is provided at the bottom end of the rail base. A bottom chain support rail 366 is mounted on the bottom rail base 360 and supports the chain.

Figure 68:
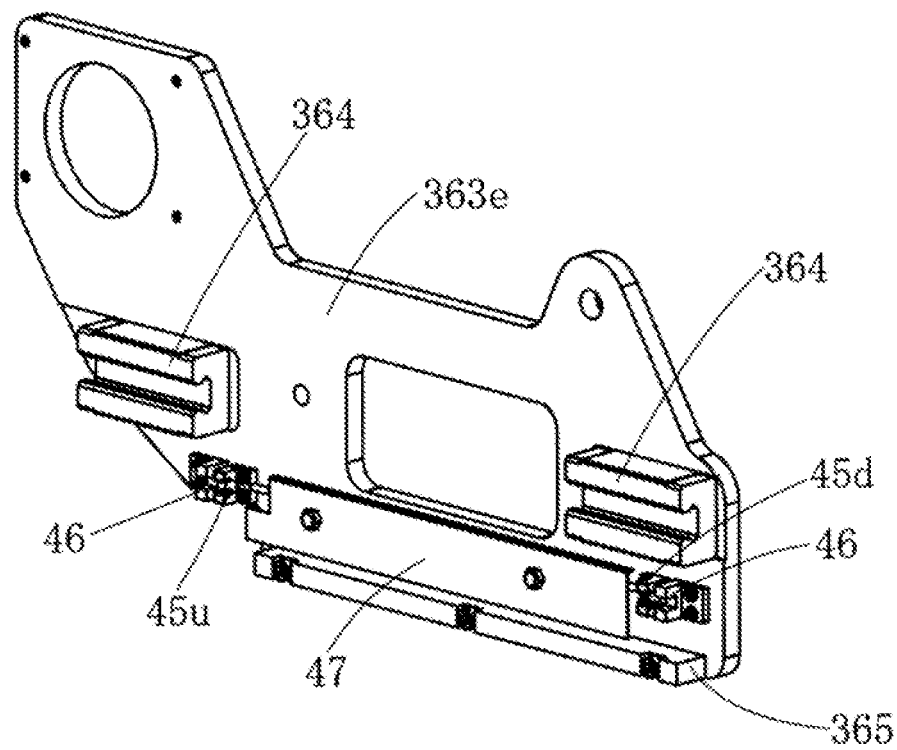
FIG. 68 is a perspective view of a left bogie when guide rails and sliders are applied to the traveling mechanism of the gantry-shape carriage. (Embodiment 4)

FIG. 68 shows a left bogie. Sliders 364 are mounted on a bogie base 363*e*. The slides 364 slide on the bottom guide rail 361 as well as a middle and a top guide rails which are joined. A support member 365 which is mounted at the bottom of the bogie base 363*e* supports sensor cables and hits the buffer stop 62 when the bogie overruns.

According to the embodiment 4, the travel rails and the bottom inward deflection stopper rails which are adopted in the embodiment 1 through 3 become redundant. The toppling prevention function of the chain support-cum-stabilizer rail becomes redundant. Travel wheels, the outward deflection stopper rollers and the inward deflection stopper rollers become redundant. Hence, there is an advantage which simplifies the rail system and the bogie mechanism. Applications of guide rails and sliders prevail in machine tools. However, it is anticipated that the application to the stair lift of this invention increases its cost.

LIST OF REFERENCE SIGNS

"r" and "e" of reference signs indicate right side and left side respectively. "r" and "e" are omitted in the following list.

1 Lift step
2 Lower floor side operation-handrail
3 Upper floor side operation-handrail
4 Inner cover
5 Protector
6 Operation mode switch
7 Receptacle
8 Terminal block to connect power and signal cable
10 Guide-slope
11 Cable chain
12 Cable chain guide
13*d* Footswitch on lower floor
13*u* Footswitch on upper floor
14 Lower floor
15 Upper floor
20 Leg frame
21 Top base
22 Connecting column
22*a* Square pipe
22*b* Tie plate
23 Bottom base
24 Alignment pin
28 Leg structure frame
30 Connecting structure frame
31 End plate
32 Alignment hole
33 Travel power unit mounting base
34 Travel power unit mounting hole
40 Bogie base
41 Bearing hole
42 Travel wheel
43 Outward deflection stopper roller
44 Inward deflection stopper roller
45*u* Position sensor of upper floor side
45*d* Position sensor of lower floor side
46 Sensor protector
47 Sensor cable cover
49 Cable chain bracket
50 Rail anchor
51 Rail mount auxiliary plate
52 Link
53 Top rail base
54 Middle rail base
55 Bottom rail base
56 Bottom travel rail
57 Bottom chain support-cum-stabilizer rail
58 Bottom inward deflection stopper rail
59 Chain guide
60 Chain
61 Chain puller 62 Buffer stop
63 Belleville spring
64 Shoulder bolt to preload Belleville spring
65d Lower floor side stop-position-target
65u Upper floor side stop-position-target
66 Sensor target protector
70 Travel power output shaft
71 Bearing unit support
72 Travel power unit base
73 Geared motor with brake for travel
74 Electromagnetic power off brake
75 Slit disc
76a Sensor
76b Sensor
80 Control panel base
81 Magnetic contactor of main power supply
82 Magnetic contactor to control a geared motor with brake for travel
83 Magnetic contactor to control an electromagnetic power off brake
84 Magnetic contactor to control a geared motor with brake for lifting the left side of the lift step
85 Magnetic contactor to control a geared motor with brake for lifting the right side of the lift step
86 Brake power supply rectifier of a geared motor with brake for travel
87 Power supply rectifier of an electromagnetic power off brake
88 Brake power supply rectifier of a geared motor with brake for lifting the left side of the lift step
89 Brake power supply rectifier of a geared motor with brake for lifting the right side of the lift step
90 Interposing relay for footswitch
91 Auxiliary relay
92 Programmable logic controller
93 Single phase to three phase inverter
94 Reactor for inverter
95 Inverter panel base
96 Brake resistor
100 Chain loop
101 Bearing housing of drive sprocket shaft
102 Drive sprocket
103 Drive sprocket shaft
104 Bearing housing of driven sprocket shaft
105 Driven sprocket
106 Driven sprocket shaft
107 Drive gear
108 Bearing housing of pin-gear sprocket shaft
109 Driven gear
110 Pin-gear sprocket shaft
111 Pin-gear sprocket
115 Junction box
116 Bracket
117a Terminal block
117b Terminal block
117c Terminal block
120 Rotating arm axle
121 Rotating arm
122 Idler sprocket
123 Idler sprocket
124 Drive link
125 Drive arm axle
126 Drive arm
127 Connecting member
128 Extension spring
129 Chain elongation sensor
130 Idler sprocket
134 Screw
135 Special screw of which tip is formed as an axle
140 Overspeed detector
141 First speedup gear
142 Second speedup gear
143 Third speedup gear
144 Casing lid
145 Casing body
146 Ring shaped protrusion of casing
147 Drive gear
148 Flange of drive gear
149 Bearing
150 Shall
151 Flange of shaft
152 Base
153 Ring shaped protrusion of base
154 Mounting base
155 Hammer
156 Link
157 Extension spring
158 Axle
159 Slot
160 Sprag
161 Sprag axle
162 Spring
163 Brake base
164 Bolt
165 Whirl-stop pin
166 Inner surface of brake base rim
167 Axle hole
168 Brake drum
169 Cylindrical outer surface of brake drum
170 Lid
171 Axle hole
172 Sprag retainer ring
173 Hook
174 Latch
175 Extension spring
176 Brake cover
180 Bogie base mounting angle fixing rod
181 Reinforcing bolt
182 Reinforcing bolt
183 Arc-shaped slot
184 Arc-shaped slot
190 Geared motor with brake
191 Support base
192 Universal joint
193 Connecting rod
194 Universal joint
195 Screw shaft
196 Top bearing
197 Bottom bearing
198 Nut
199 Guide rail
200 Slider
201 Hook
202 Hook surface facing a side of load table
203 Step lifting guide base
204 Load table
205 Separation stopper block
206 Sensor
207 Cable chain
208 Sensor target
209 Hook surface
210 Sensor
211 Sensor target
212 Retainer 213 Screw
221g Gap between lift step and tread of a stair case
224 Movable type lift step
225 Fixed type lift step
231a Upper floor side link of a parallelogram linkage
231b Lower floor side link of a parallelogram linkage
232 Triangular prism shaped member
233 Step suspension base
234 Protector support
235 Swing stopper of a parallelogram linkage mounted on step lifting guide base
238 Cam follower mounted on step suspension base
251 Bottom base
252 Bottom shaft
253 Plastic bearing
254 rotation limiting rod
255 Stopper
256 Stopper
257a Return spring
257b Return spring
258 Cover
259 Socket
260 Notch
261 O-ring
262a Support arm
263 Sensor target
264a Sensor
265 Sensor bracket
266 Top shaft
268 Mode selector null switch
269 Pilot lamp
270 Travel speed selector switch
280 Rail joint
287 Threaded hole
288 Clearance hole
289a Hole to avert a fastener
289b Hole to avert a fastener
290 Threaded hole to mount cable chain guide
291 Clearance hole for bolt to mount rail mounting plate 51
300 Plug
301 Cable
302 Caregiver switch
303 Up command core
304 Down command core
305 Common core
306 Common core to detect connection of plug
310 Pantograph mechanism
311 Frame
312 Guide rail
313 Carrier
314 Anti-toppling support
320 Temporary holder block
321 Temporary holder block
322 Clamp
323 Support
324 Holder
325 Falling off stopper
326 Chain puller jig
330 Step lifting guide base
331 Load table
332 Hook
333 Hook surface
334 Sensor target
335 Bottom base
336 Sensor bracket
337 Sensor
338 Separation stopper pin
339 Stopper
340 Pin
350 Step lifting guide base
351 Floating lock plate
352 Guide rail
353 Slider
355 Downward protruding portion of floating lock plate
356 Special nut
357 Special pin
360 Bottom rail base
361 Bottom guide rail
362 Support bracket
363 Bogie base
364 Slider
365 Support member
366 Bottom chain support rail

The invention claimed is:

1. A stair lift, comprising:
two rails disposed along a staircase in parallel to the width direction of the staircase;
a gantry-shape carriage having a gantry shaped structure, being a self-propelled carriage, wherein said gantry-shape carriage is restricted not to come off said rails and travels on said rails; and
a lift step disposed between left and right leg structures of said gantry-shape carriage and being supported by a lifting mechanism provided in said leg structures,
whereby when said gantry-shape carriage stands by, said lift step lands on a floor adjacent to said staircase or on a step of said staircase, and when said gantry-shape carriage travels, said lift step is held at a position where said lift step does not conflict against steps of said staircase.

2. The stair lift of claim 1, wherein said leg structure comprises:
an operation-handrail arranged in vertical direction;
an arm, which mounts said operation-handrail at an end and which mounts an axle at the other end;
an axle support mechanism which restricts a range of rotation angle of said axle, when the stair lift stands by, said axle support mechanism retains rotation angle of said axle with an elastic member at an angle which corresponds to the state of the stair lift standby state; and
a detection apparatus to detect a state that said axle rotates more than or equal to a preset angle,
wherein the end of said arm, on which said operation-handrail is mounted, moves in an arc locus when said axle rotates, and a detected signal of said detection apparatus is adopted to control the stair lift.

3. The stair lift of claim 1, wherein an installation apparatus to install said rails on said staircase, comprising:
a rail anchor which is mounted on the floor adjacent to said staircase or on a step of said staircase;
a rail mount auxiliary plate which is mounted on said rail; and
a link which connects said rail anchor and said rail mount auxiliary plate,
wherein when front and back of said rail mount auxiliary plate is swapped, said rail mount auxiliary plate can be mounted on the same place of said rail, and when front and back of said rail mount auxiliary plate is swapped and mounted, a position of a connecting member which connects said link and said rail mount auxiliary plate measured in vertical to a longitudinal direction of said rail is invariant and said position of said connecting member measured in parallel to a longitudinal direction of said rail is different.

4. The stair lift of claim 1, further comprising:
an upper floor side stop-position-target, which is mounted at an upper portion of one of said rails either left or right side and which is designated an upper floor stop position of said gantry-shape carriage;
a lower floor side stop-position-target, which is mounted at a lower portion of said rail being different from said rail having the upper floor side stop-position-target and which is designated a lower floor stop position of said gantry-shape carriage; and
a sensor to detect said stop-position-target provided in each of said leg structures,
wherein when said gantry-shape carriage arrives at the stop position, the stair lift recognizes arrival position, whether it is upper floor or lower floor, based on side of said sensor which detects the stop-position-target.

5. The stair lift of claim 1, wherein said lifting mechanism of said lift step, comprising:
a step lifting guide base which moves up and down along a guide rail mounted on said leg structure;
a step suspension base which suspends said lift step at an end of longitudinal direction;
a parallelogram linkage which connects said step lifting guide base and said step suspension base;
a cam follower which is provided on a surface of said step suspension base, wherein the surface is of an opposite side of said lift step; and
a guide slope mounted on said floor or said step of said staircase where said lift step lands when said gantry-shape carriage stands by, wherein said cam follower rolls on said guide slope,
whereby when said gantry-shape carriage is at its standby position and while said lift step is in a procedure of moving downwards from a position which corresponds to traveling of said gantry-shape carriage to said landing position, at a moment when said cam follower touches said guide slope when said step lifting guide base moves downwards, after the moment, when said step lifting guide base moves further downwards, said cam follower rolls on said guide slope so that said lift step moves downwards while moving toward a riser of said staircase.

6. The stair lift of claim 5, wherein said step lifting guide base provides a swing stopper which restricts swing of said parallelogram linkage, when said lift step is at a position corresponding to traveling of said gantry-shape carriage, said swing stopper restricts lower floor side swing of said lift step, wherein the swing of said parallelogram linkage is stopped at a position where a torque due to the gravity acting on said lift step is applied on said parallelogram linkage.

7. The stair lift of claim 5, further comprising:
a guide rail provided on a surface of said step lifting guide base, wherein the surface is an opposite side surface of said lift step, wherein said guide rail is provided in parallel to the direction of up and down movement of said step lifting guide base; and
a floating lock plate having a downward protrusion at its bottom of upper floor side and providing a slider which moves along said guide rail so that said floating lock plate is movable along said guide rail,
when said gantry-shape carriage travels, the bottom of said floating lock plate gets on said cam follower so that the downward movement of said floating lock plate is stopped and when said lift step swings to the upper floor side, said cam follower hits against said downward protrusion of said floating lock plate so that the upper floor side swing of said lift step is stopped, and during an initial process of said lift step lowering procedure starting from a travel position corresponding to the travel of said gantry-shape carriage to the landing position of said lift step, said floating lock plate rides on said cam follower and moves downwards together with said lift step, and at a moment when said floating lock plate hits said guide slope so that the downward movement of said floating lock plate is stopped, after the moment, said floating lock plate does not hinder a movement of said cam follower which moves down while rolling on said guide slope.

8. The stair lift of claim 1, wherein said lifting mechanism of said lift step, comprising:
a load table which is moved up and down by a drive apparatus provided in said leg structure;
said drive apparatus which drives said load table;
a guide rail provided in said leg structure;
a step lifting guide base which is moved up and down along said guide rail; and,
a hook, which is provided on said step lifting guide base and which hooks said load table,
wherein said step lifting guide base supports said lift step via connecting means, said hook is moved up and down by said load table, and while said load table is moving up, said hook and said load table are moving up together as one body, and while said load table is moving downwards, when the downward movement of said step lifting guide base is stopped by an external force, then the one body movement of said hook and said load table is disrupted.

9. The stair lift of claim 8, further comprising a detection apparatus detecting whether said hook and said load table are being together as one body or not, and when said detection apparatus detects a disruption of the movement of said hook and said load table being together as one body, then said drive apparatus of said load table is stopped.

10. The stair lift of claim 1, wherein said gantry-shape carriage, comprising:
a said leg structure; and
a connecting structure connecting upper part of said leg structures,
wherein a frame of said leg structure comprises a leg structure frame and a bogie base, wherein
said leg structure frame comprising:
a top base;
a bottom base; and
a connecting column which connects said top base and said bottom base,
wherein said top base, said bottom base and said connecting column are formed in one body; and
said bogie base, on which a means for traveling along said rail is mounted, being connected to said bottom base,
wherein a frame of said connecting structure comprising:
left end plate and right end plate which face said top base; and
a connecting member which connects said left and right end plates,
wherein said end plates and said connecting member are formed in one body.

11. The stair lift of claim 10, further comprising:
a chain loop transmitting travel power generated by a travel power source positioned in said connecting structure;

a driven sprocket which is driven by said chain loop;
a first shaft, on which said driven sprocket is fixed at an end and on which a drive gear is fixed at the other end;
said drive gear;
a first bearing housing supporting said first shaft, positioned between said driven sprocket and said drive gear;
a driven gear which meshes with said drive gear;
a second shaft, on which said driven gear is fixed at end and on which a travel driving wheel is fixed at the other end;
said travel driving wheel which meshes with a traction rail provided on said rail;
a second bearing housing supporting said second shaft, positioned between said driven gear and said travel driving wheel,
wherein said first bearing housing and said second bearing housing pierce said bottom base and are fixed on said bottom base, wherein said drive gear and said driven gear are positioned at the side where the frame of said connecting structure is connected.

12. The stair lift of claim 10, further comprising a bearing housing supporting a drive shaft on which a travel driving wheel is fixed, wherein said travel driving wheel meshes with a traction rail provided on said rail, and said bearing housing pierces said bogie base and said bottom base, wherein said bogie base is pivotably mounted on said bottom base, said bearing housing is an axle of the rotation of said bogie base, so that the mounting angle of said bogie base to said bottom base is adjustable.

13. The stair lift of claim 1, further including a chain tensioner of which components are provided in said leg structure, wherein said chain tensioner comprising:
a chain loop which transmits the travel power of said gantry-shape carriage;
a driven sprocket which is driven by said chain loop;
a first idler sprocket which meshes with said chain loop, said first idler sprocket is positioned inside of said chain loop;
a rotating arm which is supported by an axle of said first idler sprocket; and
a second idler sprocket which meshes with said chain loop and which is mounted on said rotating arm,
wherein said second idler sprocket is positioned outside of said chain loop, wherein said rotating arm is driven to rotate so that said second idler sprocket pushes a part of said chain loop spanning between said first idler sprocket and said driven sprocket into inside of said chain loop.

14. The stair lift of claim 1, further comprising:
a brake drum fixed on a drive shaft of a travel driving wheel which meshes with a travel traction rail provided on said rail, wherein said brake drum and said drive shaft are concentric;
a brake base provided in said leg structure, wherein a base of said brake base is pierced by said drive shaft, said brake base provides a cylindrical space to contain said brake drum, wherein an inner surface of said cylindrical space surrounds a cylindrical outer surface of said brake drum, wherein said inner surface and said cylindrical outer surface are concentric and apart;
a plurality of sprag axles, positioned in a space between said inner surface of said brake base and said cylindrical outer surface of said brake drum, arranged on a concentric circumference of said drive shaft, providing a gap between neighboring said sprag axles, wherein said sprag axles are parallel to said drive shaft, wherein an end of said sprag axle is supported by said brake base;
a sprag having an axle hole of which diameter is larger than the outer diameter of said sprag axle, being supported by said sprag axle, wherein said sprag is capable to contact said cylindrical outer surface of said brake drum and said inner surface of said cylindrical space of said brake base simultaneously;
a spring mounted on said sprag axle, wherein said spring pushes said sprag so that said sprag is capable to contact said cylindrical outer surface of said brake drum and said inner surface of said cylindrical space of said brake base simultaneously;
a sprag retainer ring having a hook which hooks said sprag, wherein said sprag retainer ring is arranged so that said sprag retainer ring is rotatable to said brake base; and
a latch apparatus provided in said leg structure, wherein said latch apparatus retains a position of said sprag retainer ring which is rotated against counter force of said spring in order to prevent said sprag from contacting said outer surface of said brake drum,
whereby, by releasing said latch apparatus, the rotation of said travel driving wheel is braked, wherein the rotation is in response to downward movement of said gantry-shape carriage.

15. The stair lift of claim 1, further including an overspeed detector, comprising:
a casing which is driven to rotate at a speed proportional to the traveling speed of said gantry-shape carriage;
two links (156), wherein the shape of said link is configured in the following way, providing two same shape link plates having an axle hole at an end of both sides, arranging the two link plates parallel to each other with a gap between them, wherein the gap is suitable to position an extension spring in it, arranging the axle holes of the two link plates to be concentric so that an axle is fitted through two axle holes vertically arranged at an end portion of the two links, wherein said axle hooks an eye of said extension spring, forming the two link plates into a link so that two link plates are formed to be a link being joined at said end portion where the axle is fitted;
two said axles (158), wherein said axle is fitted through said end portion of said link;
a hammer (155) having a weight formed at an end, being a sliding body, wherein said hammer slides along a line formed by crossing planes, which are a plane including the rotation axle of said casing and a plane being vertical to the plane, furthermore said hammer provides bearings to support said links, wherein said bearing supports each axle hoe provided at an open side of said link with an independent axle, wherein said bearings are provided at both side of sliding direction of said hammer and positioned being included in a plane which is vertical to said sliding direction, furthermore said hammer provides an opening in order to put through an extension spring, which is spanned between said axles; and
said extension spring (157),
wherein said casing provides a plurality of slots (159) in which said two axles (158) slide, wherein said slots are positioned to include a plane being vertical to the sliding direction of said hammer, so that said casing guides sliding of said hammer and forms a toggle mechanism with said hammer and said two links, whereby when the rotation of said casing exceeds a preset value, then said toggle mechanism acts to an opposite direction and said hammer protrudes from said cashing and release a latch of a brake apparatus by hitting the latch.

\* \* \* \* \*